US008280818B2

(12) United States Patent
Ebihara et al.

(10) Patent No.: US 8,280,818 B2
(45) Date of Patent: Oct. 2, 2012

(54) LICENSE SOURCE COMPONENT, LICENSE DESTINATION COMPONENT, AND METHOD THEREOF

(75) Inventors: Munetake Ebihara, Kanagawa (JP); Hiroshi Kuno, Kanagawa (JP); Keiko Saeki, Tokyo (JP)

(73) Assignee: Sony Corporation, Tokyo (JP)

( * ) Notice: Subject to any disclaimer, the term of this patent is extended or adjusted under 35 U.S.C. 154(b) by 1356 days.

(21) Appl. No.: 11/216,210

(22) Filed: Sep. 1, 2005

(65) Prior Publication Data

US 2006/0059102 A1 Mar. 16, 2006

(30) Foreign Application Priority Data

Sep. 16, 2004 (JP) ................................. 2004-270286

(51) Int. Cl.
*G06F 1/00* (2006.01)
(52) U.S. Cl. ........................................................ 705/59
(58) Field of Classification Search .............. 705/50–51, 705/54, 59; 380/4
See application file for complete search history.

(56) References Cited

U.S. PATENT DOCUMENTS

| | | | | |
|---|---|---|---|---|
| 5,390,297 | A * | 2/1995 | Barber et al. .................... | 726/29 |
| 5,629,980 | A * | 5/1997 | Stefik et al. ..................... | 705/54 |
| 5,638,443 | A * | 6/1997 | Stefik et al. ..................... | 705/54 |
| 5,715,403 | A * | 2/1998 | Stefik .............................. | 705/44 |
| 5,892,900 | A * | 4/1999 | Ginter et al. .................... | 726/26 |
| 6,708,157 | B2 * | 3/2004 | Stefik et al. ..................... | 705/59 |
| 6,885,748 | B1 * | 4/2005 | Wang .............................. | 380/201 |
| 6,895,392 | B2 * | 5/2005 | Stefik et al. ..................... | 705/51 |
| 6,910,022 | B2 * | 6/2005 | Stefik et al. ..................... | 705/50 |
| 6,920,436 | B2 * | 7/2005 | Stefik et al. ..................... | 705/51 |
| 6,934,693 | B2 * | 8/2005 | Stefik et al. ..................... | 705/51 |
| 6,957,193 | B2 * | 10/2005 | Stefik et al. ..................... | 705/51 |
| 6,963,859 | B2 * | 11/2005 | Stefik et al. ..................... | 705/51 |
| 6,983,371 | B1 * | 1/2006 | Hurtado et al. ................ | 713/189 |
| 7,058,606 | B2 * | 6/2006 | Stefik et al. ..................... | 705/51 |
| 7,080,043 | B2 * | 7/2006 | Chase et al. .................... | 705/59 |
| 7,096,202 | B2 * | 8/2006 | Stefik et al. ..................... | 705/55 |
| 7,110,985 | B2 * | 9/2006 | Chase et al. .................... | 705/59 |
| 7,113,912 | B2 * | 9/2006 | Stefik et al. .................. | 705/300 |
| 7,139,736 | B2 * | 11/2006 | Stefik et al. ..................... | 705/51 |

(Continued)

FOREIGN PATENT DOCUMENTS

EP 1544712 A2 * 6/2005

(Continued)

OTHER PUBLICATIONS (OMA-DRM-DRM-V2_0-20040716-C, DRM Specification Candidate Version 2.0—Jul. 16, 2004, Open Mobile Alliance OMA-DRM-DRM-V2_0-20040716-C, 142 pages.*

(Continued)

*Primary Examiner* — James D Nigh
(74) *Attorney, Agent, or Firm* — Oblon, Spivak, McClelland, Maier & Neustadt, L.L.P.

(57) ABSTRACT

Disclosed herein is, a license source component for transferring a license defining a content usage rule to a license destination component, the license source component and the license destination component each being a unit of license processing, including, creating means for creating a message including a license, a manipulation type defining a type of processing the license between the license source component and the license destination component, and a component attribute defining an attribute of the license source component of its own, and transferring means for transferring the message to the license destination component.

13 Claims, 36 Drawing Sheets

U.S. PATENT DOCUMENTS

| | | | |
|---|---|---|---|
| 7,200,574 B2 * | 4/2007 | Stefik et al. | 705/51 |
| 7,209,902 B2 * | 4/2007 | Stefik et al. | 705/59 |
| 7,225,160 B2 * | 5/2007 | Stefik et al. | 705/51 |
| 7,266,529 B2 * | 9/2007 | Stefik et al. | 705/52 |
| 7,269,577 B2 * | 9/2007 | Stefik et al. | 705/59 |
| 7,302,709 B2 * | 11/2007 | England et al. | 726/27 |
| 7,305,366 B2 * | 12/2007 | Chase et al. | 705/59 |
| 7,359,881 B2 * | 4/2008 | Stefik et al. | 705/51 |
| 2002/0013772 A1 | 1/2002 | Peinado | |
| 2003/0229593 A1 | 12/2003 | Raley et al. | |
| 2004/0133448 A1 | 7/2004 | Higashi et al. | |
| 2004/0162786 A1 * | 8/2004 | Cross et al. | 705/59 |
| 2004/0205028 A1 * | 10/2004 | Verosub et al. | 705/59 |
| 2005/0108176 A1 * | 5/2005 | Jarol et al. | 705/59 |
| 2007/0265978 A1 * | 11/2007 | Kahn et al. | 705/59 |

FOREIGN PATENT DOCUMENTS

| | | |
|---|---|---|
| JP | 8-263438 | 10/1996 |
| JP | 11-328033 | 11/1999 |
| JP | 2000-148471 | 5/2000 |
| JP | 2004-199190 | 7/2004 |
| WO | WO 2004/055651 A1 | 7/2004 |
| WO | WO 2005/066874 A2 | 7/2005 |

OTHER PUBLICATIONS

OMS-DRM-DRM-V2_0-20040716-C, DRM Specification Candidate Version 2.0—Jul. 16, 2004, Open Mobile Alliance OMA-DRM-DRM-V2_0-20040716-C, 142 pages.*

Tenner, "You bought it. Who Controls It?", Technology Review, Jun. 2003, v 106, n 5, p. 61 (5), 5 pages.*

"Keitaide-Music Technical Specification", Keitaide—Music Consortium, Part 1: Overview, XP-002357364, May 18, 2001, 4 cover pages and pp. 1-20.

Takeaki Anazawa, et al., "Open Superdistribution Infrastructure Realizing the Tenacity of the Content Protection", Information Processing Society of Japan memoir, vol. 2001, No. 118, IPSJ SIG Notes, Nov. 30, 2001, pp. 31-42 with an English Abstract.

"Technical Documentation of Music with Mobile Phone", Part 1: Summary, Music with Mobile Phone Consortium, Version 1.0, 1-19, http://www.keitaide-music.org/pdf/KP1JF101.pdf, Apr. 23, 2001, 23 pages.

* cited by examiner

FIG. 9

```
<?xml version="1.0"?>
-<License>
 -<Information>
   <U_ContentID>0020F000BAE60848A31C43BF6EE8D472</U_ContentID>
   <LegalCopyright> Copyright(c)2003 by (Content Provider Name)</LegalCopyright>
 </Information>                                                                    } 501
 -<Operation>
  -<Play>
     <PropertySelectionList>MagicGateVideo, 0x82; CountDownPlay,
         0x81;</PropertySelectionList>
     <Parameter>Remain=3,</Parameter>                                               } 521
     <Status>Remain=2,</Status>
   </Play>
  -<Move>
     <PropertySelectionList>MagicGateVideo, 0x82; CountDownMove, 0x82;
         CheckServer, 0x81;</PropertySelectionList>
     <Parameter> CheckServerId=18150, CheckServerUrl="%20", Remain=   } 522        } 502
         1,</Parameter>
   </Move>
  -<Bind>
     <PropertySelectionList>MagicGateVideo, 0x81;</PropertySelectionList>           } 511
   </Bind>
 </Operation>
</License>
```

FIG. 10

```
<?xml version="1.0"?>
-<License>
  -<Information>
     <U_ContentID>0010F000BAE60848A31C43BF6EE8D471</U_ContentID>
     <LegalCopyright>Copyright(c)2003 by (Content Provider Name)</LegalCopyright>
  </Information>
  -<Operation>
    -<Play>
       <PropertySelectionList>MagicGateAudio, 0x81;</PropertySelectionList>
    </Play>
    -<Copy>
       <PropertySelectionList>MagicGateAudio, 0x82; TimeLimit,
          0x81;</PropertySelectionList>
       <Parameter>TimeLimitStart=20030101000000000, TimeLimitEnd=
          20030131235900000,</Parameter>
    </Copy>
    -<Bind>
       <PropertySelectionList>MagicGateAudio, 0x82; CountDown, 0x82; MiniDisc, 0x81;
          HDD, 0x81; MemoryStick, 0x81;</PropertySelectionList>
       <Parameter>Count=3,</Parameter>
       <Status>Count=1,</Status>
    </Bind>
  </Operation>
</License>
```

```xml
<?xml version="1.0"?>
-<License>
  -<Information>
      <U_ContentID>0010F000BAE60848A31C43BF6EE8D473</U_ContentID>
      <LegalCopyright>Copyright(c)2003 by (Content Provider Name)</LegalCopyright>
  </Information>
  -<Operation>
    -<Play>
        <PropertySelectionList>MagicGateAudio, 0x81;</PropertySelectionList>
        <Parameter>DigitalOutCopyProtection=1,</Parameter>
    </Play>
    -<Rent>
        <PropertySelectionList>MagicGateAudio, 0x82; CountDown, 0x82 CheckId, 0x81;</PropertySelectionList>
        <Parameter>Count=3,</Parameter>
        <Status>Count=1, Id0=8A7713FE24B0C155,</Status>
    </Rent>
    -<Bind>
        <PropertySelectionList>MagicGateAudio, 0x82; SDMICompliant, 0x81;</PropertySelectionList>
    </Bind>
  </Operation>
</License>
```

501: `<Information>` block
521: `<Play>` block
524: `<Rent>` block
511: `<Bind>` block
502: `<Operation>` block

FIG. 12

```
<?xml version="1.0"?>
-<License>
  -<Information>
     <U_ContentID>0010F000BAE60848A31C43BF6EE8D473</U_ContentID>
     <LegalCopyright>Copyright(c)2003 by (Content Provider Name)</LegalCopyright>
  </Information>
  -<Operation>
     -<Play>
        <PropertySelectionList>MagicGateAudio, 0x81;</PropertySelectionList>
        <Parameter>DigitalOutCopyProtection=1,</Parameter>
     </Play>
     -<Return>
        <PropertySelectionList>MagicGateAudio, 0x82; CheckId,
           0x81;</PropertySelectionList>
        <Parameter>Id=8A7713FE24B0C155,</Parameter>
     </Return>
     -<Bind>
        <PropertySelectionList>MagicGateAudio, 0x82; SDMICompliant,
           0x81</PropertySelectionList>
     </Bind>
  </Operation>
</License>
```

501 = Information section
521 = Play section
525 = Return section
511 = Bind section
502 = Operation section

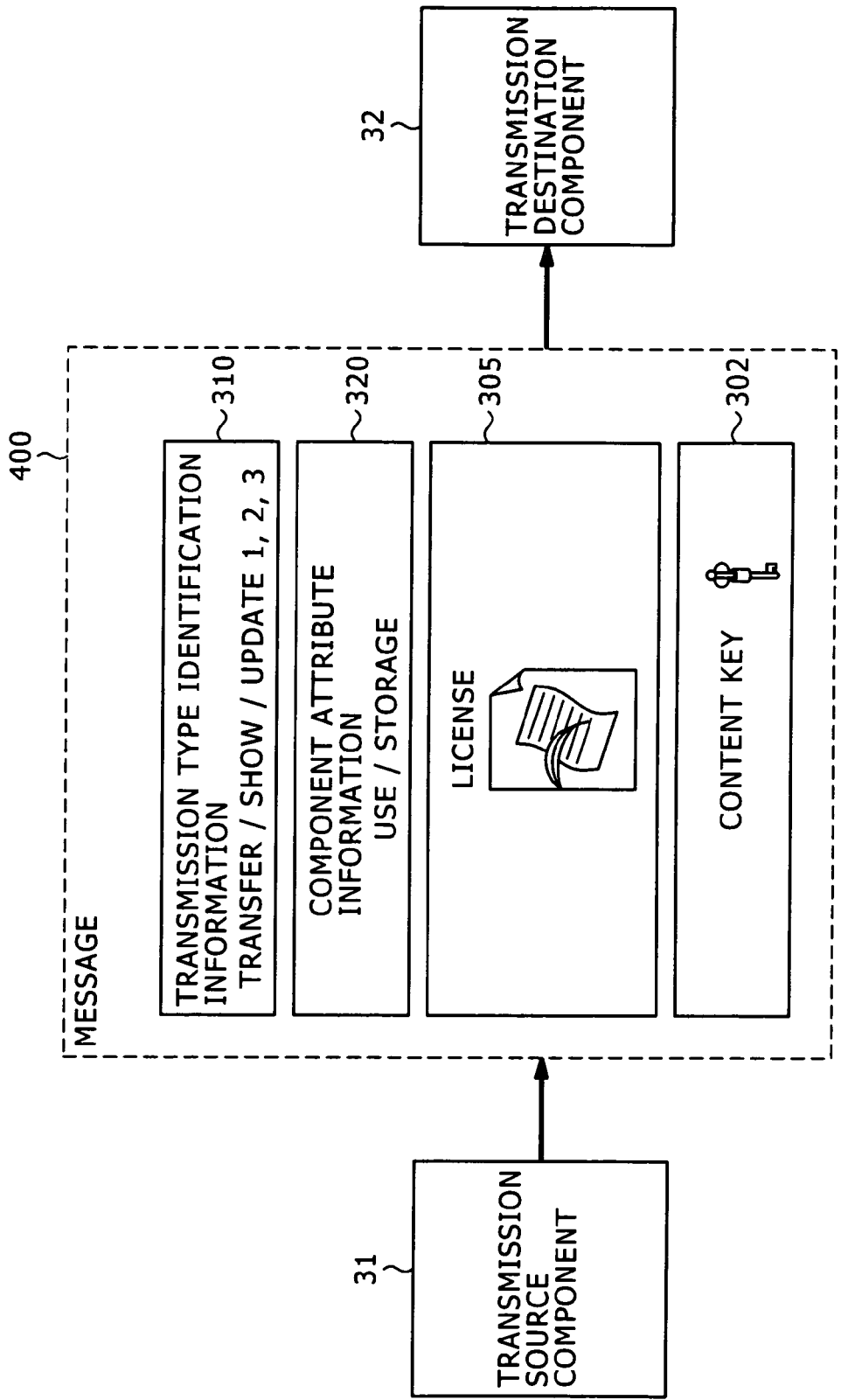

FIG. 15

| TRANSMISSION TYPE | | CONTENTS OF MESSAGE |
|---|---|---|
| TRANSMISSION TYPE ID | NAME | |
| 0x01 | TRANSFER | MESSAGE TO TRANSFER LICENSE MASTER COPY |
| 0x02 | SHOW | MESSAGE TO SHOW LICENSE MASTER COPY |
| 0x03 | UPDATE 1 (REQUEST UPDATE) | MESSAGE TO REQUEST LICENSE UPDATE |
| 0x04 | UPDATE 2 (TRANSFER UPDATED LICENSE) | MESSAGE TO TRANSFER UPDATED LICENSE |
| 0x05 | UPDATE 3 (NOTIFY UPDATE COMPLETION) | MESSAGE TO SEND NOTIFICATION OF UPDATE COMPLETION |

FIG. 16

| COMPONENT ATTRIBUTE ID | TRANSMISSION DESTINATION COMPONENT ATTRIBUTE NAME | CONTENTS OF MESSAGE |
|---|---|---|
| 0x01 | STORAGE (FROM STORAGE) | MESSAGE FROM STORAGE COMPONENT |
| 0x02 | UTILIZATION (FROM UTILIZATION) | MESSAGE FROM UTILIZATION COMPONENT |

FIG. 17

| | MESSAGE TYPE | TRANSMISSION TYPE [ID] | TRANSMISSION SOURCE COMPONENT ATTRIBUTE [ID] | LICENSE | KEY |
|---|---|---|---|---|---|
| 1 | TRANSFER MESSAGE | TRANSFER [0x01] | STORAGE [0x01] OR UTILIZATION [0x02] | MASTER COPY OF LICENSE TO BE TRANSFERRED | INCLUDED |
| 2 | SHOW MESSAGE | SHOW [0x02] | STORAGE [0x01] | MASTER COPY OF LICENSE TO BE SHOWN | INCLUDED |
| 3 | UPDATE REQUEST MESSAGE | UPDATE 1 [0x03] | STORAGE [0x01] | LICENSE TO BE UPDATED | INCLUDED |
| 4 | UPDATE TRANSFER MESSAGE | UPDATE 2 [0x04] | USE [0x02] | UPDATED LICENSE TO BE OVERWRITTEN | INCLUDED |
| 5 | UPDATE COMPLETION MESSAGE | UPDATE 3 [0x05] | STORAGE [0x01] | LICENSE COMPLETED WITH UPDATE | INCLUDED |

FIG. 18

| | COMPONENT | HANDLEABLE TRANSMISSION TYPE | | DESCRIPTION |
|---|---|---|---|---|
| | | INPUT (RECEPTION) | OUTPUT (TRANSMISSION) | |
| 21a | Reproduce (NOT UPDATED) | SHOW | — | CONTROLS NORMAL CONTENT REPRODUCTION INVOLVING NO STATUS UPDATE |
| 21b | Reproduce (UPDATED) | UPDATE 1, 3 | UPDATE 2 | CONTROLS CONTENT REPRODUCTION INVOLVING STATUS UPDATE |
| 22 | Move | TRANSFER | TRANSFER | CONTROLS TRANSFER OF LICENSE FOR MOVING CONTENT |
| 23 | Copy | SHOW | TRANSFER | CONTROLS COPY OF LICENSE TO COPY CONTENT |
| 24 | Rent | UPDATE 1, 3 | UPDATE 2, TRANSFER | CONTROLS RENT OF LICENSE TO RENT CONTENT |
| 25 | Return | TRANSFER, UPDATE 1, 3 | UPDATE 2 | CONTROLS RETURN OF LICENSE TO RENTER TO RETURN CONTENT |
| 16 | Bind (READ ONLY) | — | SHOW | SHOWS COPY OF LICENSE READ FROM READ-ONLY STORAGE MEANS IN WHICH LICENSE IS SECURELY STORED |
| 17 | Bind (WRITE ONLY) | TRANSFER | — | MASTER COPY OF LICENSE MAY BE SECURELY STORED IN STORAGE MEANS BUT READING AND REWRITING ARE PROHIBITED |
| 18 | Bind (READ/WRITE ENABLED) | TRANSFER, UPDATE 2 | TRANSFER, SHOW, UPDATE 1, 3 | LICENSE READING, WRITING, STORING, AND REWRITING ARE ENABLED |

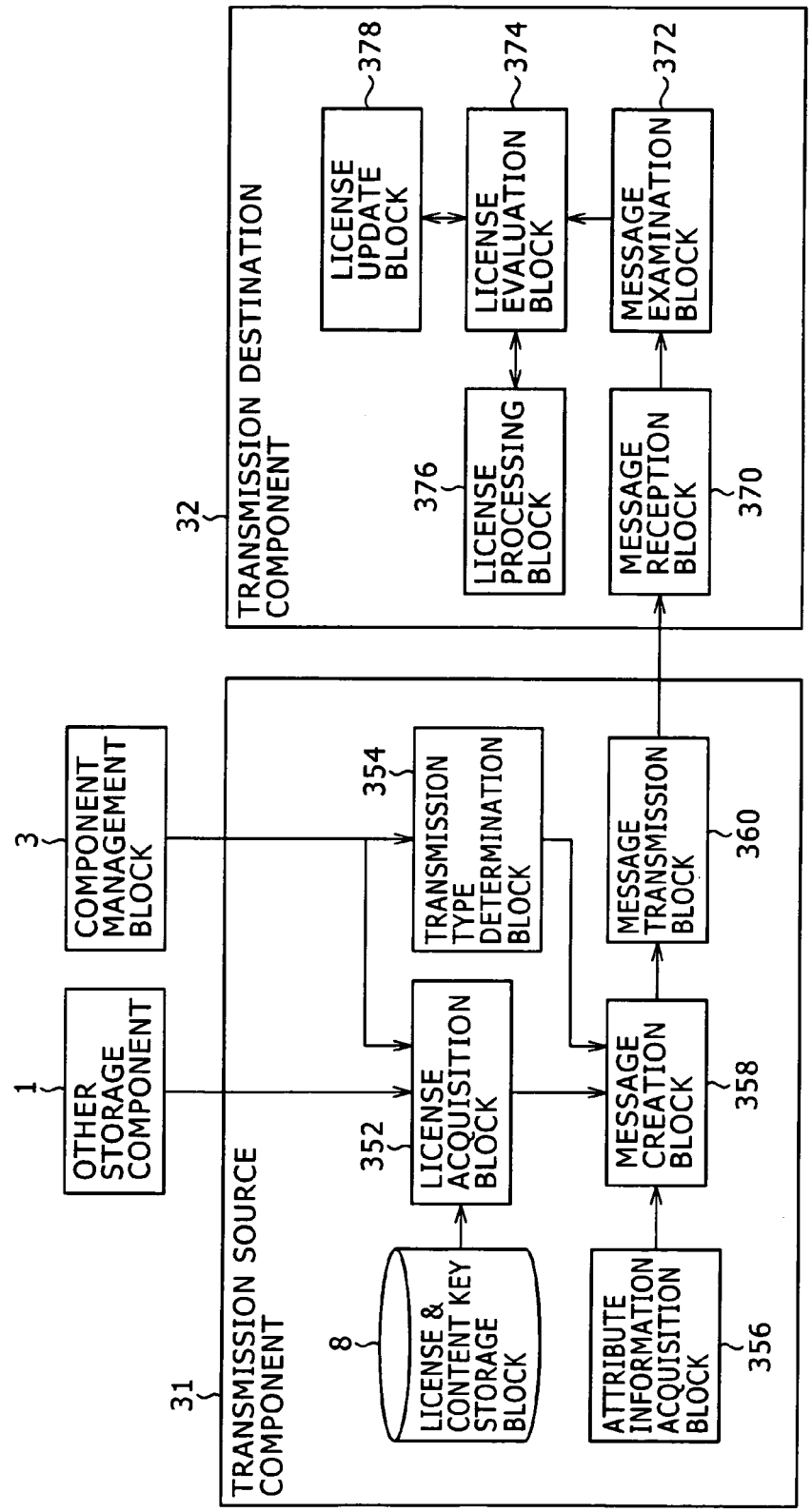

<MOVE PROCESSING>

<RENT PROCESSING>

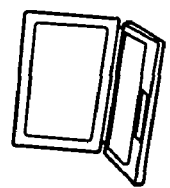

LICENSE SOURCE COMPONENT, LICENSE DESTINATION COMPONENT, AND METHOD THEREOF

CROSS REFERENCES TO RELATED APPLICATIONS

The present invention contains subject matter related to Japanese Patent Application JP 2004-270286 filed in the Japanese Patent Office on Sep. 16, 2004, the entire contents of which being incorporated herein by reference.

BACKGROUND OF THE INVENTION

The present invention relates to a license processing apparatus, a program, and a license processing method.

Unlike analog content, digital content such as music content allows duplication a plurality of times without involving degradation of quality. For this reason, the recent rapid increase in the processing speed and storage capacity of the Internet and PCs (personal Computers) also increases the illegal distribution and exchange of content without permission by the copyright holders of the content.

In an attempt to prevent these illegal activities, a copyright management system based on the DRM (Digital Rights Management) technology intended to restrict the distribution and use of content has been gaining popularity. As proposed by SDMI (Secure Digital Music Initiative) for example, it is a general practice for the above-mentioned system to restrict the use (reproduction and copy for example) of content on the basis of use conditions written in the license (rights information) to content.

For example, Japanese Patent Laid-Open No. 2002-312211 (refer to patent document 1) discloses a copyright management system for restricting the use of content on the basis of a general license. The license to be used by this copyright management system has various content use conditions such as "time limit of use", "time limit of download", "permitted copy count", "check-out count", "CD-R recordable right", "PD copyable right", "right for moving to proprietary right", and "specification logging right" for example (especially, refer to FIG. 8 of Patent Document 1). User devices such as a PC and a PD (Portable Device) evaluate these licenses by the incorporated copyright management block (a DMR module for example), thereby controlling the use of copyrighted content.

However, the above-mentioned copyright management system presents problems that the copyright management block of this system for managing the use of content on the basis of the license thereof is individually designed and mounted in accordance with the use restriction capabilities of the system and the type of a user device for example, thereby almost lacking versatility and expandability. Consequently, it is difficult to transfer copyright-managed content between user devices having different installations of copyright management blocks similar restrictions of use are imposed.

The primary role of each copyright management system is to enhance the legal portability of content in exchange for the restrictive use of content. However, with the above-mentioned related-art copyright management system, copyright-managed content may not be transferred with restriction between user devices if the installations of copyright management block thereof are different from one another, thereby limiting the enhancement of the portability of copyright-managed content. This drawback is an obstacle for the popularization of copyright management systems.

The above-mentioned problems may be attributable to the method of designing the copyright management block and the license. That is, related-art copyright management blocks are not based on module configurations suitably adapted to various content use cases such as reproduction, copy, move, rent (or check-out), return (or check-in, and storage, thereby failing to execute full use of content between a plurality of user devices. In addition, as described above, the related-art license is written with various use conditions at the same that are not written in definite categories for the above-mentioned use cases, thereby presenting a problem of poor portability. Therefore, it is difficult for the copyright management block having a specific installation to suitably determine the use conditions for evaluating each of use cases from the license corresponding to another installation.

SUMMARY OF THE INVENTION

Therefore, the present invention addresses the above-identified and other problems associated with related-art methods and apparatuses. In order to circumvent these problems, the present invention provides a license processing apparatus, a program, and a license processing method that may enhance versatility and expandability by suitably modularize the capabilities of the copyright management block and enhance portability copyright-managed content between user devices having different installation of copyright control blocks.

In carrying out the invention and according to one embodiment thereof, there is provided a license source component for transferring a license defining a content usage rule to a license destination component, the license source component and the license destination component each being a unit of license processing. This license source component has creating means for creating a message including a license, a manipulation type defining a type of processing the license between the license source component and the license destination component, and a component attribute defining an attribute of the license source component of its own; and transferring means for transferring the message to the license destination component.

The above-mentioned license source component further has retrieving means for retrieving the license targeted to be transferred to the license destination component; deciding means for deciding the manipulation type of the license to be transferred to the license destination component; and reading means for reading a component attribute defined to the license source component of its own.

In the above-mentioned license source component, the manipulation type may be any one of transfer for transferring the license itself, show for transferring a copy of the license, and update for transferring the license to be updated.

In the above-mentioned license source component, the unit of license processing may be any one of a storage component storing the license in the storage and a utilization component utilizing the license transferred from the storage component.

In the above-mentioned license source component, the storage component may retrieve the license from the storage and transfers the license to the utilization component.

In the above-mentioned license source component, the utilization component may transfer the license transferred from the storage component or an updated license to the storage component or another storage component.

In the above-mentioned license source component, the component attribute may indicate which of the storage component and the utilization component the license source component is.

In the above-mentioned license source component, the transferring means may transfer, to the license destination component, a content key to decrypt the content corresponding to the license, together with the license.

In the above-mentioned license source component, the usage rule of the content may be described in the license corresponding to the unit of license processing and the unit of license processing evaluates the usage rule defined for the license source component in the license to process the license.

In the above-mentioned license source component, the license source component may be a storage component storing the license in the storage and the retrieving means searches for the license to be transferred from the storage on the basis of content identification received from a component manager managing the unit of license processing.

In carrying out the invention and according to another embodiment thereof, there is provided a license transfer method for a license source component for transferring a license defining a content usage rule to a license destination component, the license source component and the license destination component each being a unit of license processing. The above-mentioned license transfer method may include the steps of:

creating a message including a license, a manipulation type defining a type of processing the license between the license source component and the license destination component, and a component attribute defining an attribute of the license source component of its own; and transferring the message to the license destination component.

In carrying out the invention and according to still another embodiment thereof, there is provided a license transfer program for a license source component for transferring a license defining a content usage rule to a license destination component, the license source component and the license destination component each being a unit of license processing. The above-mentioned license transfer program may include the steps of:

creating a message including a license, a manipulation type defining a type of processing the license between the license source component and the license destination component, and a component attribute defining an attribute of the license source component of its own; and transferring the message to the license destination component.

In carrying out the invention and according to yet another embodiment thereof, there is provided a license destination component for receiving a license defining a content usage rule from a license source component, the license source component and the license destination component each being a unit of license processing. The above-mentioned license destination component may include: receiving means for receiving a message including the license, a manipulation type defining a type of processing the license between the license source component and the license destination component, and a component attribute defining an attribute of the license source component; and processing means for processing the license received from the receiving means on the basis of the manipulation type and the component attribute.

The above-mentioned license destination component may further include analyzing means for analyzing the message allowing or prohibiting the license in the message on the basis of the manipulation type and the component attribute in the message.

In the above-mentioned license destination component, the manipulation type may be any one of transfer for transferring the license itself, show for transferring a copy of the license, and update for transferring the license to be updated.

In the above-mentioned license destination component, the transferring means may transfer, to the license destination component, a content key to decrypt the content corresponding to the license, together with the license.

In the above-mentioned license destination component, the unit of license processing may be any one of a storage component storing the license in a storage and a utilization component utilizing the license transferred from the storage component.

In the above-mentioned license destination component, the utilization component may evaluate the license transferred from the storage component, thereby controlling processing of the license or usage of the content corresponding to the license.

In the above-mentioned license destination component, the storage component may evaluate the license transferred from the utilization component, thereby controlling storing of the license into the storage.

In the above-mentioned license destination component, the component attribute may indicate which of the storage component and the utilization component the license source component is.

In the above-mentioned license destination component, the storage component may analyze whether the license source component is a storage component or a utilization component on the basis of the component attribute and accordingly processes the license transferred only from the utilization component and the utilization component analyzes whether the license source component is a storage component or a utilization component on the basis of the component attribute and accordingly processes the license transferred only from the storage component.

In the above-mentioned license destination component, the receiving means may receive a content key for decrypting the content corresponding to the license, together with the license, transferred from the license source component.

In the above-mentioned license destination component, the usage rule of content may be described in the license corresponding to the unit of license processing and the unit of license processing evaluates the usage rule defined for the license source component in the license to process the license.

In carrying out the invention and according to a different embodiment thereof, there is provided a license transfer method for a license destination component for receiving a license defining a content usage rule from a license source component, the license source component and the license destination component each being a unit of license processing. The above-mentioned license transfer method may include the steps of receiving a message including the license, a manipulation type defining a type of processing the license between the license source component and the license destination component, and a component attribute defining an attribute of the license source component; and processing the license received from the receiving means on the basis of the manipulation type and the component attribute.

In carrying out the invention and according to a still different embodiment thereof, there is provided a license transfer program for a license destination component for receiving a license defining a content usage rule from a license source component, the license source component and the license destination component each being a unit of license processing. The above-mentioned license transfer program may include the steps of receiving a message including the license, a manipulation type defining a type of processing the license between the license source component and the license destination component, and a component attribute defining an attribute of the license source component; and processing the license received from the receiving means on the basis of the manipulation type and the component attribute.

In carrying out the invention and according to an alternative embodiment thereof, there is provided a license source module for transferring a license defining a content usage rule to a license destination module, the license destination module being a unit of processing the license. The above-mentioned license source module may include a creation unit configured to create a message including the license, a manipulation type defined for how to process the license between the license source module and the license destination module, and a module attribute defined for the license source module; and a transfer unit configured to transfer the message to the license destination module.

In carrying out the invention and according to a still alternative embodiment thereof, there is provided a license destination component for receiving a license defining a content usage rule from a license source component, the license source component and the license destination component each being a unit of license processing. The above-mentioned license destination component may include a receiving unit configured to receive a message including the license, a manipulation type defining a type for processing the license between the license source component and the license destination component, and a component attribute defining an attribute of the license source component; and a processing unit configured to process the license received by the receiving means on the basis of the manipulation type and the component attribute.

As described and according to the present invention, the novel configuration enhances the versatility and expandability of the license processing apparatus and method by suitably modularizing the capabilities of the copyright management block, eventually enhancing the portability of copyright-managed content between user devices having different installations of copyright management blocks.

Other objects and aspects of the invention will become apparent from the following description of embodiments with reference to the accompanying drawings.

BRIEF DESCRIPTION OF THE DRAWINGS

FIG. 9 is a diagram illustrating a specific example of a description of a license according to the embodiment of the invention;

FIG. 10 is a diagram illustrating another specific example of a description of the license according to the embodiment of the invention;

FIG. 11 is a diagram illustrating a specific example of a description of rent source license according to the embodiment of the invention;

FIG. 12 is a diagram illustrating a specific example of a description of a license for rent according to the embodiment of the invention;

FIG. 13 is a schematic diagram illustrating an outline of message transmission between components according to the embodiment of the invention;

FIG. 15 is a diagram illustrating a relationship between transmission type IDs and messages of one example of transmission type identification information according to the embodiment of the invention;

FIG. 16 is a diagram illustrating a relationship between component IDs that are a specific example of component attribute information and messages according to the embodiment of the invention;

FIG. 17 is a diagram illustrating message types and data configuration thereof according to the embodiment of the invention;

FIG. 18 is a diagram illustrating transmission types that may be handled by license processing components according to the embodiment of the invention;

FIG. 19 is a block diagram illustrating a functional configuration according to message transmission between a transmission source component and a transmission destination component according to the embodiment of the invention;

FIG. 33 is schematic diagram illustrating an outline of a license return method for returning licenses between two storage devices in the personal computer according to the embodiment of the invention;

DETAILED DESCRIPTION OF THE PREFERRED EMBODIMENTS

Figure 1:
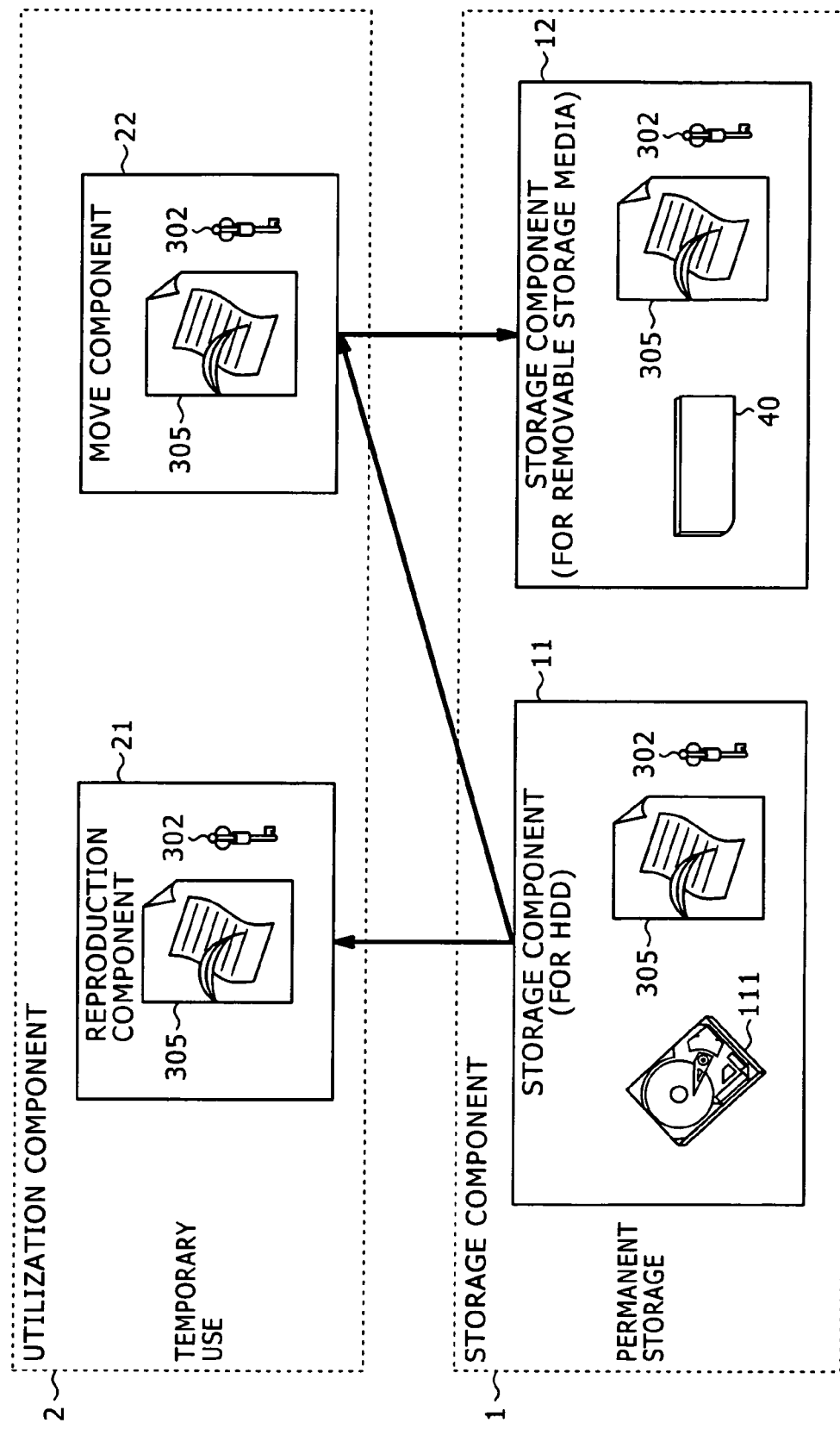
FIG. 1 is a schematic diagram illustrating a specific example of license processing components and a combination thereof in a copyright management system practiced as an embodiment of the invention.

The following describes, in detail, embodiments of the present invention with reference to accompanying drawings. It should be noted that components having substantially similar functional configurations are denoted by the same reference numerals herein and accompanying drawings for the purpose of brevity.

(First Embodiment)

The following describes a copyright management system and components according to a first embodiment of the present invention.

<1. Outline of a Copyright Management Method>

First, the copyright management method used in the copyright management system according to the first embodiment will be described.

The copyright management system according to the first embodiment of the invention manages the conditions and states of copyright-managed content (hereafter referred to simply as content) obtained by encrypting digital content such as video content and audio content among others. This copyright management system encrypts digital content with use conditions thereof specified by a copyright administrator and controls content use by means of a content encryption key used in the encryption and content use conditions and use status description, thereby executing copyright management. The basic data necessary for this copyright management includes:

(1) content;

(2) content encryption key (hereafter referred to simply as content key); and (3) use conditions and use statuses description associated with the use of content and the transmission of basic data (hereafter referred to as a license).

Content is a set of pieces of encrypted digital content (or copyright-managed content). This content becomes available when it is decrypted with the content key within a scope of the use condition described in the license. The content key becomes necessary when content is used and is managed as related with the license while keeping the key value confidential in each copyright management system. The license defines use conditions imposed on the use of content and the transmission of the above-mentioned three basic data and use statuses indicative of how content has been used up to the current time and is managed such that no forgery and alteration be practiced inside the copyright management system.

Also, the copyright management system that uses the above-mentioned three basic data is required to satisfy the following three requirements:

(1) security of the content key (the content key shall not be broken);

(2) license confidentiality (the license shall not be altered); and (3) secured relationship of three basic data (the relationship of content, content key, and license shall not be changed).

In order to build a copyright management system capable of coping with various installations corresponding to user device types, content types, and use restriction types while satisfying the above-mentioned requirements, the copyright management system according to the present embodiment regards copyright management functions as a set of a plurality of basic functions and divides a copyright management block (actually software for copyright management) that executes copyright management in each user device into a plurality of modules of the above-mentioned basic functions. Next, the copyright management system transfers the three basic data between these modules that process the received basic data for the execution of the copyright management of content.

This modularization will be described in detail below. First, the use restriction functions of the copyright management block are all listed to be divided into the following two factions:

(a) functions associated with the permanent storage of licenses; and (b) functions associated with temporary use of licenses.

Further, in these two major classifications, the use restriction functions are divided by the use case of content on the basis of the viewpoint of users of content and the copyright management block is modularized (into license processing components) for each divided use restriction function.

Consequently, combining one or more license processing components belonging to (a) and (b) above may realize the content use restriction of each use case. Also, each license is written with parameters associated with use restriction functions by dividing the parameters by each license processing component. The license thus written is transferred in a portable manner between the above-mentioned license processing components of user devices arranged in a network. As a result, the location where content use restriction is practiced may be distributed over a plurality of user devices interconnected by a network.

As described above, the copyright management system according to the first embodiment of the invention divides the copyright management block (or the software for copyright management) into a plurality of license processing components (or basic functional modules) by the license processing unit corresponding to the use case of content and distributably arrange these components. By combining these components on a network, the portability of content inside a network may be achieved.

The following describes the above-mentioned license processing components and an exemplary combination thereof with reference to FIG. 1. FIG. 1 schematically shows license processing components of the copyright management system according to the present embodiment and an exemplary combination of these components.

As shown in FIG. 1, license processing components 11, 12, 21 and 22 for executing copyright management are divided into a storage component (or a storage module) 1 for executing the above-mentioned function (a) and a use component (or a utilization module) 2 for executing the above-mentioned function (b).

The storage component 1 is a license processing component having a license permanent storage function, securely storing a license 305 and a content key 302 in a storage device. The storage component 1 includes a storage component 11 for a hard disk drive (hereafter referred to as a HDD) and a storage component 12 for a removable storage media such as a semiconductor memory, for example. The storage component 11 for HDD securely stores the license 305 and the content key 302 into a HDD 111 incorporated in a user device. The storage component 12 for removable storage media securely stores the license 305 and the content key 302 into a removable storage medium 40 loaded on a user device. Thus, the storage component 1 is arranged for each of a plurality of storage devices having different storage media.

The storage component 1 thus configured reads the license 305 and the content key 302 from the storage device corresponding to the storage component 1 itself and transmits the license 305 and content key 302 to the use component 2. Also, the storage component 1 writes to the license 305 and the content key 302 to the corresponding storage device.

On the other hand, the use component 2 is a license processing component having a license temporary use function that evaluates the license 305 received from the storage component 1 to control the use of content and the transmission of the license 305 and the content key 302. This use component 2 includes a reproduction component 21 for controlling content reproduction by evaluating the license 305 received from the storage component 1 and a move component 22 for control move of the license 305 by evaluating the license 305 received from the storage component 1.

Thus, the use component 2 only temporarily uses the license 305 and so on received from the storage component 1 at the time of content use and therefore cannot permanently store the license 305 and so on (in a storage device for example).

As described above, dividing the basic functions for the copyright management block into a plurality of storage components 1 and a plurality of use components 2 allows the transfer of the license 305 and so on between these components, thereby controlling the use of content.

For example, in the control of content reproduction, the storage component 11 reads the license 305 and the content key 302 corresponding to the content subject to reproduction from the HDD 111 and transmits these license 305 and content key 302 to the reproduction component 21 as shown in FIG. 1. The reproduction component 21 evaluates the reproduction condition written to the license 305 and determines whether the content subject to reproduction is reproducible or not. If the content is found reproducible, the reproduction component 21 decrypts the content with content key L and makes a reproduction application program to be described later execute the reproduction of the content.

In the control of moving a license corresponding to the content to be moved between user devices, the storage component 11 reads the license 305 and the content key 302 corresponding to the content subject move is read from the HDD 111 and transmits the license 305 and the content key 302 to the move component 22 as shown in FIG. 1. The move component 22 evaluates the move condition written to the received license 305 to determine whether this license and the content key 302 are movable. If they are found movable, the move component 22 transmits the license and the content key 302 to the storage component 12. The storage component 12 stores the received license and content key 302 into the removable storage medium 40. When the license 305 and so on have thus been moved, the above-mentioned content subject to move is also moved from the HDD 11 to the removable storage medium 40 by a move application program to be described later. Consequently, another user device connected with the removable storage medium 40 can reproduce the content subject to move on the basis of the license 305 moved as described above. Thus, controlling the move of the license 305 and the content key 302 eventually can control the move of content.

Thus, a copyright management method in the copyright management system according to the present embodiment of the invention has been outlined. Installing the copyright management block (or the copyright management software) in accordance with each individual user device and content type on the basis of such a copyright management method enhance the portability of content by transferring various types of content between user devices interconnected by a network for example. The following describes, in detail, each of the components of the above-mentioned copyright management system and operations of these components.

<2. System Configuration>

Figure 2:
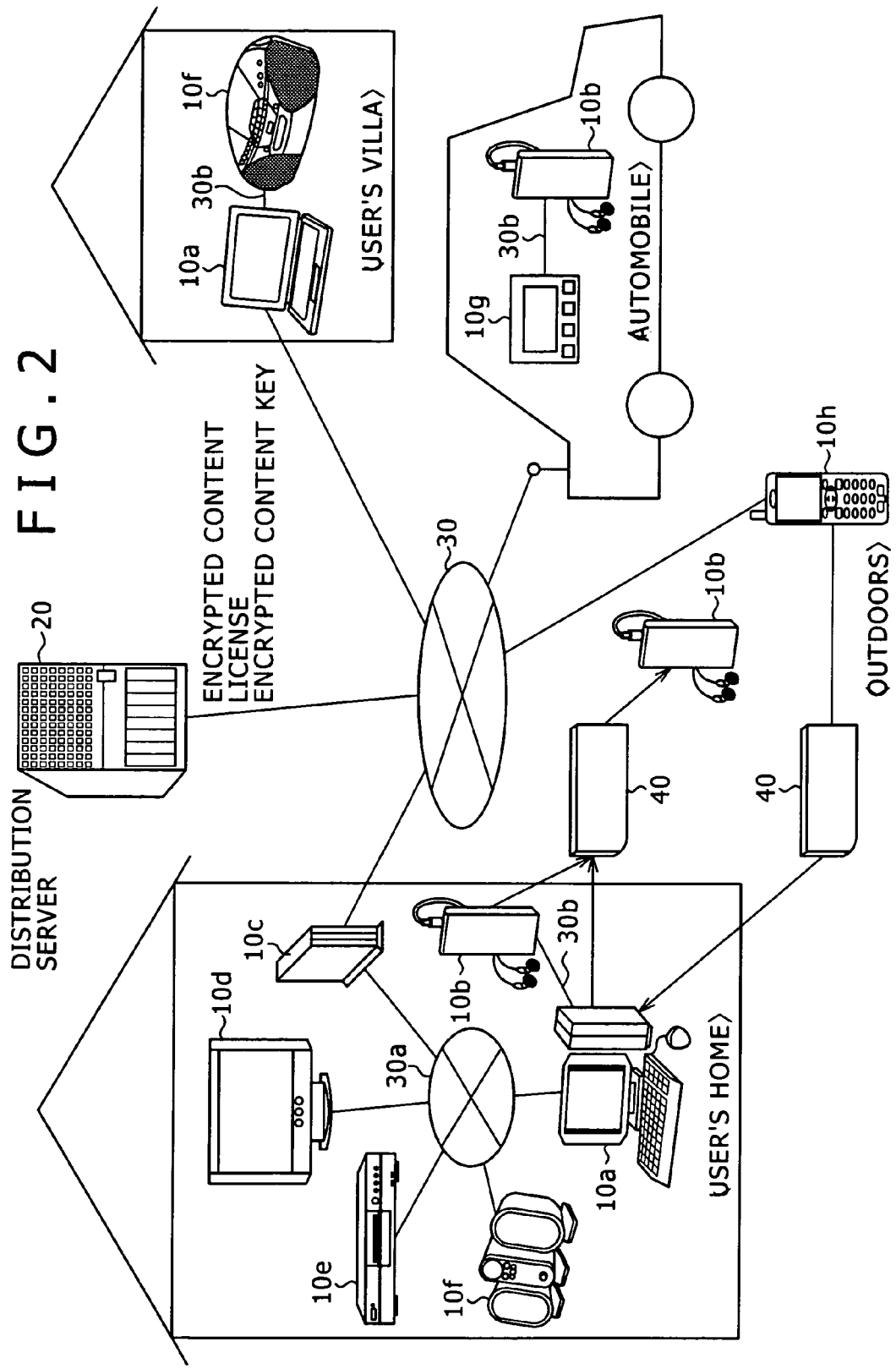
FIG. 2 is a schematic diagram illustrating an overall configuration of the copyright management system practiced as the embodiment of the invention.

The following describes an entire configuration of a copyright management system 100 according to the first embodiment of the invention with reference to FIG. 2. FIG. 2 is a diagram schematically showing an entire configuration of the copyright management system 100.

As shown in FIG. 2, the copyright management system 100 has a plurality of user devices 10a, 10b, and so on (hereafter generically referred to as a user device 10), a distribution server 20, a network 30 (including a home network 30a and a local line 30b) for interconnecting these devices, and the removable storage medium 40 for transferring data such as content and licenses between these devices, for example.

Each user device 10 is an information processing apparatus of one of various types for using content and one configurational example of the license processing apparatus according to one embodiment of the present invention. FIG. 2 shows a note-type or desktop-type personal computer (hereafter referred to as a PC) 10a, a portable device (hereafter referred to as a PC) 10b that is a portable content reproducing device, a home server 10c, a television receiver 10d, a recording/reproducing device 10e such as CD, HD or DVD recorder/player, a stationary audio player 10f, a car audio player 10g, and a mobile phone 10h, as one example of the user device 10. However, the present embodiment is not limited to this configuration; for example, a computer of any type, a PDA (Personal Digital Assistant) or another portable terminal, a digital video camera, a home game machine, a home information appliance, and other various devices may be used.

The user device 10 thus configured has content use functions (for example, content reproduction, storage, move, combination, division, conversion, copy, rent, and return functions), a content use control function based on license, a content management function (for example, search and delete of content, license, content key and so on based on content ID) and a content creation function based on ripping and self recording, for example.

Of the user devices 10, the devices having a capability of communication through the network 30 (for example, the PC 10a, the home server 10c, and so on) are communicably connectable with the distribution server 20. These user devices 10 are capable of downloading the software for content distribution service and the software for copyright management from the distribution server 20 and installing the downloaded software in themselves, for example. Consequently, each user device 10 may receive the distribution of encrypted content, an encrypted license, and encrypted content key from the distribution server 20 and store these received data into a storage device such as a storage unit or the removable storage medium 40.

In addition, each user device 10 may newly create content by means of self recording (including audio and video recording) or ripping and store the created content in a storage unit or the removable storage medium 40, for example. "Self recording" herein denotes recording, as digital data, an image signal or an audio signal for example shot or picked up by an imaging device or a sound pickup device of the user device 10 itself. "Ripping" herein denotes extracting digital content (audio or image for example) from a music CD, a video DVD, or a software CD-ROM for example, converting the extracted data into a computer-readable file format, and storing the converted data into a storage unit or the removable storage medium 40.

Further, each user device 10 is capable of using content in a scope of use conditions (for example, reproduction condition and move condition) written to the license of this content. In order to execute such content use restriction, each user device 10 has a copyright management block (or a copyright management module) for evaluating the license of content to control the processing of the content and the license thereof. This copyright management block may be configured by installing the copyright management software in the user device 10 such as the PC 10a in an ex post manner or pre-installing in the user device 10 such as the PC 10a, the PD 10b, the television receiver 10d, the recording/reproducing apparatus 10e, the stationary audio player 10f, or the car audio device 10g.

Each user device 10 evaluates the use conditions and the use statuses of the content written to the license thereof by the above-mentioned copyright management block to determine whether the use conditions are satisfied. If the use conditions are found satisfied, the user device 10 permits the use (reproduction, copy, and so on) of the content and the processing of the license (storage, copy, and move). For example, if the reproduction of the content is permitted, the user device 10 is able to obtain a key for decrypting the encrypted content key, decrypt the encrypted content key by the obtained key, and decrypt the encrypted content by the decrypted content key, thereby reproducing the decrypted content.

Further, each user device 10 is capable of transferring (move, copy, rent, and return) of content and licenses with other user devices 10 via the network 30, home network 30a, the local line 30b, or the removable storage medium 40. However, the transfer of content and licenses between user devices 10 requires that the copyright management block evaluate the move condition for example written to the license to permit the move for example of the content and the license thereof.

The distribution server 20 is made up of a computer having server capabilities and arranged on a content distribution service provider. This distribution server 20 is a server for providing content distribution services for example and, upon a distribution request from the user device 10, distributes the requested content to that user device 10 via the network 30.

For example, in the distribution of music content, the distribution server 20 is configured as an EMD server that provides electronic music distribution (EMD) services. In this case, the distribution server 20 compresses the music content subject to processing by a data compression algorithm such as ATRAC3 (Advanced Transform Acoustic Coding) or MP3 (MPEG Audio Layer-3) for example, encrypts the compressed music content by an encryption algorithm such as DES (Data Encription Standard), and distributes the encrypted music data to the user device 10. Also, the distribution server 20 distributes the license written with use conditions of that encrypted music content and an encrypted content key for decrypting the encrypted music content to the user device 10, along with the encrypted music content.

In addition, the distribution server 20 may also be configured as a server that provides created content use services for managing the use of the content created by the user device 10 by ripping or self recording for example. In this case, the distribution server 20 distributes the license written with use conditions of the created content and content key for decrypting the content to the user device 10. Consequently, the user device 10 becomes ready for using (reproducing or copying for example) the content created by itself by ripping for example on the basis of the license and the content key obtained from the distribution server 20.

It should be noted that, in the example shown in FIG. 2, content, a license thereof, and a content key for example are provided by the distribution from a service provider by the distribution server 20 through the network 30 to the user device 10, however the present embodiment is not restricted to this configuration. For example, content, a license thereof, and a content key for example may be provided to the user device 10 via the removable storage medium 40 such as DVD, CD, MD, or semiconductor memory.

The network 30 is a communication network for communicably interconnect the user device 10 and the distribution server 20. The network 30 is based on public line networks such as the Internet, a telephone line network, or a satellite communication network or a dedicated line network such as WAN, LAN or IP-VPN for example, in a wired or wireless manner.

Further, the network 30 includes a private network such as the home network 30a and the local line 30b. From the viewpoint of copyright management, the private network is a network for interconnecting a plurality of user devices 10 that commonly has content within a scope of private use. Specific examples of such a private network include the home network 30a which is LAN for interconnecting a plurality of user devices 10 for use within a house whole of limited users and a LAN for interconnecting a plurality of user devices 10 for use in a small-sized, limited group (offices or friends).

For example, the home network 30a installed in a user's home shown in FIG. 2 interconnects the PC 10a, the home server 10c, the television receiver 10d, the recording/reproducing device 10e, and the stationary audio player 10f. The home server 10c has hub, router, and gateway capabilities to manage the communication between the user device 10 in the user's home and the outside.

The local line 30b is a cable for interconnecting a plurality of user devices 10 and is made up of a USB (Universal Serial Bus) cable, a SCSI (Small Computer System Interface) cable, an IEEE 1394 cable, or a mini plug. Connecting the PD 10b and the PC 10a through the local line 30b allows the communication of various kinds of data like content between the PD 10b and the PC 10a. It should be noted that the user devices 10 may be interconnected in a wireless manner.

For example, in the user home shown in FIG. 2, PC 10a and the PD 10b are interconnected by the local line 30b. In the user's villa, the PC 10a and the stationary audio player 10f are interconnected by the local line 30b. In the car, the car audio device 10g and the PD 10b are interconnected by the local line 30b.

The removable storage medium 40 is a storage device capable of storing various kinds of data including content, licenses, and content keys and is made up of any one of optical disks 3 such as DVD-R, DVD-RW, DVD-RAM, CD-R, CD-RW, and magneto-optical disk, magnetic disks such as flexible disk and hard disk drive, and various types of semiconductor memories. It should be noted that the removable storage medium 40 may be a storage medium having a copyright management capability for restricting the use of content by means of an encryption key for example.

The user devices 10 may mutually transfer content, licenses, and content keys via the removable storage medium 40 without use of the network 30. Also, the removable storage medium 40 may be loaded on a content vending terminal (not shown) installed at the vendor to store the purchased content and license into the removable storage medium 40. Consequently, the purchased content and so on may be provided to the user device 10 by means of the removable storage medium 40.

With the copyright management system 100 thus configured, the copyright management block having the above-mentioned component or modular configuration on a license processing basis (or on a content use restriction function basis) is installed on each user device 10 in accordance with the type and so on of each user device 10. Therefore, the copyright management system 100 is advantageous in that the user is able to transfer content, licenses and content keys between the user's user devices 10 comparatively freely, thereby using the content in various forms.

To be more specific, content, licenses, and content keys (hereafter referred to as "content and so on") may be freely moved, copied, rented, and returned (hereafter generically referred to as "move" unless otherwise specified) between the user devices 10 installed with the copyright management blocks of different configurations. A communication route that is used for this processing are the network 30, the home network 30a, and the local line 30b. For example, in the user's home, content and so on may be moved between a plurality of user devices 10 connected to the home network 30a regardless of device type. Also, the content and so on stored in the PC 10a may be moved to the PD 10b through the local line 30b. In addition, the content and so on stored in the PC 10a in the user's home may be moved to the user PC 10a in the remote user's villa or the car audio device 10g in the car through the network 30. Besides, content and so on may be moved, via the removable storage medium 40, between user devices 10 capable of reading and writing the removable storage medium 40. For example, the content and so on downloaded from the distribution server 20 by the mobile phone 10h may be recorded to the removable storage medium 40 for the provision to the PC 10a in the user's home.

Further, content may be remotely controlled for use between user devices 10 that are physically separated from each other. For example, the content stored in one user device 10 (for example, the home server 10c of the home network 30a) may be referenced for use, from other user devices 10 (namely, the PC 10a, the PD 10b, and the television receiver 10c, and so on connected to the home network 30a). Still further, the content and so on stored in the PC 10a may be reproduced and sounded by the stationary audio player 10f connected to the same home network 30a. Yet further, the content and so on stored in the PC 10a and the home server 10c in the user's home may be reproduced and sounded by the PC 10a in the user's villa or the car audio device 10g in the car by remotely controlling the PC 10a in the user's villa or the car audio device 10g in the car.

Thus, the copyright management system practiced according to the first embodiment of the invention, while guaranteeing the copyright management capabilities for restricting the use of content, may enhance the portability of content between various types of user devices 10, thereby enhancing user convenience and the degree of freedom of content use.

<3. Hardware Configuration of User Device>

The following described an exemplary hardware configuration of the user device 10 according to the present embodiment. In what follows, exemplary hardware configurations of the PC 10a and the PD 10b will be described as a typical example of the user device 10. It should be noted that the PC 10a and the PD 10b that are user devices 10 are configured as embodiments of the license processing apparatus of the present invention.

Figure 3:
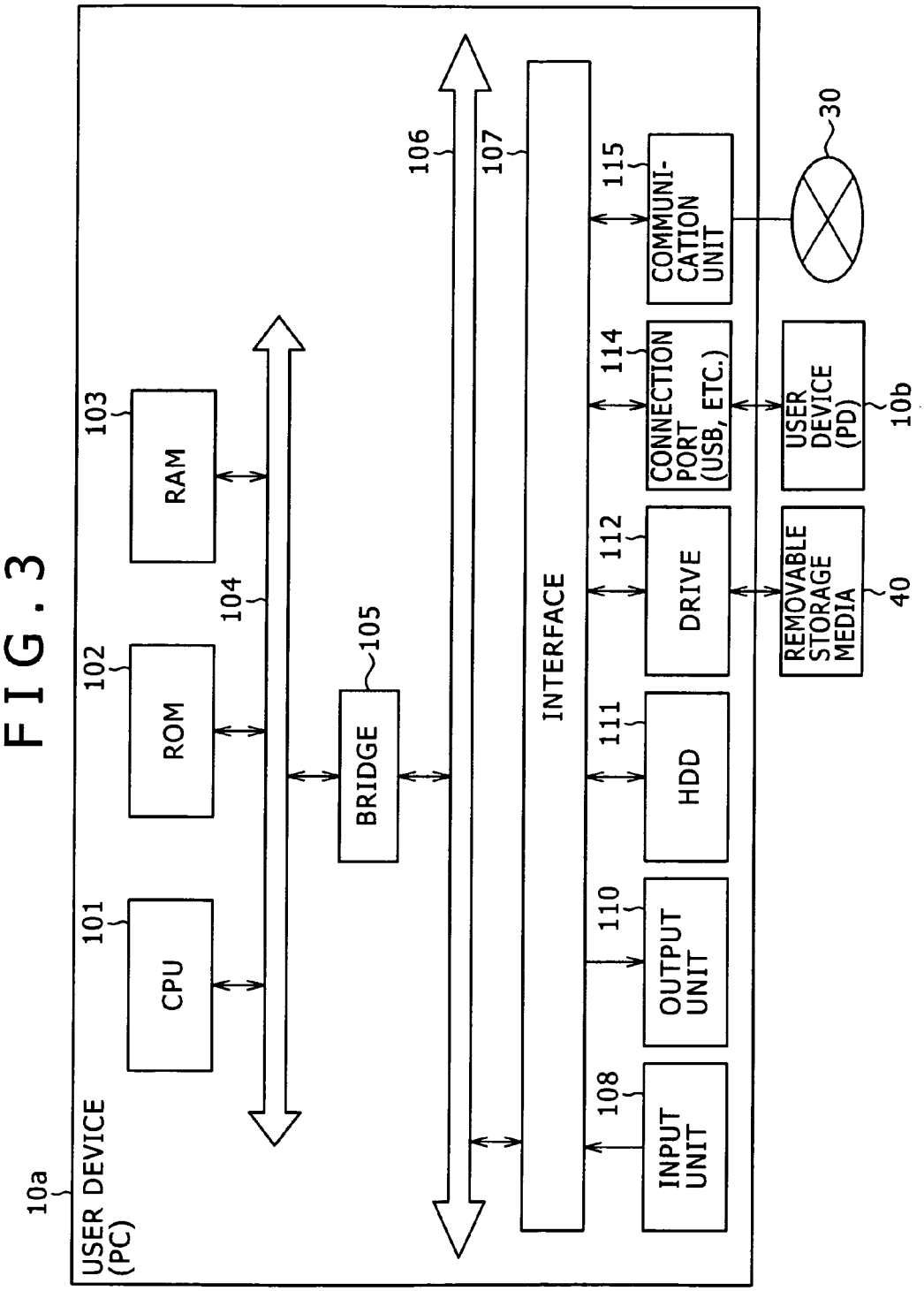
FIG. 3 is a block diagram illustrating an exemplary hardware configuration of a personal computer according to the embodiment of the invention.

First, a hardware configuration of the PC 10a according to the present embodiment will be described with reference to FIG. 3. FIG. 3 is a block diagram approximately showing an exemplary hardware configuration of the PC 10a according to the present embodiment.

As shown in FIG. 3, the PC 10a has a CPU (Central Processing Unit) 101, a ROM (Read Only Memory) 102, a RAM (Random Access Memory) 103, a host bus 104, a bridge 105, an external bus 106, an interface 107, an input unit 108, an output unit 110, a storage unit (HDD) 111, a drive 112, a connection port 114, and a communication unit 115.

The CPU 101 functions as an arithmetic processing unit and a control unit and operates as instructed by programs stored in the ROM 102 or the HDD 111, thereby controlling components of the PC 10a. To be more specific, the CPU 101 executes the processing of content encryption and decryption, the processing of generating and verifying digital signatures (such as MAC (Message Authentication Code)) for preventing data alteration and verifying data, the processing of authentication and session key sharing at the time of inputting/outputting content and so on to be executed with other connected user devices 10, the processing of controlling the inputting/outputting of content, licenses, and content keys, and the processing of copyright management such as license evaluation, for example.

The ROM 102 stores programs for use by the CPU 101 and computation parameters, for example. The ROM 102 is also available as a storage device for storing content, licenses, and content keys, for example. The RAM 103 temporarily stores programs for use at the execution by the CPU 101 and parameters that change from time to time during that execution. The CPU 101, the ROM 102 and the RAM 103 are interconnected through the host bus 104 based on a CPU bus for example.

The host bus 104 is connected to the external bus 106 such as PCI (Peripheral Component Interconnect/Interface) through the bridge 105.

The input unit 108 is based on operator devices such as mouse, keyboard, touch panel, buttons, switches, and levers for example and an input control circuit for generating input signals and supplies them to the CPU 101. The user of the PC 10a operates the input unit 108 to enter various kinds of data into the PC 10a and give instructions thereto for necessary processing operations.

The output unit 110 is made up of a display device such as a CRT (Cathode Ray Tube) display, a LCD (Liquid Crystal Display), and/or indicators such as lumps and an audio output device such as a speaker, for example. The output unit 110 outputs the reproduced content for example. To be more specific, the display device displays the reproduced video content in text or in image in a moving picture or a still picture. The audio output device sounds audio content.

The HDD 111 is a data storage device configured as one example of a storage device of the PC 10a according to the present embodiment of the invention. The HDD 111 stores programs (the above-mentioned copyright management software for example) to be executed by the CPU 101 and various kinds of data. The HDD 111 also stores various kinds of data such as content, licenses, and content keys, for example.

The drive 112 is a storage media reader/writer arranged internal or external to the PC 10a. The drive 112 records and/or reproduces various kinds of data such as content, licenses, and content keys for example on removable storage medium 40 such as magnetic disk (including HD), optical disk (including CD and DVD), magneto-optical disk (including MO), or a semiconductor memory loaded on the PC 10a.

To be more specific, the drive 112 reads data from the removable storage medium 40 and supplies the data to the RAM 103 via the interface 107, the external bus 106, the bridge 105, and the host bus 104. The CPU 101 stores the supplied data to the ROM 102 or the HDD 111 as required. On the other hand, the drive 112 receives data from the ROM 102 or the HDD 111, newly generated data, and data received from an external device and writes the data to the removable storage medium 40.

The connection port 114 connects the PC 10a with external peripheral devices such as other user devices 10 for example and has connection terminals such as USB and IEEE 1394 for example. The connection port 114 is connected to the CPU 101 and so on via the interface 107, external bus 106, the bridge 105, and the host bus 104. By this connection port 114, the PC 10a is connected to the PD 10b and so on via the local line 30b for the communication of various kinds of data.

The communication unit 115 is a communication interface made up of a communication device for the connection to the network 30 (including the home network 30a), for example. The communication unit 115 transmits and receives various kinds of data such as content, a source ID list L, a group certificate G, and control signals with external devices such as other user devices 10 and distribution server 20.

Figure 4:
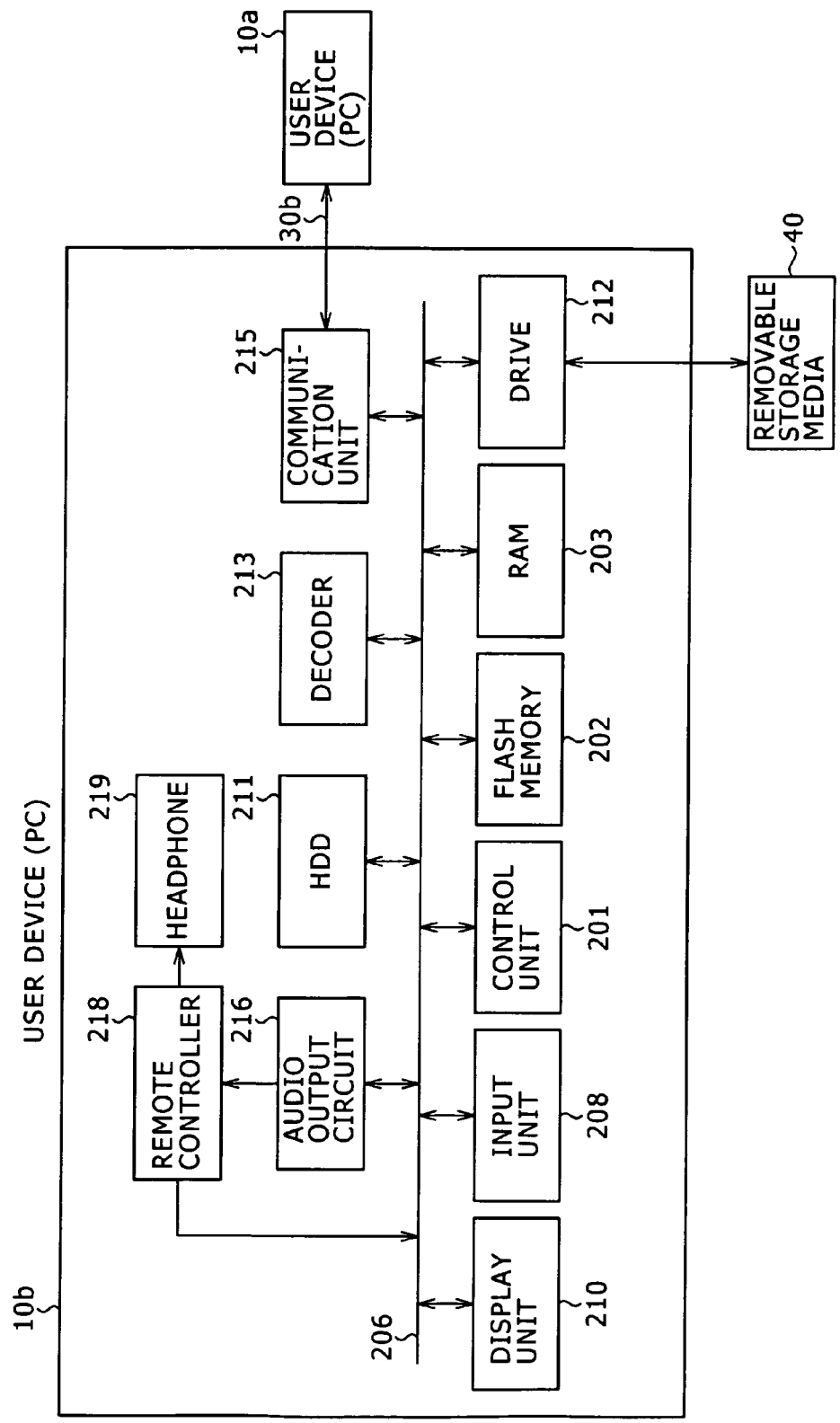
FIG. 4 is a block diagram illustrating an exemplary hardware configuration of a portable device according to the embodiment of the invention.

The following describes a hardware configuration of the PD 10b according to the first embodiment of the invention with reference to FIG. 4. FIG. 4 is a block diagram approximately showing an exemplary hardware configuration of the PD 10b.

As shown in FIG. 4, the PD 10b has a control unit 201, a flash memory 202, a ram 203, a bus 206, an input unit 208, a display unit 210, a HDD 211, a drive 212, a decoder 213, a communication unit 215, an audio output circuit 216, a remote controller 218, and a headphone 219.

The control unit 201 operates as instructed by programs stored in the flash memory 202 or the HDD 211 for example, controlling components of the PD 10b. The flash memory 202 stores programs specifying operations of the control unit 201 and various kinds of data, for example. The ROM 102 may also be available as a storage device for storing content, licenses, and content keys, for example. The RAM 203 is made up of an SDRAM (Synchronous DRAM) and temporarily stores various kinds of data associated with the processing by the control unit 201.

The bus 206 is a data line interconnecting the control unit 201, the flash memory 202, the RAM 203, the input unit 208, the display unit 210, the HDD 211, the drive 212, the decoder 213, the communication unit 215, and the audio output circuit 216, and the remote controller 218.

The input unit 208 and the remote controller 218 are each made up of an operator device based on a touch panel, button keys, levers, and dials and an input control circuit for generating input signals as specified by the user and supplying them to the control unit 201. The user of the user device 10 operates the input unit 208 or the remote controller 218 to be described later to enter various kinds of data into the user device 10 and gives instructions thereto.

The display unit 210 is made up of an LCD panel and an LCD control circuit, for example. The display unit 210 displays various kinds of information in text or image as controlled by the control unit 201.

The HDD 211 is a data storage device configured as one example of a storage device of the PD 10b according to the present embodiment of the invention. The HDD 211 is based on a hard disk drive (HDD) having a storage capacity of several tens of GB for example and stores content, licenses, content keys, programs to be executed by the control unit 201, and various kinds of data. The PD 10b having the HDD 211 thus configured is configured as a content recording/reproducing device capable of recording and reproducing content. Consequently, not only the content provided from the PC 10a via the removable storage medium 40 but also the content received from the PC 10a and so on via the local line 30b may be stored in the HDD 211 for reproduction. However, the present embodiment is not restricted to this configuration. For example, the PD 10b may be configured as a content reproduction-only device without having the HDD 211. In this case, the PD 10a may only reproduce content read from the removable storage medium 40 for example (not recordable).

The drive 212 is a recording media reader/writer and incorporated in the PC 10a. The drive 212 records and/or reproduces various kinds of data such as content, licenses, and content keys with the removable storage medium 40 loaded on the PD 10b. The decoder 213 decodes the encrypted content, executes surround processing on the decoded content, and converts the processed content into PCM data, for example.

The communication unit 215 is made up of a USB controller and a USB terminal for example and transmits and receives various kinds of data such as content, licenses, content keys, and control signals with the user device 10 such as the PC 10a connected by the local line 30b such as a USB cable for example.

The audio output circuit 216 amplifies the analog audio data obtained by decoding the encrypted content by the decoder 213 and D/A converted by the control unit 201 and outputs the amplified analog audio data to the remote controller 218. The analog audio data is then outputted from the remote controller 218 to the headphone 219 to be sounded from a speaker (not shown) incorporated in the headphone 219.

Thus, the exemplary hardware configurations of the PC 10a and the PD 10b that are examples of the user device 10 have been described with reference to FIGS. 3 and 4. However, the user device 10 that uses content is not restricted in configuration to the above-mentioned examples of the PC 10a and the PD 10b. For example, the PC 10a an the PD 10b may also be configured by any of the home server 10c, the television receiver 10d, the recording/reproducing device 10e, the stationary audio player 10f, the car audio device 10g, and the mobile phone 10h as shown in FIG. 2 or any of other electronic devices and information processing devices. Therefore, the user device 10 may have a hardware configuration unique to itself and execute processing in accordance with the unique hardware configuration.

However, the user device 10 that is a license processing apparatus for processing licenses for controlling the use of content has the above-mentioned copyright management block (or the copyright management module). To be more specific, the user device 10 has a storage device for storing a copyright management program and a processor for processing this program, evaluates the use conditions of each license to determine whether the content may be used on itself, and, if the content is found usable, executes the use of the content.

<4. Functional Configuration of the Copyright Management Block>

Figure 5:
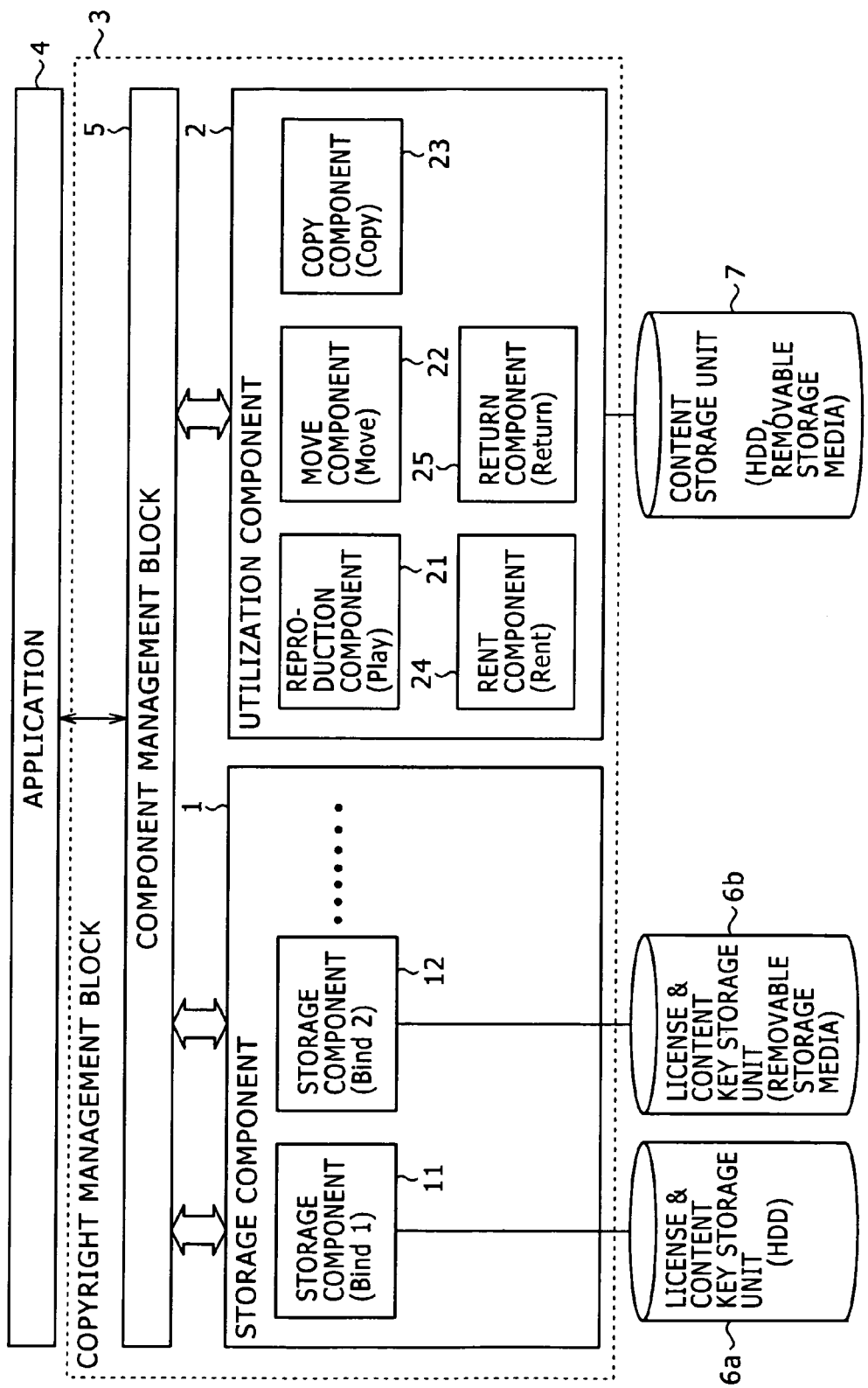
FIG. 5 is a block diagram illustrating a functional configuration of a copyright management block of a user device for example according to the embodiment of the invention.

The following describes a functional configuration of a copyright management block (or the copyright management module) 3 of the user device 10 practiced as the first embodiment of the present invention with reference to FIG. 5. FIG. 5 is a block diagram showing a functional configuration of the copyright management block 3 of the user device 10.

As shown in FIG. 5, the copyright management block 3 is connected to an application 4 for using content. The application 4 has a user interface function and a function of actually using content. To be more specific, as the user interface function, the application 4 accepts content use requests from user and displays various kinds of operator screens on a display device. As the content use function, the application 4 executes the reproduction of content or moves content between a plurality of the user devices 10 (for example, the PC 10a and the PD 10b) or different storage devices (for example, the HDD 111 and the removable storage medium 40) in the same user device 10, for example. This use of content by the application 4 is controlled by the copyright management block 3.

The copyright management block 3 has a plurality of the above-mentioned license processing components and a component management block 5 for controlling these license processing components. Each license processing component is a module obtained in accordance with a processing unit (or each use restriction function) in which licenses are dynamically processed. Each license processing component has a function of processing (or evaluating, transmitting, etc.) of licenses and content keys for controlling the use (or reproduction, move, etc.) of content and a function of securely storing licenses and content keys in a storage device.

In the copyright management block 3, the information about license (licenses themselves and content keys) is securely transferred between the license processing components on the basis of the control by the component management block 5 to transmit the proper data to a proper license processing component, thereby controlling the use of content.

Each of above-mentioned license processing components is divided into the storage component (or the storage module) 1 and the use component (or the utilization module) 2 as described above.

First, the storage component 1 will be described in detail. The storage component 1 has a function of securely storing licenses and content keys in a storage device. To be more specific, the storage component 1 executes the processing of storing licenses and content keys in the HDD 111 or the removable storage medium 40 for example such that the correlation between these content keys, licenses and content be guaranteed (the above-mentioned requirement 3), while maintaining the secrecy of content keys (the above-mentioned required 1) and the security of licenses (the above-mentioned requirement 2) (this processing is referred to as bind processing). Further, the storage component 1 executes the processing of reading licenses and content keys from a storage device, rewriting licenses and content keys stored in a storage device, or deleting licenses and content keys from a storage device, in addition to the above-mentioned bind processing.

Because its portion for storage device reading and writing depends on the installation environment, the storage component 1 is arranged for each of storage devices having different storage schemes. Hence, basically, one type of the storage component 1 corresponds to one type of storage device. To be more specific, the storage component 1 is arranged for each type and specification (for example, ordinary semiconductor memory, semiconductor memory with copyright management function, CD, and DVD) of the removable storage medium 40 and for each of HDDs (for example, the HDD 111 of the PC 10a and the HDD 211 of the PD 10b) of different types of user devices 10.

In the example shown in FIG. 5, a license & content key storage block 6a based on a HDD corresponds to a storage component for HDD (bind 1) 11 for storing licenses and content keys and a license & content key storage block 6b based on the removable storage medium 40 corresponds to a storage component (bind 2) 12 for removable media for storing licenses and content keys.

The storage component 1 thus configured stores (or binds) licenses and content keys as securely related with a storage device such that the stored licenses and content keys be not altered or exposed to the third party. The following describes specific procedures for this secure storage method.

For example, the storage component 1 may generate, separate from a normal storage area in which content and so on are stored, a confidential storage area, in a corresponding storage device, inaccessible by other than the storage component 1, thereby storing licenses and content keys in the generated confidential storage area. Consequently, only the user authenticated by the copyright management block 3 may access the licenses and content keys stored in this confidential storage area, thereby guaranteeing the secrecy of content keys and the confidentiality of licenses. This approach is effective if the storage device concerned is an optical disk such as DVD.

Also, the storage component 1 may encrypt licenses and content keys by a storage secret key (namely, a secret media key for preventing alteration) that can be handled only by the storage component and store the encrypted licenses and content keys in the corresponding storage device. Consequently, although the licenses and content keys in the storage device may be accessed, these licenses and content keys may not be used unless decrypted by the above-mentioned storage secret key, thereby guaranteeing the secrecy of content keys and the confidentiality of licenses. This approach is effective if the storage device is a semiconductor memory for example.

The following describes the use component 2. the use component 2 has a function of evaluating various use conditions (reproduction condition and move condition for example to be described later) written to each license by entering a license and a content key, and, if required, content, thereby controlling the use of content. Some types of the use component 2 may update licenses in accordance with how the use of content is controlled, outputting the updated license.

Further, the use component 2 is connected to a content storage block 7 based on a HDD or the removable storage medium 40 for example and is capable of reading content from the content storage block 7 for processing. However, the use component 2 cannot obtain licenses and content keys directly from the license & content key storage block 6, so that the use component 2 must rely on the storage component 1 for obtaining licenses and content keys from the license & content key storage block 6. In other words, the use component 2 has no functions of reading, writing, and storing licenses and content keys with a storage device. Therefore, the use component 2 processes the licenses and content keys read by the storage component 1 from the license & content key storage block 6 and transmitted to the use component 2 and transmits the processed licenses and content keys to the storage component 1 as required, making the storage component 1 write the processed licenses and content keys to the storage device.

The use component 2 thus configured is arranged for at least each of content use cases (or operations). The following describes types of uses cases of content. The content use cases include "reproduction" in which content is outputted in the form of sound or video, "move" in which content is moved (master copy transfer) between user devices 10 or storage devices, "copy" in which content stored in a certain storage device is copied (copy transfer) to be stored in another storage device, "rent" in which content is rented between user devices 10 or storage devices, and "return" in which content rented between user devices 10 or storage devices is returned to the rent source, for example.

It should be note that type "reproduction" includes normal-speed reproduction, normal-speed reverse reproduction, fast forward reproduction, rewind reproduction, fast forward, rewind, pause, and seek. The above-mentioned "rent" is equivalent to "check-out" of SDMI and the above-mentioned "return" is equivalent to "check-in" of SDMI.

In order to control each use (or operation) of each component described above, the present embodiment has, as a specific example of the use component 2, a reproduction (or play) component 21, a move component 22, a copy component 23, a rent component 24, and a return component 25.

The reproduction component 21 evaluates reproduction conditions written to the license to control the reproduction of content. The reproduction component 21 is divided into two types depending on the reproduction control involving license update and the reproduction control not involving license update, details of which will be described later.

In order to control the move of content, the move component 22 evaluates move conditions written to the license corresponding to this content, thereby controlling the move (or transfer of master copy) of the license and the content key between user devices 10 or storage devices. For example, if the move component 22 permits the move of a license and a content key between the storage devices of a move source and a move destination, the move of the content corresponding to that license is also permitted between these storage devices.

In order to control the copy of content, the copy component 23 evaluates copy conditions written to the license corresponding to this content, thereby controlling the copy (or transfer of copy) of the license and the content key between user devices 10 or storage devices. For example, if the copy component 23 permits the copy of a license and a content key between the storage devices of a copy source and a copy destination, the copy of the content corresponding to the license is also permitted between these storage devices.

In order to control the rent of content, the rent component 24 evaluates rent conditions written to the license corresponding to this content, thereby controlling the rent of the license and the content key between user devices 10 or storage devices. For example, if the rent component 24 permits the rent of a license and a content key between the storage devices of a rent source and a rent destination, the rent of the content corresponding to the license is also permitted between these storage devices.

In order to control the rent of content, the return component 25 evaluates return conditions written to the license corresponding to this content, thereby controlling the return of the license and the content key between user devices 10 or storage devices. For example, if the return component 25 permits the return of a license and a content key between the storage devices of a rent source and a rent destination, the return of the content corresponding to the license is also permitted between these storage devices.

Thus, the five types of use component 2 have been described. It should be noted that the use component 2 for controlling the content use of the same type may be arranged in plural in accordance with portions dependent on installation environment. For example, two or more reproduction components 21 may be arranged for decoder types.

The license processing components each composed of the above-mentioned storage component 1 and use component 2 controls the use of content by mutually transferring licenses and content keys as described above with reference to FIG. 1. For the transfer of licenses and content keys as described above, the license processing components pass messages to each other in accordance with a particular protocol. Each of these messages includes:

(1) a license;
(2) a content key;
(3) transmission type identification information indicative of a license transmission type (namely, the type of message); and
(4) component attribute information indicative of the attribute of the license processing component of the message transmission source.

Of these messages, (3) and (4) are data for guaranteeing the proper transmission of a license and a content key to a proper license processing component, details of which will be described later.

The following describes the component management block 5. The component management block 5 has a function of executing the control of content use by using necessary license processing components in accordance with a content use request made by the application 4. Basically, the component management block 5 uses one use of component 2 and one or more of storage components 1 for one content use request to control the requested use of content. The following describes basic operations of the component management block 5.

First, the component management block 5 determines license processing components to be used for content use control processing. To be more specific, upon reception of a content use request from the application 4, the component management block 5 determines the use component 2 for the use control of the requested content and the storage component 1 for storing the license and the content key necessary for the use control of the content. Next, the component management block 5 transmits a load command to the determined storage component 1 and use component 2, thereby loading (or starting up) these components.

Next, the component management block 5 gives a command to the loaded storage component for the creation of a message according to the use of the content and obtains a message from the loaded storage component 1. At this moment, in accordance with the content use, the component management block 5 may give a command for invalidating (or deleting) the license and content key stored in the storage component 1. For example, in the case of the move of content, the component management block 5 gives a command to the storage component 1 to delete the license and content key stored therein and then transmit a message for transfer.

Further, the component management block 5 transfers the message obtained from the storage component 1 to the use component 2. After checking the received message for validity, the use component 2 evaluates use conditions written to the license to determine whether the content is usable or not. If the content is found usable, the component management block 5 gives a command to the application for the use of content. It should be noted that if the use component 2 is the move component 22 for example, the component management block 5 transmits a message to other storage components 1 to move also the corresponding licenses and content keys in accordance with the move of the content.

Thus, the component management block 5 controls the requested content use by functioning the necessary two or more license processing components in accordance with a content use request to transfers licenses and the content keys between these license processing components.

Figure 6:
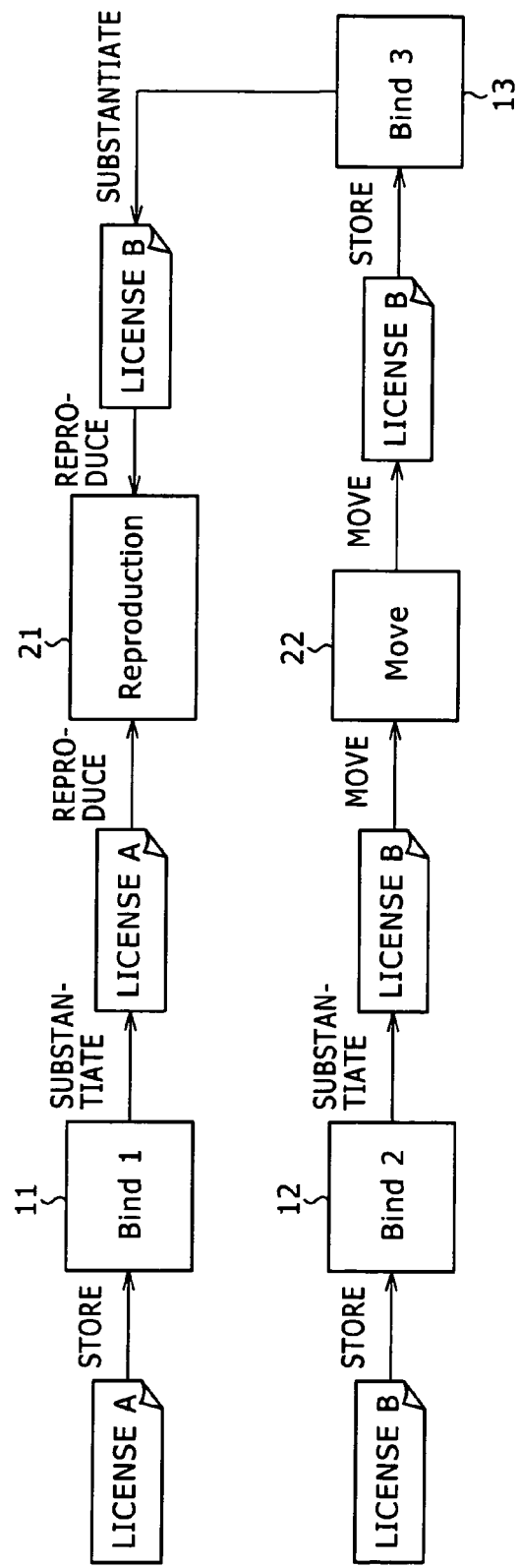
FIG. 6 is a block diagram illustrating an exemplary configuration in which licenses are transferred between license processing components according to the embodiment of the invention.

The following describes a specific example of content use control to be executed by transferring licenses between the license processing components according to the first embodiment of the invention, with reference to FIG. 6. FIG. 6 shows an exemplary configuration in which licenses are transferred between license processing components according to the present embodiment.

As shown in FIG. 6, it is assumed that three storage components 11, 12, and 13, one reproduction component 21, and one move component 22 be in a connectable state. The connection route here is realized by a bus for example in the case of connection inside the same user device 10 or by the network 30, the home network 30a, or the local line 30b in the case of connection between different two or more user devices 10.

By use of a encryption technology and storage devices having confidential storage areas, the storage components 11, 12, and 13 are capable of securely storing licenses in these storage devices. The storage component 1 reads a license from the storage device thereof, substantializes (or validates) the license so that it becomes interpretable by the use component 2, and transmits the substantialized license to the use component 2.

For example, as shown in FIG. 6, the storage component 11 substantializes license A stored therein and transmits substantialized license A to the reproduction component 21. The reproduction component 21 evaluates reproduction conditions written to license A received from the storage component 11 to control the reproduction of the content corresponding to license A.

The storage component 12 substantializes license B stored therein and transmits substantialized license B to the move component 22. The move component 22 evaluates move conditions written to received license B to determine whether license B may be moved and whether the content corresponding to license B may be moved. If license B and the content corresponding thereto are found movable, the storage component 12 transmits license B to the storage component 13. The storage component 13 evaluates storage conditions written to received license B and, if license B is found storable, the storage component 13 secure stores (or binds) license B into the corresponding storage device. Further, upon reception of a command for transmission, the storage component 13 substantializes license B stored therein and transmits substantialized license B to the reproduction component 21. The reproduction component 21 evaluates reproduction conditions written to the transmitted license B to control the reproduction of the content corresponding to license B.

Thus, licenses are transferred between the storage component 11, storage component 12 and storage component 13, and between the use components such as the reproduction component 21 and move component 22 to control one case of content use. Namely, controlling the use of content requires that at least one storage component 1 and one use component 2 function in a cooperative manner.

Figure 7:
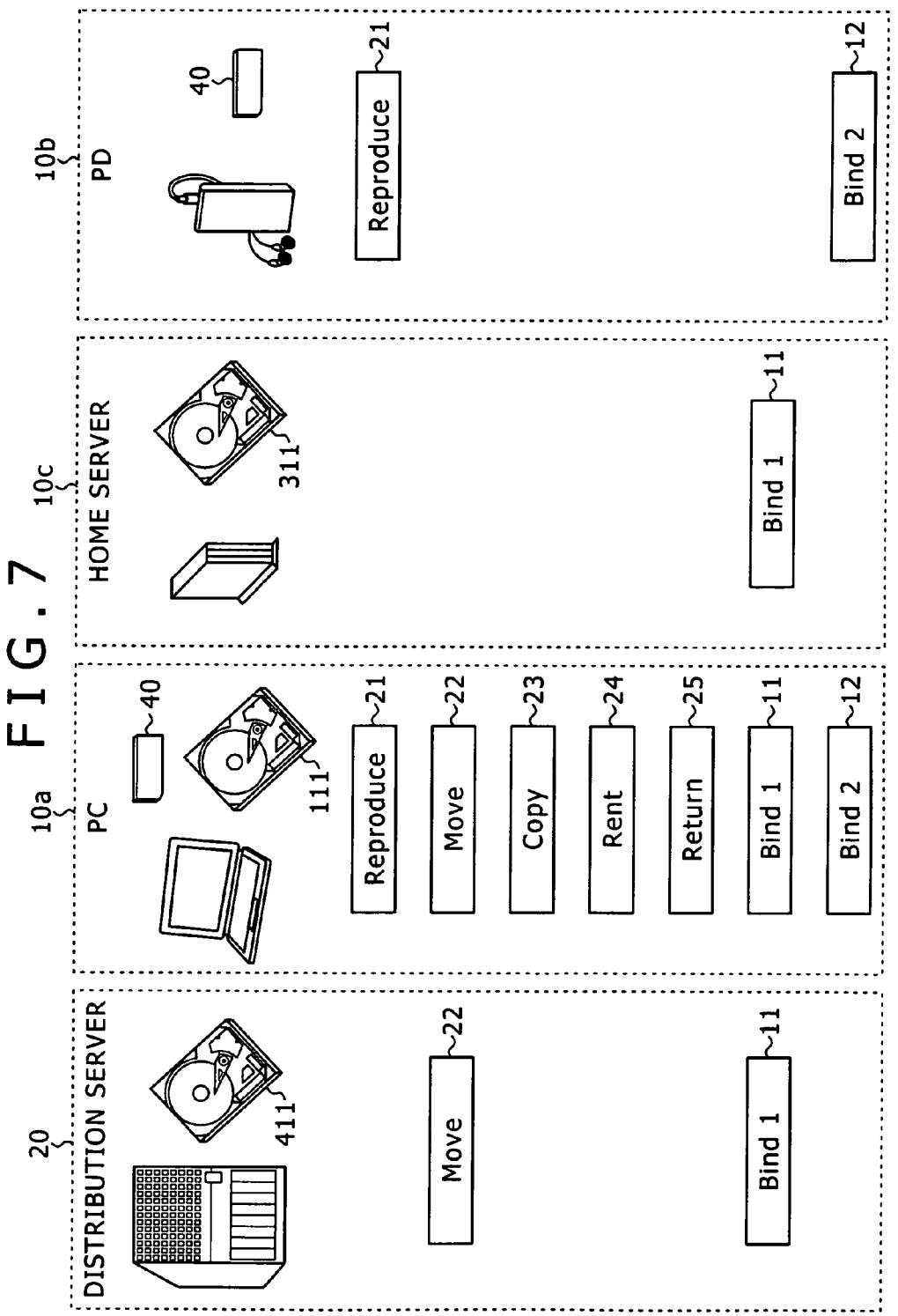
FIG. 7 is a schematic diagram illustrating installations of license processing components configuring a copyright management block according to the embodiment of the invention.

The following describes an exemplary installation of license processing components making up the copyright management block 3 according to the present embodiment, with reference to FIG. 7. FIG. 7 shows an exemplary installation of license processing components making up the copyright management block 3.

To be more specific, FIG. 7 shows the license processing components of the distribution server 20, the PC 10a, the home server 10c, and the PD 10b among the above-mentioned devices shown in FIG. 2, as an exemplary configuration of a license processing apparatus on which license processing components are installed.

On these devices, the above-mentioned various types of license processing components are arranged in a distributed manner. To be more specific, the distribution server 20 has the move component 22 and the storage component 11 for the HDD 411. The PC 10a has the reproduction component 21, the move component 22, the copy component 23, the rent component 24, the return component 25, the storage component 11 for the HDD 111, and the storage component 11 for the removable storage medium 40. The home server 10c has the storage component 11 for the HDD 311. The PD 10b has the reproduction component 21 and the storage component 12 for the removable storage medium 40.

In the above-mentioned exemplary installation of license processing components, combining the license processing components arranged in the user device 10 and the distribution server 20 allows the use of content in a variety of cases while executing copyright management.

For example, combining the storage component 11 and the move component 22 of the distribution server 20 and the storage component 11 of the PC 10a allows the distribution (or move) of the content and the license and so on stored in the distribution server 20 to the PC 10a to store the distributed content and the license and so on into the HDD 111 of the PC.

Combining the copy component 23 and the storage component 11 of the PC 10a with the storage component 11 of the home server 10c allows the copying of the content and licenses and so on stored in the HDD 111 of the PC 10a to the home server 10c to store the copies into a HDD 311 of the home server 10c. Further, combining the storage component 11 with the reproduction component 21 of the PC 10a allow the reproduction of content stored in the PC 10a.

Combining the rent component 24, the storage component 11 and the storage component 12 in the PC 10a allows the renting of the content and the license and so on stored in the HDD 111 of the PC 10a to the removable storage medium 40 of the PC 10a to store them therein. Further, combining the reproduction component 21 of the PD 10b with the storage component 12 after loading the removable storage medium 40 on the PD 10b allow the reproduction of the content stored in the removable storage medium 40 on the PD 10b.

Thus, the functional configuration of the copyright management block 3 for use in the copyright management system 100 practiced as the present embodiment of the invention has been described. As described above, building the copyright management block 3 by dividing into a plurality of license processing components by the license processing unit suitable for each content use case enhances the universality and expandability of the copyright management block 3. Consequently, when the copyright management block 3 is designed for and installed on various types of user devices 10, content and licenses and so on may be transferred between user devices 10 having different installations of the copyright management block 3, thereby properly executing the use of content and the restriction thereof.

<5. Data Configuration>

Figure 8:
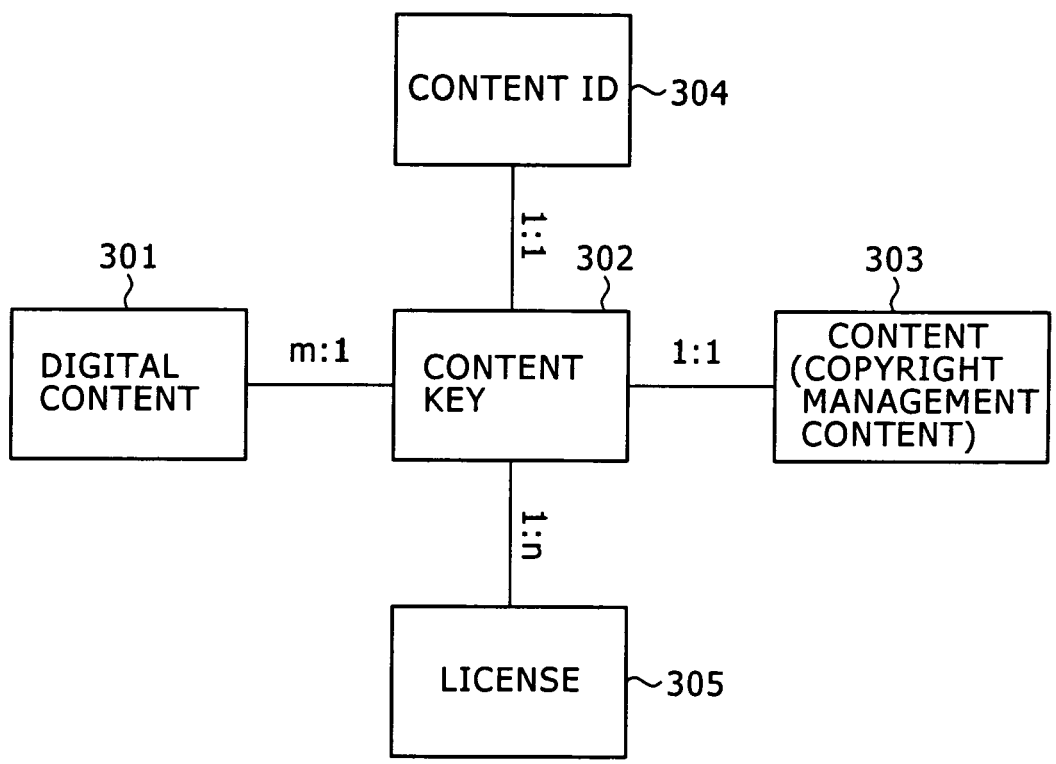
FIG. 8 is a block diagram illustrating correlation between basic data handled in the copyright management system according to the embodiment of the invention.

The following describes a basic data configuration in which data is handled by the copyright management system 100 according to the present embodiment with reference to FIG. 8. FIG. 8 shows the correlation of the basic data to be handled by the copyright management system 100.

As shown in FIG. 8, the data to be handled by the copyright management system 100 is mainly composed of digital content 301, a content key 302, content (or copyright-managed content) 3, a content ID 304, and a license 305.

(Digital Content 301)

The digital content 301 denotes digital data such as video, audio, and text that are subject to copyright management. To be more specific, the digital content 301 includes audio data such as music, talks, and radio programs, video data such as movies, television programs, video programs, photographs, paintings, and graphics, still or moving, and electronic books (E-books), games, and software. In the present embodiment, the music data distributed from the distribution server 20 or the music data ripped from CDs for example are mainly used as an example of the digital content 301 in description; however, the digital content 301 is not limited to these pieces of data. The copyright management system 100 generates the copyright-managed content 303 by encrypting the digital content 301 and executes the copyright management in the system.

(Content Key 302)

The content key 302 is a content cryptographic key for decrypting the encrypted content 303. For example, the content key 302 is based on a key ring that is a set of one or more secret keys. For example, a specific example of the content key 302 is a set of a secret key for decrypting encrypted audio data and a secret key for decrypting encrypted fringe data. Another specific example of the content key 302 is a set of secret keys that are used for the encryption of video data divided in a time dependent manner.

As described above, the copyright management system 100 according to the present embodiment encrypts the digital content 301 by use of a secret key so as to ensure the secrecy of the digital content 301. At this moment, the relationship of the digital content 301 to secret key is equal to m to n, so that one piece of digital content 301 may be encrypted by a plurality of secret keys or a plurality of pieces of the digital content 301 may be encrypted by a single secret key. A set of these secret keys is defined as the content key 302. Consequently, the relationship of the digital content 301 to the content key 302 becomes equal to m to 1. In the copyright management system 100, the content key 302 is regarded as equal to one piece of copyright-managed content 303 and handled as the control unit based on use conditions.

(Content 303)

The content 303 is a set of digital content 301 (copyright-managed content) encrypted by one content key 302. Consequently, the relationship of the content key 302 to the content 303 is equal to one to one. Terms "content 303" or "content" as used herein denotes the copyright-managed content that is a set of digital content 301 encrypted by the content key 302. The use of the content 303 is controlled by the copyright management block 3, however, as far as the license 305 and the content key 302 are securely managed, the content 303 itself need not always be managed in a secure manner.

(Content ID 304)

The content ID 304 is an identifier that is uniquely given to the content key 302. Because the relationship of the content key 302 to the content 303 is equal to one to one as described above, the content 303 may be identified by this content ID 304. Namely, the content ID 304 functions as the content identification information for identifying the content 303. When this content ID 304 and a command specifying how the content is to be used are entered, the copyright management block 3 according to the present embodiment may control the use of the content 303.

(License 305)

The license 305 is electronic data representative of the use right of the content 303. The license 305 describes the use (reproduction, move, or rent) of the content 303 and the use conditions and use statuses associated with the transmission of the content 303, content key 302, and the license 305. The license 305 is given to the content key 302, defining a plurality of licenses 305 for one content key 302. Therefore, the relationship of the content key 302 to the content 303 to the license 305 is equal to one to one to n.

It should be noted that reference numerals 301 through 305 are assigned to digital content, content key, content, contend ID, and license for the sake of description, however, in other portions hereof, these words may be used without reference numerals. Each word used without reference numeral substantially is the same in meaning as the corresponding word defined above.

<6. License Description>

The following describes specific examples of license descriptions according to the present embodiment with reference to FIGS. 9 through 12. FIGS. 9 through 12 shows specific examples of license descriptions according to the present embodiment, showing licenses usable for content move, copy, rent, and return control, respectively.

As shown in FIGS. 9 through 12, each license is written with the information necessary for controlling the use (reproduction, move, rent, etc.) of content. In the examples shown in these figures, each license is written, but not exclusively, in XML (extended Markup Language).

The license in these examples is composed of a license information description section 501 in which the information about the license is written and a use condition description section 502 in which use conditions of this license are written.

The license information description section 501 describes a content ID indicative of the content to be controlled by the license and indicative of the content key and copyright holder information that is the identification information indicative of a person or a corporation (a service provider for example) that is the copyright holder of the content. The content ID is written in a portion enclosed by <U_ContentID> tags and the copyright holder information is written in a portion enclosed by <Legal Copyright> tags. Writing the content ID to the license allows the relating of the license with the content and content key corresponding to this license. It should be noted that a license issue date for example may be written to the license information description section 501 as the license information.

The use condition description section 502 describes the use condition information of the content for each content use case (or operation contents), namely for each license processing component. To be more specific, as shown in FIGS. 9 through 12, the use condition description section 502 is divided into a reproduction condition description section 521, a move condition description section 522, a copy condition description section 523, a rent condition description section 524, a return condition description section 525, and a storage condition description section 511.

Thus, describing the use conditions in a divided manner in accordance with the processing functions of the license processing components allows each license processing component to control the use of content by evaluating the use conditions corresponding to itself. For example, the reproduction component 21 evaluates only the reproduction condition description section 521 in the license to control the reproduction of content. The storage component 1 evaluates only the storage condition description section 511 in the license to control the storage of the license and the content key into a storage device.

The use condition description section 502 need not describes all the above-mentioned use conditions. For example, as shown in FIG. 9, the license for content move control may include at least the reproduction condition description section 521, the move condition description section 522, and storage condition description section 511. As shown in FIG. 10, the license for content copy control may include at least the reproduction condition description section 521, the copy condition description section 523, and storage condition description section 511. Further, as shown in FIG. 11, the license for content rent control (or the license of the rent source) may include at least the reproduction condition description section 521, the rent condition description section 524, and the storage condition description section 511. As shown in FIG. 12, the license for content return control (or the license for rent) may include at least the reproduction condition description section 521, the return condition description section 525, and the storage condition description section 511.

It should be noted that a license for rent shown in FIG. 12 is generated on the basis of a license for rent source shown FIG. 11. To be more specific, the license information description section 501, the reproduction condition description section 521, and storage condition description section 511 are extracted from the license of rent source and a newly generated return condition description section 525 is added to the extracted sections to generate a license for rent. When the license for rent thus generated is processed for rent, the same rent ID is written to the return condition description section 525 of the license for rent and rent condition description section 524 of the license for rent source.

The following describes the contents written to the use condition description section 502 thus configured. The use condition description section 502 is written with content use control parameters, a content use status, and a Property Selection List), for example.

Each use control parameter controls (whether or not permits or prohibits) the use of content. Namely, the content use parameters are indicative of content use limit count (namely, reproduction limit count, move limit count, copy limit count, and rent limit count), content use time limits (namely, reproduction time limit, move time limit, copy time limit, rent time limit, and return time limit), and the storage limit count and storage time limit of license and content key.

The use status (hereafter referred to as a status) is information indicative of the current state of the use of content. This status includes a reproduction status including the number of times content has been reproduced, a move status indicative of the number of times content has been moved, a copy status indicative of the number of times content has been copied, a rent status indicative of the number of times content has been rented (or checked out), and a storage status indicative of the number of times the license has been stored.

The property selection lists is used to restrict the number of license processing components permits to control the use of control by evaluating each use condition of the license. Some pieces of content are desired to be permitted for processing only on the user device 10 having a particular license processing component. To be more specific, some pieces of content may only be reproduced on the user device 10 that has the reproduction component 21 corresponding to reproduction count control. In order to satisfy thus a demand, the present embodiment writes the property selection lists to each license to limit the license processing components capable of processing licenses.

The property selection list is written to each of the use limit description blocks such as the reproduction condition description section 521 and the move condition description section 522. Each property selection list at least includes one set of property ID and an action code.

The property ID is an identifier indicative of the characteristics of each license processing component. The characteristics of the license processing component include the corporation that provided this component, the copyright management scheme on which this component is based, the content type (audio data or video data for example) to be handled by this component, the functions (use limit count function, time limit function, digital data output function, and encryption processing function, for example) of this component, and others, for example. The action describes a list interpretation method in accordance with the characteristics equivalent to the property ID of each license processing component.

Each license processing component has the property ID corresponding to the characteristic thereof and checks if the license processing component has the same property ID as the property ID written in the above-mentioned property selection list. If the license processing component has this property ID, the license processing component executes an action specified by the above-mentioned action code. The action defines various conditions, thereby controlling the content use in any license processing components.

Thus, the elements of the license have been described. The following describes, in detail, an exemplary description of the reproduction condition description section 521 of the license shown in FIG. 9. The description of the reproduction condition description section 521 of the license shown in FIG. 9 is as follows.

```
<Play>
    <PropertySelectionList>
        MagicGateVideo, 0x82;CountDownPlay, 0x81;
    </PropertySelectionList>
    <Parameter>Remain=3, </Parameter>
    <Status>Remain=2, </Status>
</Play>
```

<PropertySelectionList> describes a property selection list associated with content reproduction. For example, "MagicGateVideo" is the property ID indicative of the characteristic of the reproduction component 21 that is capable of handling the reproduction condition description section 521. "0x82" denotes an action code. This description is indicative that the processing defined in action ID "0x82" is executed for property "MagicGateVideo". It also is indicative that the processing defined in action code "0x81" is executed for reproduction count limit "CountDownPlay".

<Parameter> describes a content reproduction control parameter. To be more specific, "Remain=3" denotes a count parameter for executing reproduction count limit and is indicative that the upper limit of reproduction count is "3". As a result, the reproduction component 21 permits the reproduction of the content corresponding to this license only 3 times on the basis of this license.

<Status> describes the reproduction status indicative of a reproduction status of content. To be more specific, "Remain=2" denotes a count status indicative of the number of times the content has been reproduced so far and is indicative that the number of times content has been reproduced is "2". The reproduction component 21 determines whether this count is less than the above-mentioned upper limit. If this count is found less than the upper limit, the reproduction component 21 permits the reproduction of the content. In the example shown above, the reproduction count limit is "3", so that the content may be reproduced only once more on the basis of this license.

The following describes a technique of evaluating licenses having the above-mentioned description for example by each of the license processing components.

Each license processing component references the use condition description of the section corresponding to itself (for example, the reproduction condition description section 521 if this processing component is the reproduction component 21) among the use conditions written to the license, thereby executing content use control processing.

(1) Search the License for the Description of Use Condition:

First, the license processing component searches the license description for the use condition description of the section (in the case of the reproduction component 21, the section is reproduction condition description section 521 for example) corresponding to itself. This search operation is executed on the basis of a use condition identification code (<Play> tag for example) written to the license. If the use condition description of the corresponding section is not found in the license, then the license processing component ends the processing without permitting the use of content. On the other hand, if the use condition description of the corresponding section is found, the procedure goes to the next processing (2) below.

(2) Determination Whether to Execute Processing on the Basis of the Verification of Property Selection List:

Next, the license processing component determines whether to execute the next processing (3) by evaluating the property selection list of the use condition description corresponding to itself. To be more specific, the license processing component executes the processing that accords to the above-mentioned action depending on whether the license processing component itself has the property ID listed in the property selection list of the use condition description. The license processing component executes this processing for the property IDs contained in the property selection list, starting with the top processing and sequentially downward, to determine whether to eventually execute processing (3). Consequently, the installation of each license processing component may be checked for validity and the processing function already installed in each license processing component may be checked for validity.

(3) Determination Whether Content Use is Permitted on the Basis of Use Control Parameter and Status:

Next, the license processing component reads the use control parameter and the status values from the use condition description block and applies these values to the use determination function of the license processing component itself, thereby determining whether the use of content satisfies the condition defined in this function. If the condition is found satisfied, the use of content is permitted. If the condition is found not satisfied, the use of content is prohibited. Examples of this control use control include use count control (for example, reproduction count control, storage count control, and move count control) and use time limit control (for example, reproduction time limit control, storage time limit control, and move time limit control).

The following describes an example in which the reproduction component 21 evaluates the reproduction condition description section 521 to execute reproduction time limit control.

First, the reproduction component 21 obtains a count parameter (for example, <Parameter>Remain=3 shown in FIG. 9) from the reproduction condition description section 521 for executing reproduction count control. At this moment, if the count parameter is 0, then the reproduction component 21 does not execute reproduction count control. The reproduction component 21 permits the reproduction only when other reproduction conditions are satisfied.

Next, if the count parameter obtained above is other than 0, then the reproduction component 21 obtains a count status (for example, <Status>Remain=2> shown in FIG. 9) for indicating the number of counts to be reproduced from the reproduction condition description section 521. Further, the reproduction component 21 compares the count parameter value with the count status value.

If the count parameter value is found equal to or greater than the count status value, then reproduction component 21 permits the reproduction of content and increments the count status value by 1. On the other hand, if the count parameter value is smaller than the count status value, then the reproduction component 21 prohibits the reproduction of content.

Thus, an example of reproduction count control processing by the reproduction component 21 has been described. The use count control processing by the use component 2 or storage component 1 is substantially the same as the above-mentioned reproduction count control processing and therefore their detail description will be omitted.

It should be noted that which use control parameter or status each license processing component references depends on the installation of each license processing component rather than the contents of license description.

For example, if the reproduction component 21 has a function for reproduction count control, that reproduction component 21 references the count parameter associated with the reproduction count control of the reproduction condition description section 521 to execute reproduction permission control based on the reproduction count. At this moment, if the count parameter associated with reproduction count control is not written to the reproduction condition description section 521, then the reproduction component 21 uses a default value that may be determined reproducible.

On the other hand, if the reproduction component 21 has no function for executing reproduction count control, the reproduction component 21 executes reproduction control regardless of the reproduction control parameter if any associated with the reproduction count control of the reproduction condition description section 521.

Thus, each license processing component is configured so as to reference use control parameters and status in accordance with the installation of each license processing component independently of the contents of license description. Consequently, regardless weather or not the installation of each license processing component is, the licenses to be transferred between license processing components may be standardized.

<7. Protocol of License Transmission Between Components>

As described above, in the copyright management system 100 according to the present embodiment, licenses, content keys and so on are transferred between a plurality of license processing components that are the functional parts of the copyright management block 3, thereby controlling the use of content. At this moment, the licenses, content keys and so on must be controlled so as to be transferred between proper license processing components in a proper procedure. Otherwise, licenses and so on may be erroneously transferred between license processing components, resulting in a risk of the illegal use of content. For example, if a license and a content key are transmitted directly from a certain storage component 11 to another storage component 12 without undergoing a plurality of copy components 23, then the number of times copy has been made is not counted although there is a copy count limit as a copy condition of that license, thereby permitting the illegal copying of the license and so on.

In order to prevent this problem from occurring, the copyright management block 3 according to the present embodiment specifies a transmission protocol for transmitting licenses and so on between license processing components to surely and justly execute the copyright management capabilities.

The transmission protocol transfers a message including a license, a content key, and so on between license processing components as described above. This transmission protocol does not specify the physical format of each message in its entirety to be transferred between components, but specifies the format of data that make up each message. The definition of a data format facilitates the allocation of mutual operability between different installations of license processing components. For example, if the transfer of a license and so on is desired between a plurality of user devices 10 having different installations of copyright management blocks 3, a common data format for messages to be handled by the copyright management blocks 3 facilitates the transfer of data including licenses without involving data format conversion.

It should be noted that the physical format of message may be installation-dependent. This configuration permits the installation of the license transmission protocol suitable for the application environment. For example, it is possible to install a protocol that transmits the data making up a message in a row oriented manner as one example of installation on a communication protocol, for example. It is also possible to install a protocol by entering data making up a message into an argument when installing the protocol as a method call between classes.

The following describes, in detail, a transmission protocol for transmitting licenses between license processing components, such as mentioned above.

First, the message transmission between the license processing components according to the present embodiment will be outlined with reference to FIG. 13. FIG. 13 schematically shows the message transmission protocol for transmitting messages between the license processing components.

The message transmission will be described by use of an example in which the license 305 and the content key 302 corresponding thereto are transmitted from a license processing component 31 of the transmission source (hereafter referred to as a transmission source component 31) to a license processing component 32 of the transmission destination (hereafter referred to as a transmission destination component 32) as shown in FIG. 13, for example. It should be noted that the transmission source component 31 and the transmission destination component 32 may be the storage component 1 or the use component 2, if the transmission source component 31 is the storage component 1, the transmission destination component 32 is the use component 2 and, if the transmission source component 31 is the use component 2, then the transmission destination component 32 is the storage component 1.

In the license transmission protocol according to the present embodiment, a message 400 having a predetermined data format is transmitted from the transmission source component 31 to the transmission destination component 32. This message 400 includes transmission type identification information 310, component attribute information 320, transmission-subjected license 305, and the content key 302 corresponding to this license 305. Transmitting the message 400 thus configured allows the transmission of these four pieces of data in a correlated manner by attaching the transmission type identification information 310 and the component attribute information 320 to the license 305 and the content key 302.

The transmission type identification information 310 is indicative of the type (transfer, show, update 1, update 2, or update 3) of transmission of the license 305 in between the transmission source component 31 and the transmission destination component 32. The component attribute information 320 is indicative of the attribute (use or storage) of the transmission source component 31.

(Transmission Type Identification Information)

Figure 14A:
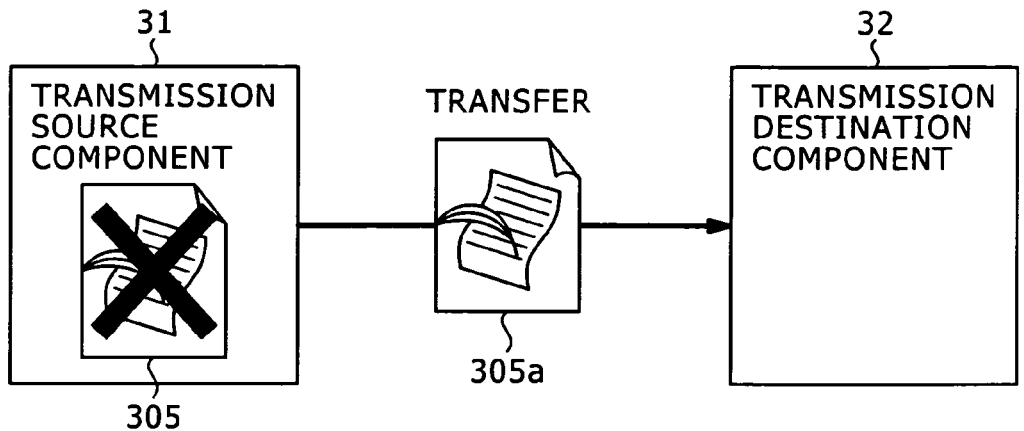
FIGS. 14A, 14B, and 14C are diagrams illustrating license transmission types between components according to the embodiment of the invention.
Figure 14B:
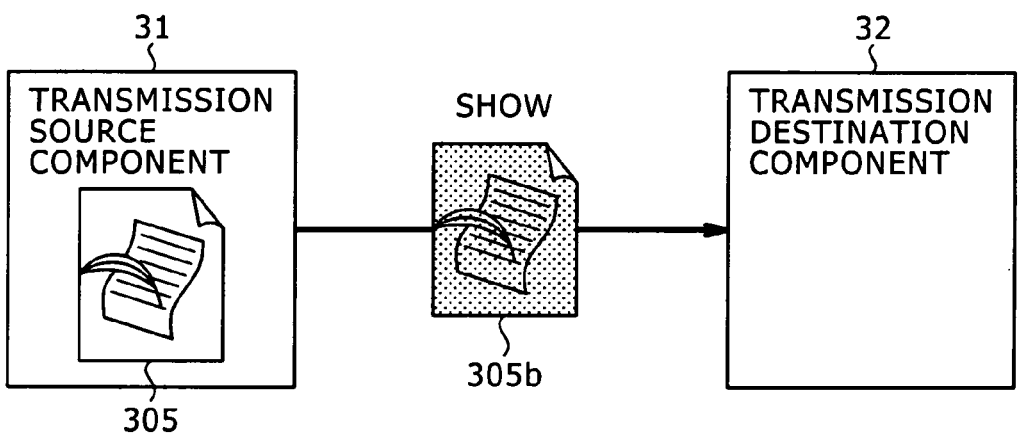
Figure 14C:
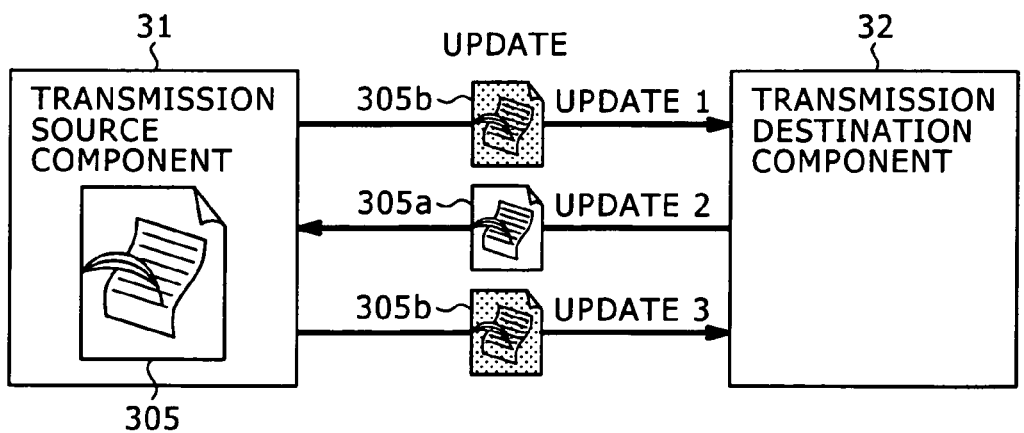

FIGS. 14A, 14B and 14C show the license transmission types for transmission licenses between components according to the present embodiment of the invention. As shown in these figures, there are three major types "transfer", "show", and "update" for the license 305 depending on the purpose of transmission of the license 305 and the interaction between the transmission source component 31 and the transmission destination component 32. Type "update" is further divided into three types "update 1 (request update)", "update 2 (transfer updated license)", and "update 3 (notify update completion)". Consequently, there are five license transmission types in all. The following describes each of these transmission types.

As shown in FIG. 14A, "transfer" denotes the transmission of a master copy 305a of the license 305. In the "transfer" of the license 305 from the transmission source component 31 to the transmission destination component 32, the transmission source component 31 deletes the license 305 stored therein and transmits the master copy 305a of the license 305 to the transmission destination component 32. Consequently, the license 305 may be moved from the transmission source component 31 to the transmission destination component 32.

As shown in FIG. 14B, "show" denotes the transmission of a copy (or a duplication) 305b of the license 305. In the "show" of the license 305 from the transmission source component 31 to the transmission destination component 32, the transmission source component 31 transmits the copy 305b of the license 305 without deleting the license 305 to the transmission destination component 32. Consequently, the license 305 stored in the transmission source component 31 may be shown to the transmission destination component 32.

As shown in FIG. 14C, "update" denotes the transmission for updating the license 305 held in the transmission source component 31. In the "update" of the license 305, the transmission source component 31 shows the copy 305b of the license 305 held therein to the transmission destination component 32 to make an update request ("update 1"). Next, the transmission destination component 32 updates the received license 305 and transfers the master copy 305a of the license 305 to the transmission source component 31 ("update 2"). Further, the transmission source component 31 shows the copy 305b of the updated license 305 to the transmission destination component 32, given a notification thereto of the completion of update ("update 3"). Consequently, the license 305 held in the transmission source component 31 is updated.

Thus, the number of types of transmission of the license 305 between the transmission source component 31 and the transmission destination component 32 is five. Therefore, with the license transmission protocol according to the present embodiment, five types of transmission type identification information 310 are set in accordance with five types of transmission.

FIG. 15 shows a relationship between transmission type IDs, one example of the transmission type identification information 310 according to the present embodiment, and messages. As shown in FIG. 15, in accordance with the above-mentioned five types of transmission (transfer, show, update 1, update 2, and update 3), five types of transmission IDs (0x01, 0x02, 0x03, 0x04, and 0x05) are allocated respectively. These transmission type IDs identify these transmission types and one example of the above-mentioned transmission type identification information.

Including these transmission type IDs in the message 400 by the transmission source component 31 allows the specification of the transmission type of the license 305 included in the message 400, thereby transmitting the license 305.

The message 400 is classified into five types according to which transmission type IDs included. To be more specific, the message 400 having transmission type ID "0x01" is a message for transferring the master copy of a license. The message 400 having transmission type ID "0x02" is a message for showing the copy (or the duplication) of a license. The message 400 having transmission type ID "0x03" is a message for requesting the update of a license. The message 400 having transmission type ID "0x04" is a message for transferring the updated license. The message 400 having transmission type ID "0x05" is a message for giving a notification of the completion of update. These types of the message 400 will be detailed later with reference to FIG. 17.

Thus, the transmission type identification information 310 (or transmission type IDs) in accordance with the different license transmission types has been described. Transmitting the transmission type identification information 310 along with the license 305 by the transmission source component 31 allows the identification of the transmission type of the transmitted license 305 at the transmission destination component 32 and the execution of the processing of the license 305 in accordance with the identified transmission type.

(Component Attribute Information)

As shown in FIG. 5, each license processing component is largely divided into two types. One is the storage component 1 (the storage component 11 for example) that stores the license 305 into a storage device thereof and the other is the use component 2 (the reproduction component 21 for example) that uses the license 305. These attributes are used to prevent the license processing components having the same attribute from being connected each other.

The component attribute information 320 is indicative of the attribute of the transmission source component 31. To be more specific, the component attribute information 320 is indicative to which of the storage component 1 and the use component 2 the transmission source component 31 belongs. Each license processing component has the component attribute information 320 to which each license processing component belongs and, at the time of creating a message, includes the component attribute information 320 in this message.

FIG. 16 shows a relationship between component information IDs, a specific example of the component attribute information 320, and messages. As shown in FIG. 16, component attribute ID "0x01" is allocated to the storage component 1 and component attribute ID "0x02" is allocated to the storage component 2. Namely, the storage component 11, the storage component 12, and so on belonging to the storage component 1 shown in FIG. 5 have the same component attribute ID "0x01" and the reproduction component 21, the move component 22, the copy component 23, the rent component 24, and the return component 25 belonging to the use component 2 have the same component attribute ID "0x02".

Therefore, if the transmission source component 31 belongs to the storage component 1 the message 400 transmitted from this transmission source component 31 includes component attribute ID "0x01". On the other hand, if the transmission source component 31 belongs to the use component 2, the message 400 transmitted from this transmission source component 31 includes component attribute ID "0x02".

Including the component attribute information 320 made up of these component attribute IDs and so on into the message 400 allows the identification of the attribute of the transmission source component 31 by the transmission destination component 32, thereby determining that the transmission source component 31 and the transmission destination component 32 have different attributes.

(Message Types)

The following describes the types of the message 400 according to the present embodiment. As described above, the message 400 is classified by the above-mentioned transmission types of the license 305. FIG. 17 shows the message types and the data making up these types according to the present embodiment.

As shown in FIG. 17, in the present embodiment, the message 400 is classified into five types (transfer message, show message, update request message, update transfer message, and update completion message) in accordance with the above-mentioned five types of transmission of the license 305. The following describes in detail each of these types of messages.

(1) Transfer Message

A transfer message is used to transmit (or transfer) the master copy of a license from the transmission source component 31 to the transmission destination component 32. Therefore, each transfer message includes transmission type ID "0x01" indicative of "transfer" as the transmission type identification information 310. The transmission source component 31 may be either the storage component 1 or the use component 2, so that the transfer message includes component attribute ID "0x01" or "0x02" indicative of "storage" or "use" respectively as the component attribute information 320.

(2) Show Message

A show message is used to transmit (or show) a copy of a license from the transmission source component 31 to the transmission destination component 32. Therefore, the each show message includes transmission type ID "0x02" indicative of "show" as the transmission type identification information 310. The transmission source component 31 is limited to the storage component 1, so that the show message includes component attribute ID "0x01" indicative of "storage" as the component attribute information 320.

(3) Update Request Message

An update request message is used for the source storage component 1 to request the destination use component 2 for updating the license stored in a storage device thereof. Therefore, the each update request message includes transmission type ID "0x03" indicative of "update 1 (update request)" as the transmission type identification information 310. The transmission source component 31 is limited to the storage component 1, so that the update request message includes component attribute ID "0x01" indicative of "storage" as the component attribute information 320. The update request message allows the requested license stored in the destination storage component 1 to be exclusively processed from the simultaneous access by a transfer message. Also, the following update transfer message (4) must be transmitted in response to the update request message.

(4) Update Transfer Message

An update transfer message is used to transfer a license updated by the source use component 2 to the above-mentioned storage component 1 that has requested the updating of this license. Therefore, each update transfer message includes transmission type ID "0x04" indicative of "update 2 (transfer of updated license)" as the transmission type identification information 310. The transmission source component 31 is limited to the storage component 1, so that the update transfer message includes component attribute ID "0x02" indicative of "use" as the component attribute information 320. The update transfer message is transmitted upon reception of the above-mentioned update request message (3). Receiving the update transfer message, the storage component 1 that has requested the updating of the license writes the received updated license over the storage device. Also, the following update completion message (5) may be transmitted in response to the update transfer message.

(5) Update Completion Message

An update completion message is used to notify the destination use component 2 of the completion of the updating of a license on the storage component 1 that has requested the updating of the license. Therefore, the update completion message includes transmission type ID "0x05" indicative of "update 3 (notification of update completion)" as the transmission type identification information 310. The transmission source component 31 is limited to the storage component 1, so that the update completion message includes component attribute ID "0x01" indicative of "storage" as the component attribute information 320. The update completion message is transmitted upon the overwriting of the updated license in response to the reception of the above-mentioned update transfer message (4). The update completion message is an option and therefore may not always be transmitted. Also, the update completion message may not include the license 305 and the content key 302.

Thus, the five types of message according to the present embodiment have been described. It should be noted that other messages (for example, a processing pause message) than the above-mentioned five types of messages may be transmitted between license processing components.

The following describes the processing of transferring licenses (or the above-mentioned messages) between the license processing components according to the present embodiment.

(Handleable Transmission Types)

First, transmission types (namely, message types) that each license processing component according to the present embodiment may handle will be described with reference to FIG. 18. FIG. 18 shows the transmission types that each license processing component according to the present embodiment may handle.

As shown in FIG. 18, handleable license transmission types are preset for each license processing component. In other words, each license processing component may handle only preset message types.

For example, a first reproduction component (play (updated)) 21a is one type of the above-mentioned reproduction component 21 and executes normal reproduction control that does not involve the updating of the reproduction status written to a license. The first reproduction component 21a (hereafter referred to simply as the reproduction component 21a) is capable of receiving a license shown by the storage component 1 (namely, capable of receiving the above-mentioned show message and processing the received show message). The reproduction component 21a is incapable of transmitting licenses (or messages) to other license processing components.

A second reproduction component (reproduction (not updated)) 21b is one type of the above-mentioned reproduction component 21 and executes reproduction control that involves the update of the reproduction status written to a license. The second reproduction component 21a (hereafter referred to simply as the reproduction component 21a) is capable of transferring a license subject update with the storage component 1 in order to update the license. To be more specific, the reproduction component 21b is capable of receiving the above-mentioned update request message (update 1) and update completion message (message 3) from the storage component 1 that has requested the updating of the license, processing the received messages, and transmitting the above-mentioned update transfer message (update 2) to the storage component 1 that has requested the updating of the license.

The move component 22 is capable of receiving a license transferred from the storage component 1 and transferring the received license to another storage component 1. To be more specific, the move component 22 is capable of receiving the above-mentioned transfer message from the source storage component 1, processing the received message, and transmitting the processed transfer message to the destination source storage component 1.

The copy component 23 is capable of receiving a license shown from the storage component 1 and transferring the license to another storage component 1. To be more specific, the copy component 23 is capable of receiving the above-mentioned show message from the copy source storage component 1 and transmitting the above-mentioned transfer message to the copy destination license processing component.

The rent component 24 is capable of transferring a license subject to update with the storage component 1 in order to update the license. To be more specific, the rent component 24 is capable of receiving the above-mentioned update request message (update 1) and update completion message (update 3) from the storage component 1 that has requested the updating of the license and processing the received message. The rent component 24 is also capable of transferring the license, or the above-mentioned transfer message, to the rent destination storage component 1.

The return component 25 is capable of receiving a license subject to update with the storage component 1 in order to update the above-mentioned rent source license. To be more specific, the return component 25 is capable of receiving the above-mentioned update request message (update 1) and update completion message (update 3) from the storage component 1 that has requested the updating of the license, processing the received messages, and transferring the above-mentioned update transfer message (update 2) to the update requesting storage component 1. Further, the return component 25 is capable of receiving the license transferred from the rent destination storage component 1, namely, receiving the above-mentioned transfer message and processing it.

A read-only storage component (bind) 16 is one type of the above-mentioned storage component 1 and capable of reading a license and so on from a read-only storage device in which the license is securely stored and showing the license, but incapable of writing a license and so on to a storage device. The read-only storage component 16 is the storage component 12 for the removable storage medium 40 arranged on the PD 10*b* that is a reproduction-only device.

The read-only storage component 16 is capable of showing the license read from a storage device to the use component 2 (namely, transmitting the above-mentioned message to the use component 2) but incapable of receiving a license (or a message) from another license processing component.

A write-only storage component (bind) 17 is one type of the above-mentioned storage component 1 and capable of writing a license and so on to a storage device for storage, but incapable of reading a license and so on from a storage device. The write-only storage component 17 is used when a service provider preinstalls content, license and so on into the user device 10 or writes content, license and so on to the removable storage medium 40 in advance before distributing on the market, for example.

The write-only storage component 17 is capable of receiving a license from the use component 2 (namely, receiving the above-mentioned transfer message and processing it), but incapable of transmitting a license (or a message) to another license processing component.

A read/write-enabled storage component (bind) 18 is one type of the above-mentioned storage component 1 and capable of reading, writing, storing, and rewriting (or updating) a license and so on with a storage device. The read/write-enabled storage component 18 is the storage component 11 for a HDD or the storage component 12 for the removable storage medium 40 arranged on the PC 10*a*, for example.

The read/write-enabled storage component 18 is capable of receiving a license transferred from the use component 2 and a license transferred from the use component 2 for update. To be more specific, the read/write-enabled storage component 18 is capable of receiving the above-mentioned transfer message and the above-mentioned update transfer message (update 2) from the use component 2 and processes the received messages. Also, the read/write-enabled storage component 18 is capable of transmitting a license read from a storage device to the use component 2 for transfer, show, or update. To be more specific, the read/write-enabled storage component 18 is capable of transmitting the above-mentioned transfer message, the above-mentioned show message, the above-mentioned update request message (update 1), and the above-mentioned update completion message (update 3) to the use component 2.

Thus, in accordance with the processing capabilities of its own, each license processing component has a preset transmission type of licenses that may be inputted and outputted. Therefore, licenses may be transferred with proper transmission types when message transfer is made between license processing components.

(Functional Configurations of Components)

The following describes functional configurations of the transmission source component 31 and the transmission destination component 32 for transferring the information (or messages) about licenses between license processing components according to the present embodiment, with reference to FIG. 19. FIG. 19 is a block diagram illustrating functional configurations associated with the message transmission by the transmission source component 31 and the transmission destination component 32 according to the present embodiment.

As shown in FIG. 19, the transmission source component 31 has a license acquisition block 352, a transmission type determination block 354, an attribute information acquisition block 356, a message creation block 358, and a message transmission block 360.

The license acquisition block 352 obtains the above-mentioned license subject to transmission and the content key corresponding to this license. The processing function of the license acquisition block 352 differs when the transmission source component 31 is the storage component 1 and the use component 2. The following specifically describes this difference.

If the transmission source component 31 is the storage component 1, the license acquisition block 352 reads a license and its content key from the license & content key storage block 6 in response to a transmission command (a message creation command) issued from the component management block 5, thereby obtaining the license subject to transmission and its content key. At this moment, the transmission source component 31 searches the license & content key storage block 6 by the content ID included in the above-mentioned transmission command to obtain the license with that content ID written to the license information description section 501 as the license to be transmitted. Further, the license acquisition block 352 also obtains the content key associated with that license by the content ID. It should be noted that the transmission source component 31 may return the information indicative whether the license corresponding to the content ID is found or not to the component management block 5. Also, if the license & content key storage block 6 is a storage device such as the HDD 111 or the removable storage medium 40 and the transmission source component 31 is the use component 2, then the license & content key storage block 6 need not be arranged.

On the other hand, if the transmission source component 31 is the use component 2, then the license acquisition block 352 obtains a license and its content key from the message received from another storage component 1, thereby obtaining the above-mentioned license subject to transmission and its content key.

The license acquisition block 352 outputs the license and its content key obtained as described above to the message creation block 358.

The transmission type determination block 354 determines the transmission type of the above-mentioned license subject to be transmitted from the transmission source component 31 to the transmission destination component 32. At this moment, the transmission type determination block 354 may determine the transmission type on the basis of the transmission type command information included in the transmission command (for example, the message creation command) received from the component management block 5 or use a predetermined transmission type in accordance with the processing function of the transmission source component 31.

For example, if the transmission source component 31 is capable of transmitting a license with a plurality of transmission types (namely, if capable of transmitting a plurality of types of messages, for example, if the transmission source component 31 is the read/write-enabled storage component 18 shown in FIG. 18), the transmission type determination block 354 determines the transmission type on the basis of the transmission type command information received from the component management block 5. On the other hand, if the transmission source component 31 is limited to a certain handleable transmission type (for example, if the transmission source component 31 is the use component 2 such as the move component 22), then the transmission type determination block 354 uses the predetermined transmission type.

The transmission type determination block 354 outputs the transmission type identification information 310 (or the transmission type identifier ID) indicative of the transmission type thus determined to the message creation block 358.

The attribute information acquisition block 356 obtains the component attribute information 320 indicative of the attribute of the transmission source component 31. As described above, each license processing component is the storage component 1 or the use component 2 and has the component attribute information 320 (namely, the component attribute ID indicative of "storage" or "use") indicative of the attribute of itself. The attribute information acquisition block 356 reads the component attribute information 320 of the transmission source component 31 and outputs the component attribute information 320 to the message creation block 358.

The message creation block 358 links the license subject to transmission and its content key received from the license acquisition block 352, the transmission type identification information 310 received from the transmission type determination block 354, and the component attribute information 320 to create a message and outputs the created message to the message transmission block 360.

The message transmission block 360 transmits the messaged received from the message creation block 358 to the transmission destination component 32. At this moment, the message transmission block 360 may use any data security technology (for example, the attachment of digital signatures) so as to prevent the message from being altered.

As shown in FIG. 19, the transmission destination component 32 has a message reception block 370, a message verification block 372, a license evaluation block 374, a license processing block 376, and a license update block 378.

The message reception block 370 receives the above-mentioned message from the transmission source component 31 and outputs the received message to the message verification block 372.

The message verification block 372 checks the received message for validity on the basis of the transmission type identification information 310 and component attribute information 320 included therein, thereby enabling or disabling the processing of the license included in that message.

To be more specific, the message verification block 372 executes the processing and verification based on a data security technology on the message received from the message reception block 370 and then extracts the transmission type identification information 310, the component attribute information 320, the license, and the content key from the processed and verified message.

Also, the message verification block 372 checks the received message for validity (namely, if this message has been transmitted with a proper transmission type) on the basis of the transmission type identification information 310 extracted from the message and the transmission type identification information indicative of a transmission type receivable by the transmission destination component 32 (this is called a first verification standard).

To be more specific, the transmission destination component 32 has transmission type IDs indicative of receivable transmission types as shown in FIG. 18. Therefore, the message verification block 372 matches the transmission type ID extracted from the message against the transmission type ID indicative of a receivable transmission type. If a match is found, the message verification block 372 determines the received message to be valid. On the other hand, if a mismatch is found, the message verification block 372 determines the received message to be invalid, thereby preventing the license extracted from that message from being processed.

The first verification standard of the message verification block 372 thus configured allows the transmission destination component 32 to process only the license that has been transmitted with a predetermined transmission type preset in accordance with the function of the transmission destination component 32.

In addition, the message verification block 372 checks the received message for validity (namely, if the transmission of the license is proper or not) on the basis of the component attribute information 320 extracted from the message and the component attribute information indicative of the attribute of the transmission destination component 32 itself (this is called a second verification standard). If a mismatch is found between the attribute of the transmission source component 31 and the attribute of the transmission destination component 32, the message verification block 372 determines that the message is valid; if a match is found, the message verification block 372 determines that the message is invalid.

To be more specific, the transmission destination component 32 has a component attribute ID indicative of the component attribute ("storage" or "use") of its own. For example, if the transmission destination component 32 is the storage component 1, then the transmission destination component 32 has component attribute ID "0x01" indicative of component attribute "storage". If the transmission destination component 32 is the use component 2, the transmission destination component 32 has component attribute ID "0x02" indicative of component attribute "use".

Therefore, the message verification block 372 matches the component attribute ID extracted from the message against the component attribute ID indicative of the attribute of the transmission destination component 32 itself. If a mismatch is found, the message verification block 372 determines the received message to be valid. If a match is found, the message verification block 372 determines the received message to be invalid and prevents the license extracted from that message from being processed.

The verification function based on the second verification standard of the message verification block 372 thus configured allows the storage component 1 to process only the licenses received from the use component 2 and the use component 2 to process only the licenses received from the storage component 1.

It should be noted that, rather than having the component attribute ID indicative of the component attribute of the transmission destination component 32 itself as described above, the transmission destination component 32 may have the component attribute ID indicative of any component attribute that is handleable by the transmission destination component 32. In this case, the message verification block 372 matches the component attribute ID extracted from the message against the component attribute ID indicative of the above-mentioned handleable component attribute. If a match is found, the message verification block 372 determines the received message to be valid, if a mismatch is found, the message verification block 372 determines the received message to be invalid.

Thus, the message verification block 372 checks the messages for validity on the basis of the above-mentioned two verification standards. If both the standards are satisfied, then the message verification block 372 allows the processing of the license and its content key extracted from each message. If one or both of the standards are not satisfied, the message verification block 372 prohibits the processing of the license and its content key extracted from that dissatisfactory message and causes an error notification for example.

If the message verification block 372 permits the processing of the license and so on, the license evaluation block 374 evaluates the use condition of the section corresponding to the function of the transmission destination component 32 among the use conditions (reproduction condition, storage condition, move condition, and so on) written to the license, thereby controlling the use (reproduction and so on) of the content corresponding to that license and the processing (storage, move, and so on) of that license. To be more specific, if the use condition of that license is found satisfied by the above-mentioned evaluation, the license evaluation block 374 permits the use of the above-mentioned content and the processing of that license and so on, otherwise, the license evaluation block 374 prohibits the processing of the use of the above-mentioned content and the processing of that license and so on.

If the license evaluation block 374 permits the processing of the license, the license processing block 376 processes the license and its content key in accordance with the function of the transmission destination component 32. For example, if the transmission source component 31 is the storage component 1, then the license processing block 376 stores that license and its content key into a storage device. If the transmission source component 31 is the use component 2, then the license processing block 376 directs the reproduction of the content corresponding to that license or the transmission (or transfer) of the license corresponding to another storage component 1 and the content corresponding to that license. If the transmission source component 31 is the rent component 24, the license processing block 376 functions also as a license creation block for creating licenses for rent on the basis of the rent source license.

The license update block 378 updates the status written to the license on the basis of a command from the license evaluation block 374. For example, the license update block 378 increases the number of times the reproduction status written to the license has been reproduced or the number of times the move status has been moved.

Thus, the functional configurations of the transmission source component 31 and the transmission destination component 32 have been described. It should be noted that, for the convenience of description, FIG. 19 shows a functional block associated with message transmission processing from the transmission source component 31 and a functional block associated with message reception processing and the subsequent processing for the transmission destination component 32. Actually, however, the transmission source component 31 and the transmission destination component 32 may execute both message transmission processing and message reception processing, in this case, each of the transmission source component 31 and the transmission destination component 32 has a functional block associated with the processing of both.

<8. License Transmission Method>

Figure 20:
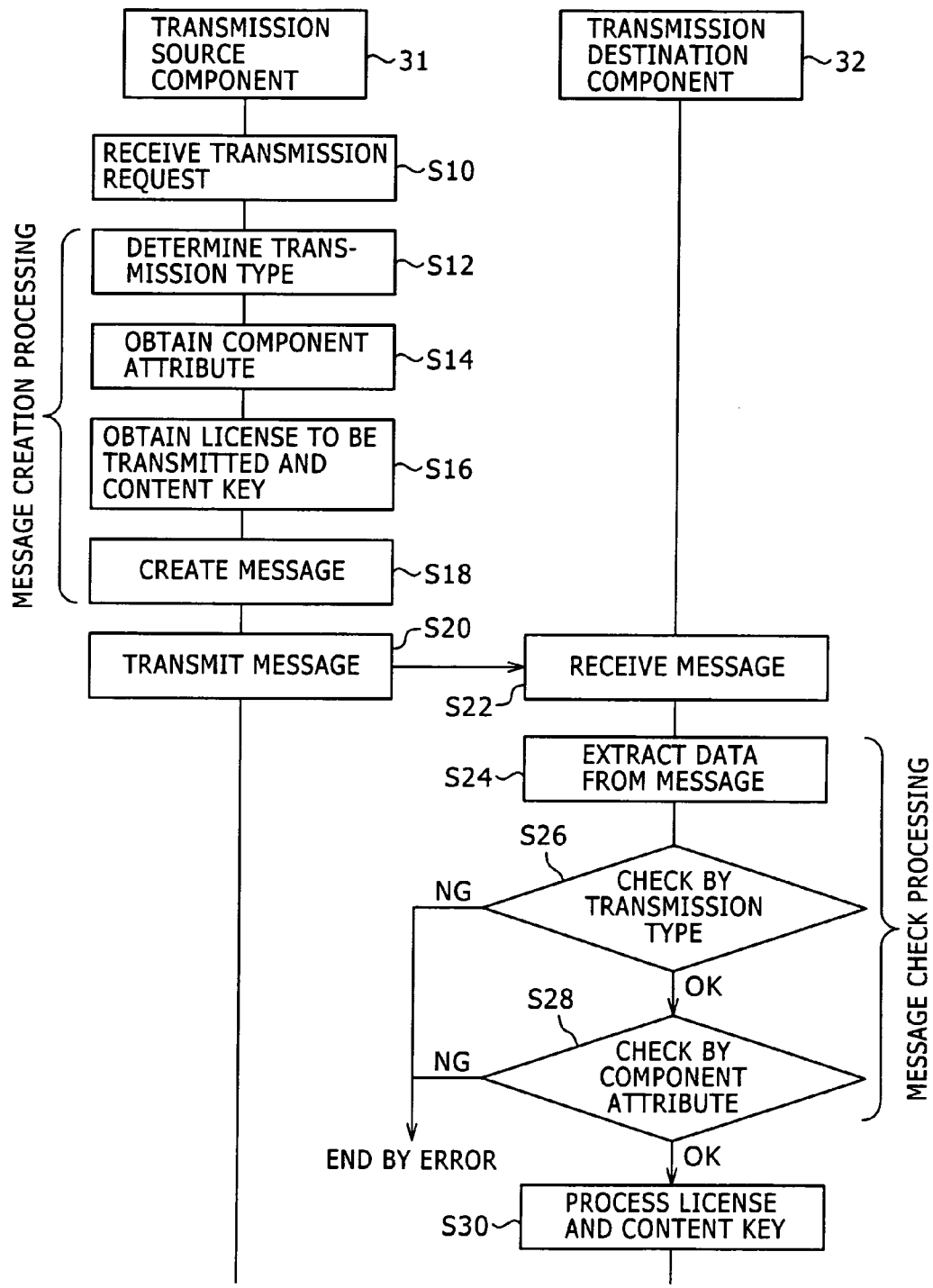
FIG. 20 is a timing chart indicative of a license transmission method for transmitting licenses between the transmission source component and the transmission destination component according to the embodiment of the invention.

The following describes a method transmitting the information (or messages) associated with a license between the transmission source component 31 and the transmission destination component 32 according to the present embodiment, with reference to FIG. 20. FIG. 20 shows a timing chart indicative of the method of license transmission between the transmission source component 31 and the transmission destination component 32 according to the present embodiment.

As shown in FIG. 20, first, in step S10, the transmission source component 31 receives a transmission command (step S10). If the transmission source component 31 is the storage component 1, the transmission command is a message creation command received from the component management block 5. This message creation command includes transmission type specification information and a content ID. On the other hand, if the transmission source component 31 is the use component 2 such as the move component 22 for example, a message received from the storage component 1 plays a role of a transmission command, for example. Thus, the transmission source component 31 that has received a transmission command executes message creation processing steps S12 through S18.

Next, in step S12, the transmission source component 31 determines the transmission type of the license subject to transmission (step S12). The transmission type determination block 354 of the transmission source component 31 determines the transmission type on the basis of the transmission command and the preset data in accordance with the purpose of the transmission by the transmission source component 31 as described above and generates the transmission type identification ID indicative of the determined transmission type. For example, in the transfer of the master copy of the license, transmission type determination block 354 generates transmission type identifier ID "0x01" indicative of transmission type "transfer".

Further, in step S14, the transmission source component 31 obtains the component attribute information 320 indicative of the attribute of the transmission source component 31 itself (step S14). As described above, the attribute information acquisition block 354 of the transmission source component 31 reads and obtains the component attribute ID indicative of the attribute of the transmission source component 31 itself, this component attribute ID being held therein. For example, if the transmission source component 31 is the storage component 1, the component attribute ID is "0x01".

It should be noted that the attribute information acquisition block 356 may determine whether the transmission source component 31 is the storage component 1 or the use component 2, set the component attribute of the transmission source component 31, and generate the component attribute ID.

Then, in step S16, the transmission source component 31 obtains the license subject to transmission and the content key corresponding to that license (step S16). As described above, if the transmission source component 31 is the storage component 1, the license acquisition block 352 searches the license & content key storage block 6 by the content ID included in the message transmission command for the license subject to transmission and the content key corresponding thereto. If the transmission source component 31 is the use component 2, then the license acquisition block 352 obtains the license and content key extracted from the message received from the storage component 1 and manipulated as required (for example, update by the license update block 378 and creation of the rent source license by the license processing block 376).

It should be noted that the processing sequence of steps S12 through S16 may be other than the sequence described above.

Next, in step S18, the transmission source component 31 creates a message (step S18). The message creation block 358 of the transmission source component 31 links the license and the content key subject to transmission and its content obtained above, the transmission type identification information 310 (or the transmission type ID) determined above, and the component attribute information 320 (or the component attribute ID) obtained above to create a message.

Further, in step S20, the transmission source component 31 transmits the created message to the transmission destination component 32 (step S20, license transmission step). To be more specific, the message transmission block 360 of the transmission source component 31 transmits the above created message to the transmission destination component 32 specified by the component management block 5. It should be noted that one message may be transmitted only to one transmission destination component 32 at a time. This setup prevents illegal license duplication and illegal content use from occurring.

Then, in step S22, the transmission destination component 32 receives the message from the transmission source component 31 (step S22). Immediately after the reception of the message, the following message verification processing S24 through S28 (verification steps) are executed before processing the license included in this message, thereby checking the message for validity.

First, in step S24, the transmission destination component 32 takes data out of the received message (step S24). To be more specific, the message verification block 372 of the transmission destination component 32 executes data security processing and verification processing on the received message and then extracts the transmission type identification information 310 (transmission type ID), the component attribute information 320 (component attribute ID), the license, and the content key from that message.

Next, in step S26, the transmission destination component 32 checks the message for validity on the basis of the transmission type that is the first verification standard. To be more specific, the message verification block 372 of the transmission destination component 32 matches the transmission type ID extracted from the message against the transmission type ID (preset) receivable by the transmission destination component 32. If a match is found, it indicates that the transmitted message is valid (namely, the license has been transmitted with a proper transmission type), upon which the procedure goes to step S28. On the other hand, if a mismatch is found, it indicates that the transmitted message is invalid (namely, the license has been transmitted with an invalid transmission type), thereby disabling the processing of the license extracted from that message. This causes an error end.

In step S28, the transmission destination component 32 checks the message for validity on the basis of the component attribute that is the second verification standard (step S28). To be more specific, the message verification block 372 matches the component attribute ID extracted from the message against the component attribute ID indicative of the attribute of the transmission destination component 32. If a mismatch is found, it indicates that the transmitted message is valid (namely, the license has been transmitted from the proper transmission source). In this case, the processing of the license extracted from that message is permitted, upon which the procedure goes to step S30. On the other hand, if a match is found, it indicates that the transmitted message is invalid (namely, the license has been transmitted from an illegal transmission source). In this case, the processing of the license extracted from that message is prohibited, upon which an error end is caused.

It should be noted that the sequence of steps S26 through S28 is not restricted to that mentioned above; for example, step S28 may be executed before step S26.

Then, in step S30, the transmission destination component 32 processes the license and content key extracted from the message (step S30). For example, the license evaluation block 374 of the transmission destination component 32 evaluates that license to determine whether to permit the processing (move or storage for example) of that license or whether to permit the use (reproduction or move for example) of that license and the content key thereof. Thus, the use of the content corresponding to the transmitted license is controlled.

Thus, the method of license transmission between the license processing components according to the present embodiment and the method of license processing between the transmission source component 31 and the transmission destination component 32 have been described. These novel methods allow the transmission source component 31 to attach transmission type identification information and transmission source component attribute information to the license subject to transmission and transmit this license to the transmission destination component 32 and the transmission destination component 32 to check the license transmission for validity on the basis of the received transmission type identification information and component attribute information, thereby permitting the processing of the received license only when the license transmission is found valid. Following the above-mentioned license transmission protocol allows the transmission of licenses with proper transmission types to proper components, thereby making difficult any attempts of illegal license processing and illegal content use beyond a scope specified in each license.

Figure 21:
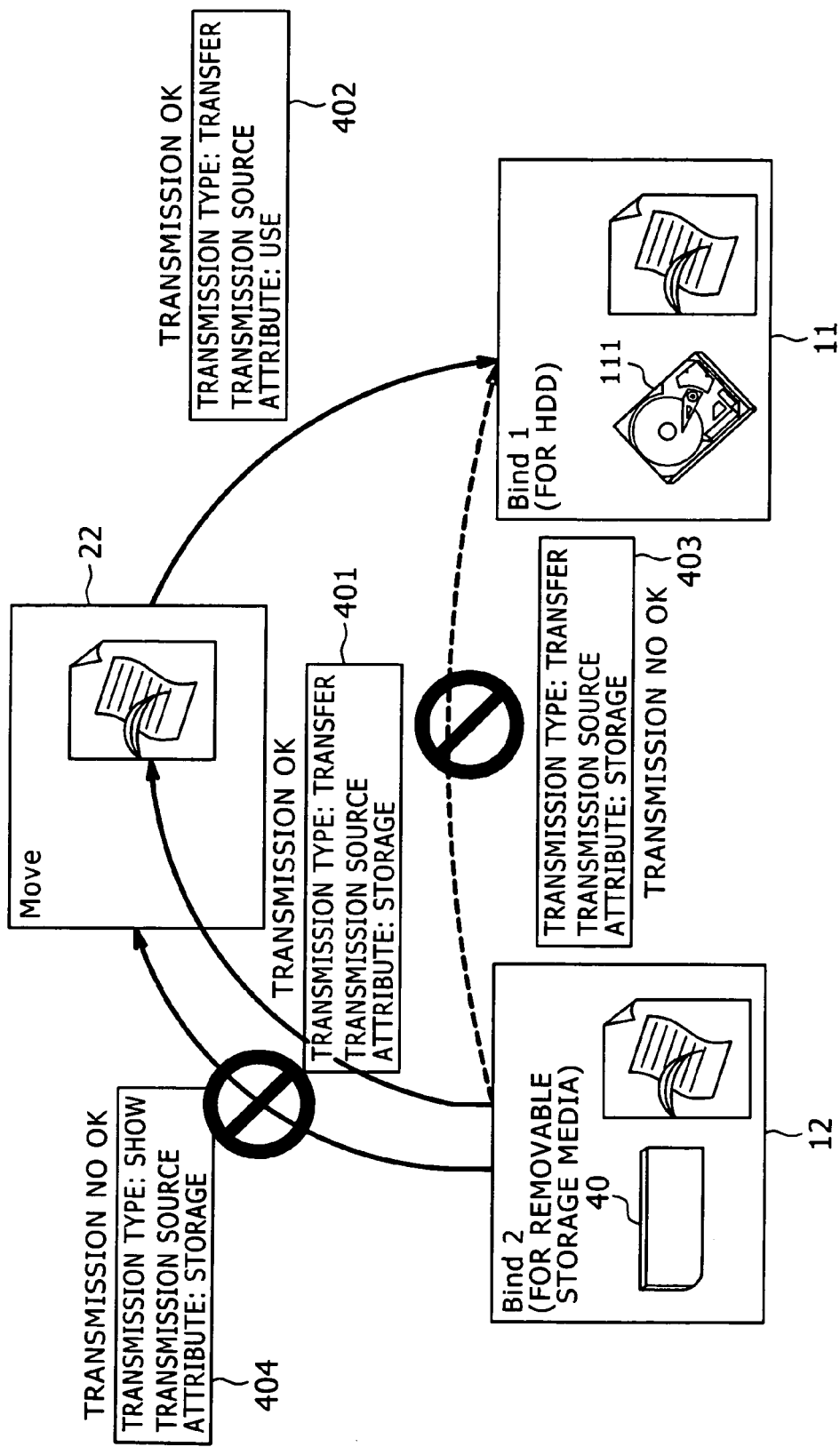
FIG. 21 is a schematic diagram illustrating a specific example of transferring licenses between a plurality of license processing components according to the embodiment of the invention.

The following describes a specific example in which licenses are properly transferred between a plurality of license processing components in accordance with the above-mentioned transmission protocol, with reference to FIG. 21. FIG. 21 schematically illustrates a specific example in which licenses are transferred between a plurality of license processing components according to the present embodiment.

FIG. 21 shows an example in which the move component 22 is combined with the storage component 12 and storage component 11 to move a license and a content key thereof from the removable storage medium 40 to the HDD 111.

The transmission protocol according to the present embodiment specifies that the move of a license be executed through the move component 22 and the license be transferred so as not to remain at the transmission source. Therefore, in order to move a license in the example shown in FIG. 21, it is required for the storage component 12 to transmit a transfer message 401 (transmission type "transfer", component attribute "storage") to the move component 22 and then the move component 22 to transmit a transfer message 402 (transmission type "transfer", component attribute "use") to the storage component 11.

This transmission protocol may prohibit the illegal move of licenses. For example, if it is practicable that a license is directly transmitted between the directly interconnected storage component 12 and storage component 11, then the license may be illegally moved without counting the number of times move has made. However, as described above, the storage component 12 is configured to receive only the messages that include component attribute "use" and process the messages thus received. Consequently, if a transfer message 403 (transmission type "transfer", component attribute "storage") is transmitted from the storage component 12 to the storage component 11, the storage component 11 cannot receive this transfer message 403 to store in the HDD 111. Consequently, the above-mentioned transmission protocol may prevent the illegal move of licenses by directly interconnecting the storage component 12 and the storage component 11 without use of the move component 22.

If it is practicable to transmit (namely, show) a copy of a license from the storage component 12 to the move component 22 to move the license to the storage component 11, the license is illegally moved with the master copy left in the removable storage medium 40. However, as described above, the move component 22 is configured to receive and process only the message that includes transmission type "transfer". Therefore, if a show message 404 (transmission type "show", component attribute "storage") is transmitted from the storage component 12 to the move component 22, the storage component 12 cannot receive this message to execute the move of license. Consequently, the above-mentioned transmission protocol is able to prevent the illegal move of each license with the master copy thereof left at the move source storage component 12.

<9. Method of Controlling Content Reproduction>

The following describes methods of controlling the reproduction of content. These methods are a normal reproduction control method that does not involve the updating of a reproduction status written to a license and a reproduction control method that involves this updating.

(Method of Content Reproduction Control not Involving License Update)

Figure 22:
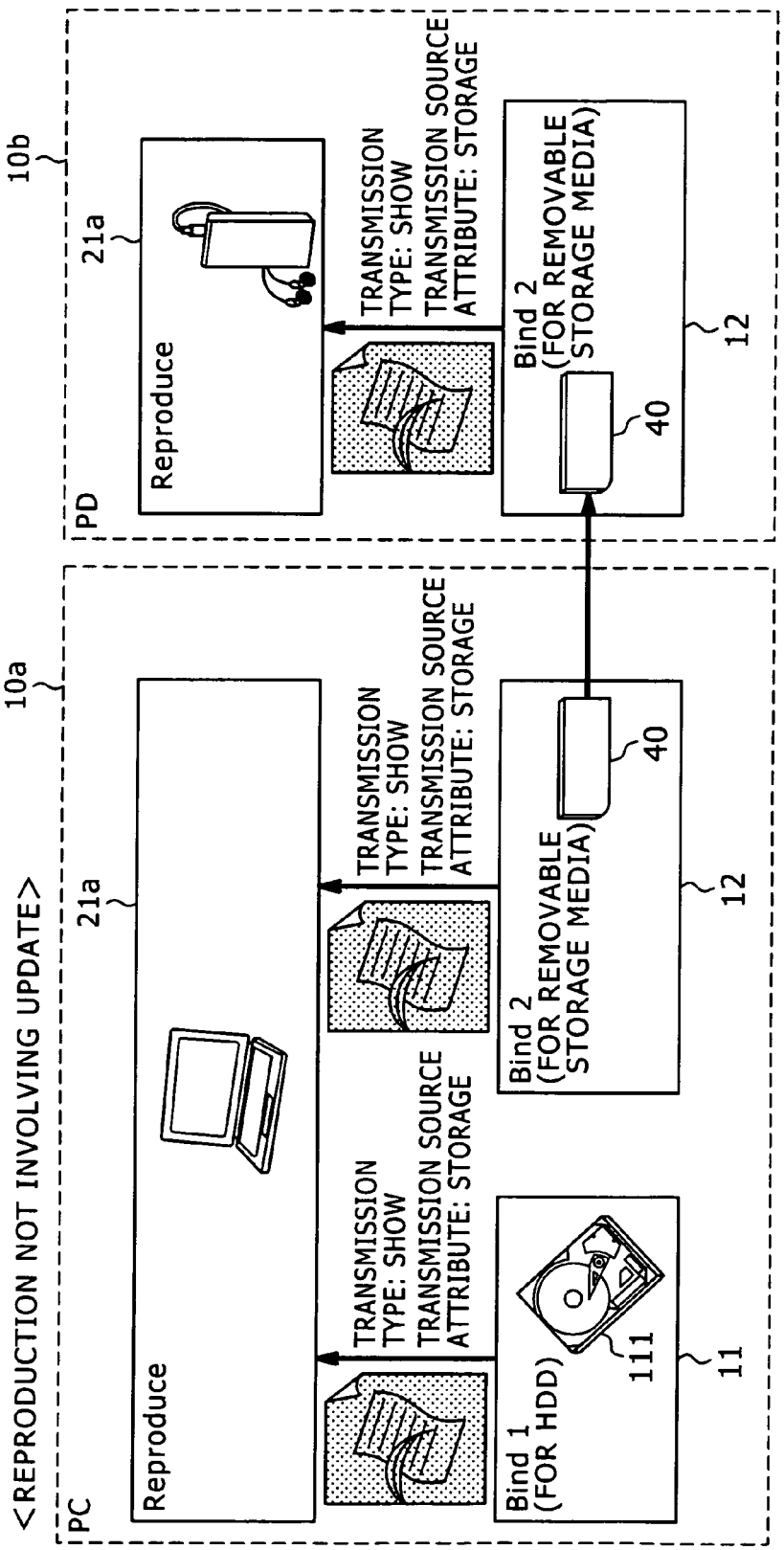
FIG. 22 is a schematic diagram illustrating an outline of an ordinary content reproduction control method that does not involve updating of the license according to the embodiment of the invention.

First, a content reproduction control method that does not involve license update according to the present embodiment will be outlined with reference to FIG. 22. FIG. 22 schematically illustrates an outline of the content reproduction control method that does not involve license update according to the present embodiment.

As shown in FIG. 22, the PC 10*a* has the reproduction component 21*a* (refer to FIG. 8) for executing normal reproduction control not involving the updating of reproduction status and the storage component 11 for a HDD and the storage component 12 for a removable storage media.

By use of the storage component 11 and the reproduction component 21*a* and on the basis of a license and a content key thereof stored in the HDD 111, the 10*a* thus configured may control the reproduction of the content corresponding to that license.

To be more specific, the storage component 11 reads a license and a content key thereof from the HDD 111 to create a show message (transmission type "show", transmission source component attribute "storage") and transmits the created message to the reproduction component 21*a*. In this case, the master copies of the license and content key K are left stored in the HDD 111. The reproduction component 21*a* checks the update request message received from the storage component 11 to evaluate the license included in this show message, thereby determining whether the content is reproducible. If the content is found reproducible, then the reproduction component 21*a* reads the content from the HDD 111 and decrypts the content by the content key extracted from the show message, thereby making the content ready for reproduction.

Also, by use of the storage component 12 and the reproduction component 21*a* and on the basis of a license and a content key thereof stored in the HDD 111, the 10*a* thus configured may control the reproduction of the content corresponding to that license in the same manner as the above-mentioned case of the HDD 111.

It should be noted that in the above-mentioned two ways of reproduction control processing in the PC 10*a*, the content subject to reproduction may be stored in either the HDD 111 or the removable storage medium 40 and therefore is not dependent on the storage location of the corresponding license.

On the other hand, the PD 10*b* has the reproduction component 21*a* and the storage component 12. It is assumed here that the removable storage medium 40 storing the above-mentioned license, the content key thereof, and the corresponding content is provided to the PD 10*b* from the PC 10*a*.

By use of the storage component 12 and the reproduction component 21*a* and on the basis of the above-mentioned license and content key thereof stored in the removable storage medium 40, the PD 10*b* thus configured may control the reproduction of the content stored in the removable storage medium 40.

To be more specific, the storage component 12 of the PD 10*b* reads a license and a content key thereof from the HDD 111 to create a show message (transmission type "show", transmission source component attribute "storage") and transmits the created show message to the reproduction component 21*a*. In this case, the master copies of these license and content key K are left stored in the removable storage medium 40. The reproduction component 21*a* checks the show message received from the storage component 12 to evaluate the license included in this message, thereby determining whether the above-mentioned content is reproducible. If the content is found reproducible, then the reproduction component 21*a* reads the content from the removable storage medium 40 and decrypts the content by the content key extracted from the above-mentioned show message, thereby making the content ready for reproduction.

Figure 23:
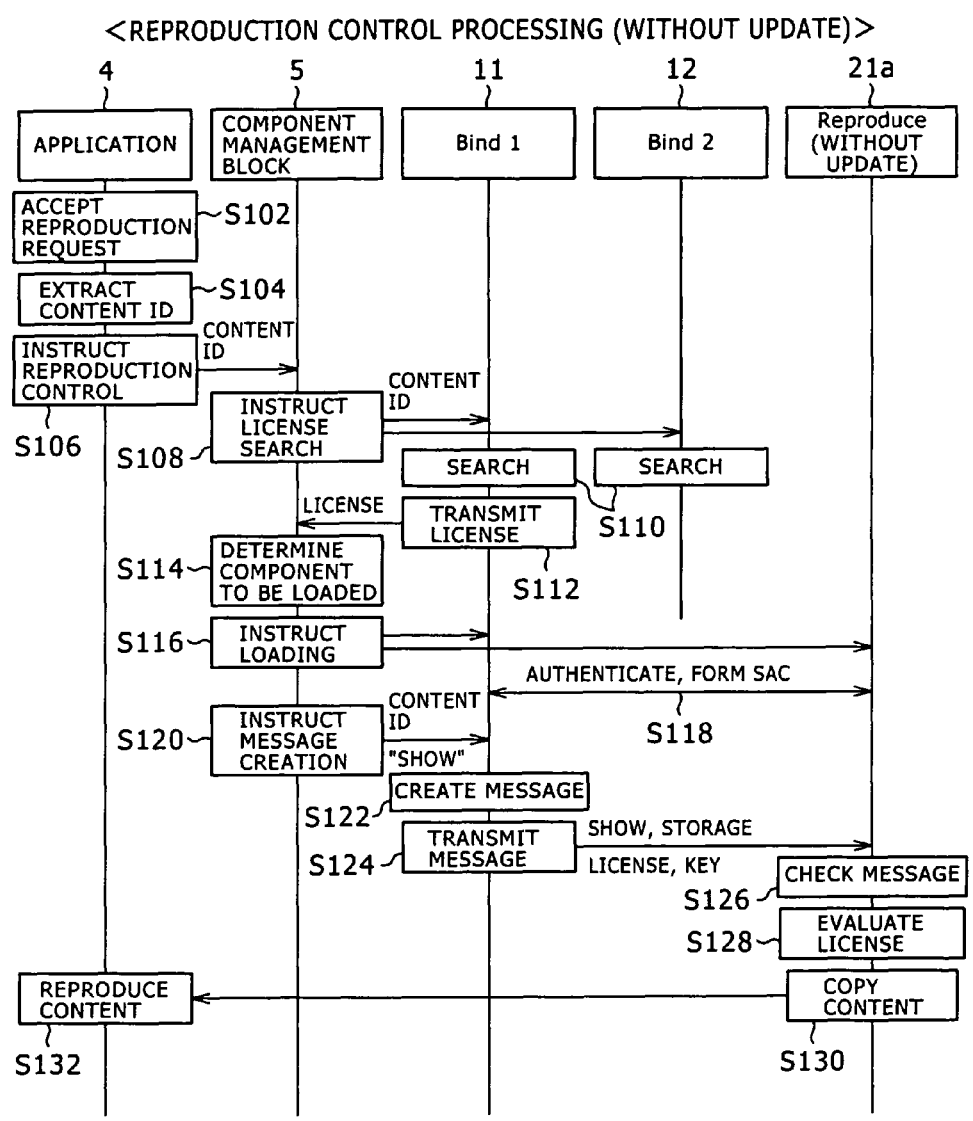
FIG. 23 is a timing chart indicative of a processing flow of the above-mentioned ordinary content reproduction control method that does not involve updating of the license according to the embodiment of the invention.

The following describes in detail a processing flow of the above-mentioned normal content reproduction control method involving no license update according to the present embodiment, with reference to FIG. 23. FIG. 23 is a timing chart indicative of a processing flow of the above-mentioned normal content reproduction control method involving no license update according to the present embodiment.

First, as shown in FIG. 23, the application 4 receives a request for the reproduction of user-specified content from a user (step S102). Next, the application 4 extracts a content ID from a content file in which the content requested for reproduction is stored (step S104). Further, the application 4 transmits the content ID and reproduction control command information including use information indicative that the content use is "reproduction" to the component management block 5, thereby instructing the component management block 5 to control the reproduction of the content corresponding to that content ID (step S106).

Next, on the basis of the above-mentioned reproduction control command information received from the application 4, the component management block 5 starts executing reproduction control to instruct the storage component 11, storage component 12, and so on for search for the license corresponding to the received content ID (step S108). This search instruction is effected by transmitting the content ID and a search command to the storage component 11, storage component 12, and so on. The storage components subject to this search instruction may be limited to one or more storage components in the same user device 10 as the component management block 5 or may include storage components in other user devices 10 connected by the local line 30*b* for example.

The storage component 11, the storage component 12, and so on instructed for search check, on the basis of the content ID received from the component management block 5, the corresponding storage devices (the HDD 111, the removable storage medium 40, and so on) for the license corresponding to the above-mentioned content ID (step S110). If the corresponding license is found, the storage component 11 reads this license from the storage device and transmits the license to the component management block 5 (step S112). At this moment, as a result of the search, one storage component 1 may transmit one or more licenses or a plurality of storage components 11, 12, and so on each may transmit one or more licenses. It should be noted that, if none of the storage component 11, storage component 12, and so on stores the license corresponding to the above-mentioned content ID, the reproduction of the content is prohibited, upon which the reproduction control processing ends.

Further, of the plurality of license processing components, the component management block 5 determines the storage component 11 and the reproduction component 21*a* subject to load (or start-up) (step S114). To be more specific, the component management block 5 has a license rehearsal evaluation function for example to evaluate, in a rehearsal manner, the reproduction condition of the content received from one or more storage components 1 in accordance with the above-mentioned search instruction. On the basis of a result of this rehearsal evaluation, the component management block 5 determines, as the components subject to load, one storage component 1 and one reproduction component 21 suitable for the reproduction of the content requested for reproduction.

For example, if it receives a plurality of licenses in accordance with the above-mentioned search command, the component management block 5 selects the license that is optimum to the user and determines the storage component 11 storing the selected license to be subject to load. Also, if the reproduction is permitted on the basis of the selected license, the component management block 5 determines whether the updating of the reproduction status is involved. If the updating is found not involved, the component management block 5 determines the reproduction component 21a that does not execute the update processing to be subject to load. On the other hand, if the updating is found involved, the component management block 5 determines the reproduction component 21b capable of executing the update processing to be subject to load.

In what follows, it is assumed that a license involving no update is selected and the storage component 11 and the reproduction component 21b be selected as subject to load in step S114.

Next, the component management block 5 gives a load command to the storage component 11 and the reproduction component 21a determined above as subject to load, thereby starting up these components (step S116). Consequently, the storage component 11 and the reproduction component 21a cross authenticate each other, thereby forming a secure route, SAC (Secure Authenticated Channel) for example, between these components (step S118).

Further, the component management block 5 gives a command to the storage component 11 to create a show message (step S120). To be more specific, this message creation command is affected by transmitting the content ID received from the above-mentioned application 4 and transmission type specification information to the storage component 11. This transmission type specification information specifies the transmission type (namely, the type of the message to be created) of the license. Because the reproduction control processing involving no update is executed in the present processing flow, the transmission type specification information is indicative of "show". The message creation command thus configured allows the component management block 5 to instruct the storage component 11 to transmit a copy of the license corresponding to the above-mentioned content ID to the reproduction component 21a (namely, transmit the show message including that license).

Next, in response to the above-mentioned message creation command, the storage component 11 creates a show message for transmitting the license and content key corresponding to the above-mentioned content ID (step S122). To be more specific, the storage component 11 reads the license and content key corresponding to the above-mentioned content ID from the storage device (the HDD 111 for example) of its own. Next, the storage component 11 links the license and the content key, transmission type ID "0x02" indicative of "show" that is the transmission type specified by the component management block 5, and component attribute ID "0x01" indicative of "storage" that is the attribute of the storage component 11 itself, thereby creating a show message.

Further, the storage component 11 transmits the show message thus created to the reproduction component 21a (step S124). In response, the reproduction component 21a receives this show message from the storage component 11. Thus, in the transmission of a show message, the storage component 11 is equivalent to the above-mentioned transmission source component 31 and the reproduction component 21a is equivalent to the above-mentioned transmission destination component 32.

Then, the reproduction component 21a checks the show message received from the storage component 11 for validity (step S126). This show message verification checks if the transmission type ID extracted from the above-mentioned show message is "0x02" indicative of transmission type "show" and the component attribute ID extracted from the above-mentioned show message is "0x01" indicative of component attribute "storage". Because this verification is executed in substantially the same procedure as the message verification processing described with reference to FIG. 20, detail description of the verification processing will be omitted. If the above-mentioned show message is found valid as a result of the above-mentioned message verification, then the reproduction component 21a permits the processing of the license extracted from the above-mentioned show message, upon which the procedure goes to step S128. On the other hand, if the show message is found invalid, the reproduction component 21a prohibits the processing of this license, upon which the reproduction control processing ends.

Next, the reproduction component 21a evaluates the license extracted from the above-mentioned show message to determine whether the above-mentioned content requested for reproduction is reproducible (step S128). In this license evaluation processing, the reproduction component 21a evaluates the reproduction condition written to the reproduction condition description section 521 to determine whether the reproduction condition is satisfied or not, as described above.

If the reproduction condition is found satisfied as a result of this evaluation, then the reproduction component 21a permits the reproduction of the above-mentioned content requested for reproduction. Then, the reproduction component 21a reads the content from the content storage block 7 such as the HDD 111 and decrypts the content by the content key extracted from the above-mentioned show message, thereby transmitting the decrypted content to the application 4 in the reproducible state (step S130). Consequently, the application 4 reproduces the received content data (step S132).

On the other hand, if the reproduction condition is found not satisfied in step S126, then the reproduction component 21a prohibits the reproduction of the content and notifies the application 4 thereof (not shown).

(Method of Content Reproduction Control Involving License Update)

Figure 24:
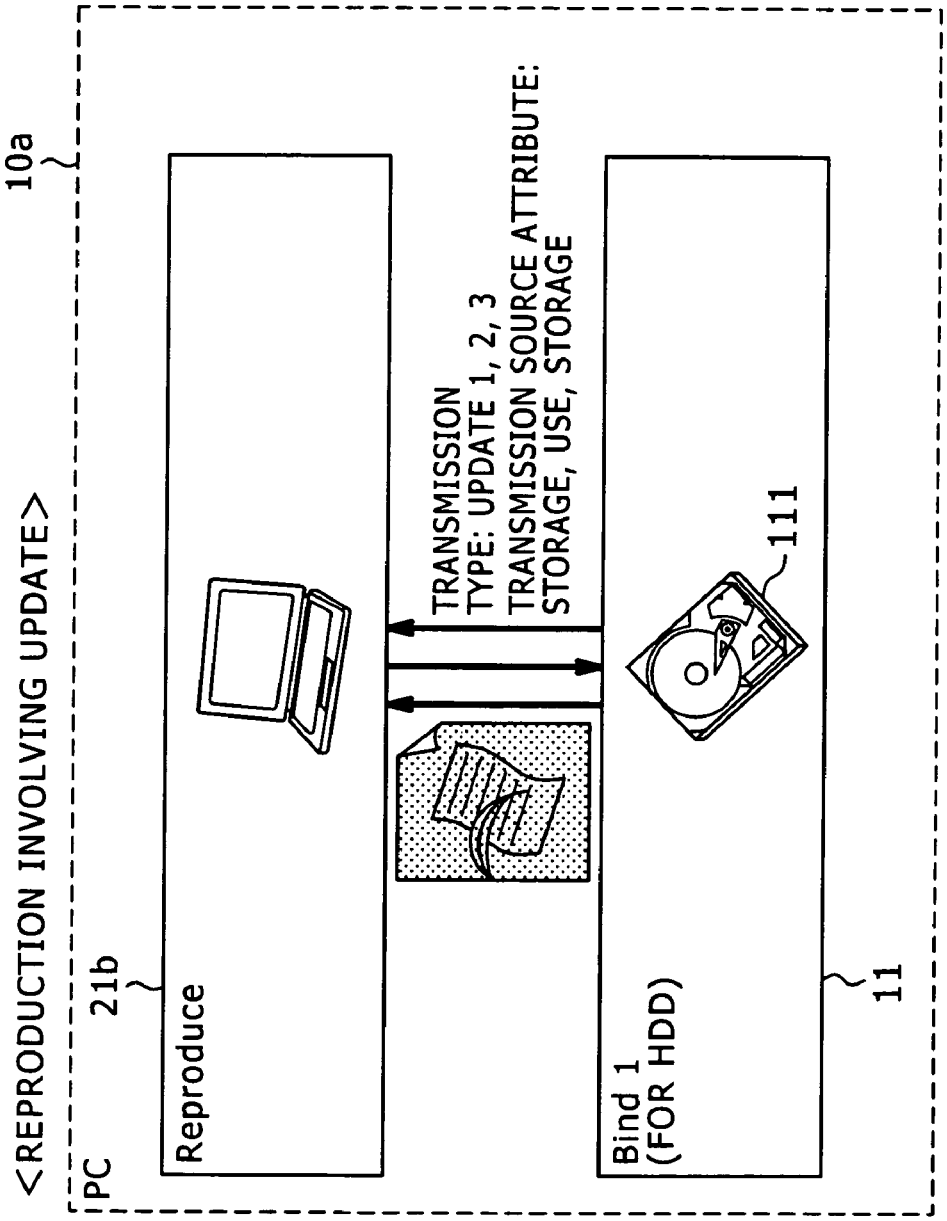
FIG. 24 is a schematic diagram illustrating an outline of a content reproduction control method that involves updating of the license according to the embodiment of the invention.

The following describes the method of content reproduction control that involves the updating of license. First, an outline of this method according to the present embodiment will be described with reference to FIG. 24. FIG. 24 schematically illustrates an outline of this method.

As shown in FIG. 24, the PC 10a has the reproduction component 21b (refer to FIG. 8) for executing reproduction control involving the updating of license reproduction status and the storage component 11 for a HDD.

The PC 10a thus configured is capable of transmitting and receiving three messages for example of which transmission type is "update" between the storage component 11 and the reproduction component 21b, thereby executing the reproduction control involving license update.

To be more specific, the storage component 11 reads the license and its content key from the HDD 111 to create an update request message (transmission type "update 1", transmission source component attribute "storage") and transmits the created message to the reproduction component 21b. In this case, the master copies of the license and its content key K are left stored in the HDD 111. The reproduction component 21b checks the update request message received from the storage component 11 to evaluate the license included in this message, thereby determining whether this content is reproducible or not.

If the license is found reproducible as a result of the above-mentioned verification, then the reproduction component 21b updates the reproduction status of the license, creates an update transfer message (transmission type "update 2", transmission source component attribute "use") including the updated license, and transmits the created message to the storage component 11. The storage component 11 verifies the update transfer message received from the reproduction component 21b and writes the license included in the update transfer message over the license stored in the HDD 111.

Further, the storage component 11 creates an update completion message (transmission type "update 3", transmission source component attribute "storage") including the updated license and transmits the created message to the reproduction component 21b. The reproduction component 21b verifies the update completion message received from the storage component 11, reads the content from the HDD 111, and decrypts the content by the content key extracted from the update completion message, thereby making the content reproducible.

Figure 25:
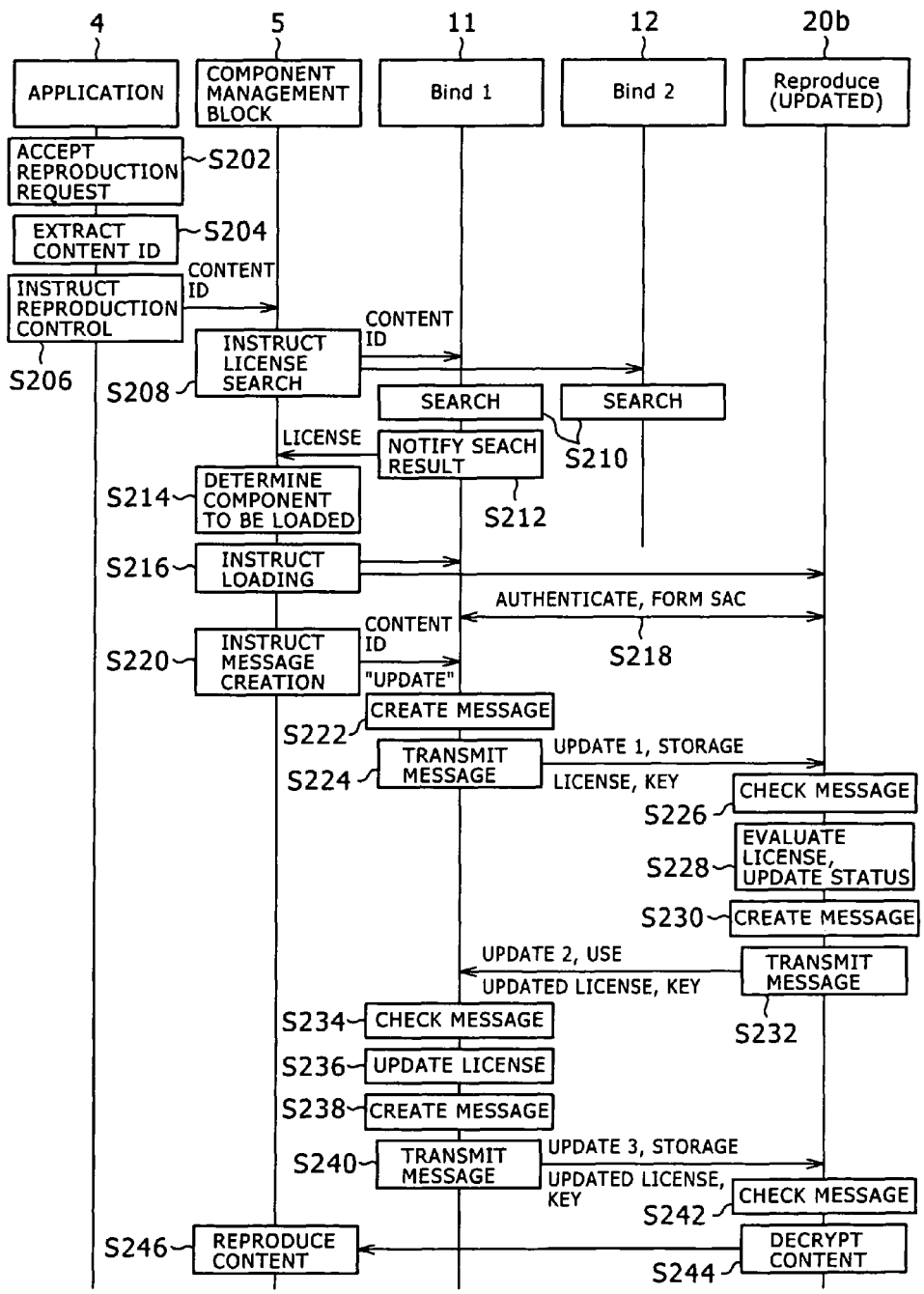
FIG. 25 is a timing chart indicative of a processing flow of the above-mentioned content reproduction control method that involves updating of the license according to the embodiment of the invention.

The following describes in detail a processing flow of the content reproduction control method involving license update according to the present embodiment, with reference to FIG. 25. FIG. 25 is a timing chart indicative of a processing flow of this method.

As shown in FIG. 25, the processing of steps S202 through S214 in this reproduction control processing (with update) is substantially the same as the processing of steps S102 through S114 of the reproduction control processing (without update) described above with reference to FIG. 23, so that detail description thereof will be omitted.

It is assumed here that, in step S214, the license involving the updating of the reproduction status be selected and the storage component 11 and the reproduction component 21b capable of executing the reproduction control involving the updating of the reproduction status be determined as subject to load.

Next, the component management block 5 gives a load command to the storage component 11 and the reproduction component 21b both subject to load determined above (step S216), starting up these components. The storage component 11 and the reproduction component 21b cross authenticate each other, thereby forming a secure communication route, SAC for example, between these components (step S218).

Further, the component management block 5 instructs the storage component 11 to create an update request message (step S220). To be more specific, this message creation command is affected by transmitting the content ID received from the above-mentioned application 4 and transmission type specification information to the storage component 11. This transmission type specification information specifies the transmission type (namely, the type of the message to be created) of the license. Because the reproduction control processing involving update is executed in this processing flow, the transmission type specification information is indicative of transmission type "update 1". The message creation command thus configured allows the component management block 5 to instruct the storage component 11 to transmit a copy of the license corresponding to the above-mentioned content ID to the reproduction component 21b.

Next, in response to the above-mentioned message creation command, the storage component 11 creates an update request message for transmitting the license and content key corresponding to the above-mentioned content ID (step S222). To be more specific, the storage component 11 reads the license and content key corresponding to the above-mentioned content ID from the storage device (the HDD 111 for example) corresponding to the storage component 11 itself. Further, the storage component 11 links the license and content key thus read, transmission type ID "0x03" indicative of "update 1" that is the transmission type specified by the component management block 5, and component attribute ID "0x01" indicative of "storage" that is the attribute of the storage component 11 itself, thereby creating an update request message.

In addition, the storage component 11 transmits the update request message thus created to the reproduction component 21b (step S224). In response, the reproduction component 21b receives the update request message from the storage component 11. Thus, in the update request message transmission processing (step S224), the storage component 11 is equivalent to the above-mentioned transmission source component 31 and the reproduction component 21b is equivalent to the transmission destination component 32.

Then, the reproduction component 21b checks the update request message received from the storage component 11 for validity (step S226). This update request message verification checks if the transmission type ID extracted from the above-mentioned update request message is "0x03" indicative of transmission type "update 1" and the component attribute ID extracted from the above-mentioned update request message is "0x01" indicative of component attribute "storage". Because this verification is executed in substantially the same procedure as the message verification processing described with reference to FIG. 20, detail description of the verification processing will be omitted. If the above-mentioned update request message is found valid as a result of the above-mentioned message verification, then the reproduction component 21b permits the processing of the license extracted from the above-mentioned update request message, upon which the procedure goes to step S228. On the other hand, if the update request message is found invalid, the reproduction component 21b prohibited the processing of this license, upon which the reproduction control processing ends.

Next, the reproduction component 21b evaluates the license extracted from the above-mentioned update request message to determine whether the above-mentioned content requested for reproduction is reproducible (step S228). In this license evaluation processing, the reproduction component 21b evaluates the reproduction condition written to the reproduction condition description section 521 to determine whether the reproduction condition is satisfied or not, as described above. This reproduction condition evaluation processing evaluates reproduction conditions such as reproduction count limit and reproduction time limit and references the reproduction status written to the reproduction condition description section 521 as required.

If the reproduction condition is found not satisfied as a result of this evaluation, the reproduction component 21b prohibits the reproduction of the content requested for reproduction and notifies the application 4 thereof (not shown).

On the other hand, if the reproduction is found satisfied, the reproduction component 21b permits the reproduction of the content requested for reproduction and updates the reproduction status of this license in accordance with the permission of reproduction. To be more specific, in reproduction count control, the reproduction component 21b rewrites the reproduction status such that the number of reproduction has been made is increment by one in accordance of one time of reproduction permission.

Next, in order to make a response to the above-mentioned update request message, the reproduction component 21b creates an update transmission message for transmitting a license with the above-mentioned reproduction status updated (hereafter referred to as an "updated license") and the content key thereof (step S230). To be more specific, the reproduction component 21b links the above-mentioned updated license and the content key extracted from the above-mentioned update request message, transmission type ID "0x04" indicative of "update 2" that is a transmission type denoting the transfer of the updated license and component ID "0x02" indicative of "use" that is the attribute of the reproduction component 21b itself, thereby creating an update transfer message.

Further, the reproduction component 21b transmits the update transfer message thus created to the storage component 11 (step S232). In response, the storage component 11 receives this update transfer message from the reproduction component 21b. Thus, in the processing of transmitting the update transfer message (S232), the reproduction component 21b is equivalent to the above-mentioned transmission source component 31 and the storage component 11 is equivalent to the above-mentioned transmission destination component 32.

Then, the storage component 11 checks the update transfer message received from the reproduction component 21b for validity (step S234). This update transfer message verification checks if the transmission type ID extracted from the above-mentioned update transfer message is "0x04" indicative of transmission type "update 2" and component attribute ID extracted from the above-mentioned update transfer message is "0x02" indicative of component attribute "use". This verification processing is executed in substantially the same procedure as the message verification processing described above with reference to FIG. 20, so that the detail description thereof will be omitted. If the above-mentioned update transfer message is found valid as a result of this message verification, then the storage component 11 permits the storage of the updated license extracted from the above-mentioned update transfer message and the procedure goes to step S326. On the other hand, if the update transfer message is found invalid, then the storage component 11 prohibits the processing of the updated license, upon which the reproduction control processing ends.

Next, the storage component 11 updates the license stored in the storage device (step S236). To be more specific, the storage component 11 writes the updated license extracted from the above-mentioned update transfer message over the license (the unupdated license received in the above-mentioned update request message) stored in the storage device (the HDD 111 for example) of the storage component 11.

Further, in order to make a response to the above-mentioned update transfer message, the storage component 11 creates an update completion message for the notification of the update completion of the license (step S238). To be more specific, the storage component 11 reads the updated license and the content key thereof from the storage device (the HDD 111 for example) of itself. Next, the storage component 11 links the updated license and its content key, transmission type ID "0x05" indicative of "update 3" that is a transmission type denoting the license update completion notification, and component attribute ID "0x01" indicative of "storage" that is the attribute of the storage component 11 itself, thereby creating an update completion message.

Next, the storage component 11 transmits the update completion message thus created to the reproduction component 21b (step S240). In response, the reproduction component 21b receives the update completion message from the storage component 11. Thus, in the update completion message transmission processing (S240), the storage component 11 is equivalent to the above-mentioned transmission source component 31 and the reproduction component 21b is equivalent to the above-mentioned transmission destination component 32.

Then, the reproduction component 21b checks the update completion message received from the storage component 11 for validity (step S242). This update completion message verification checks if the transmission type ID extracted from the above-mentioned update completion message is "0x05" indicative of transmission type "update 3" and component attribute ID extracted from the above-mentioned update completion message is "0x01" indicative of component attribute "storage". This verification processing is executed in substantially the same procedure as the message verification processing described above with reference to FIG. 20, so that the detail description thereof will be omitted. If the above-mentioned update completion message is found invalid as a result of this message verification, then, because the execution of the updating of the license cannot be confirmed, the reproduction component 21b prohibits the reproduction of the content requested for reproduction, upon which the reproduction control processing ends.

On the other hand, if the update completion message is found valid, the reproduction component 21b reads the content of which reproduction has been permitted by the license evaluation of step S228 (namely, the content requested for reproduction) from the content storage block 7 such as the HDD 111, decrypts this content by the content key extracted from the update completion message, and transmits the decrypted content to the application 4 in a reproducible manner (step S244). Consequently, the application 4 executes the reproduction of the decrypted content data (step S246).

Thus, the content reproduction control methods (with and without license update) according to the present embodiment have been described. According to the license reproduction control methods, messages including licenses and content IDs thereof may be transferred between the storage component 11 and the reproduction component 21, thereby preferably controlling the reproduction of content. At this moment, the component that receives these messages checks the received message for validity, so that the illegal transmission of licenses and so on may be prevented from occurring.

In addition, the content and license formats, the transmission protocol of that license, and the basic functions of each component are standardized, so that portable licenses may be transferred also between the user devices 10 having copyright management blocks 3 different installations, thereby preferably executing the control of content reproduction. Especially, the present embodiment is advantageous in that a license stored in a certain user device 10 may be transferred to another user device 10 connected to the former user device 10 via the network 30 in a physically remote manner to preferably control the reproduction by use of the reproduction component 21 of the latter user device 10.

<10. License Move Method>

The following describes a license move method according to the present embodiment. In this license move method, in order to control the move of content between a plurality of storage devices, two storage components 1 and one move component 22 are used to move a license from the first storage device, the source of move, to the second storage device, the destination of move.

Figure 26:
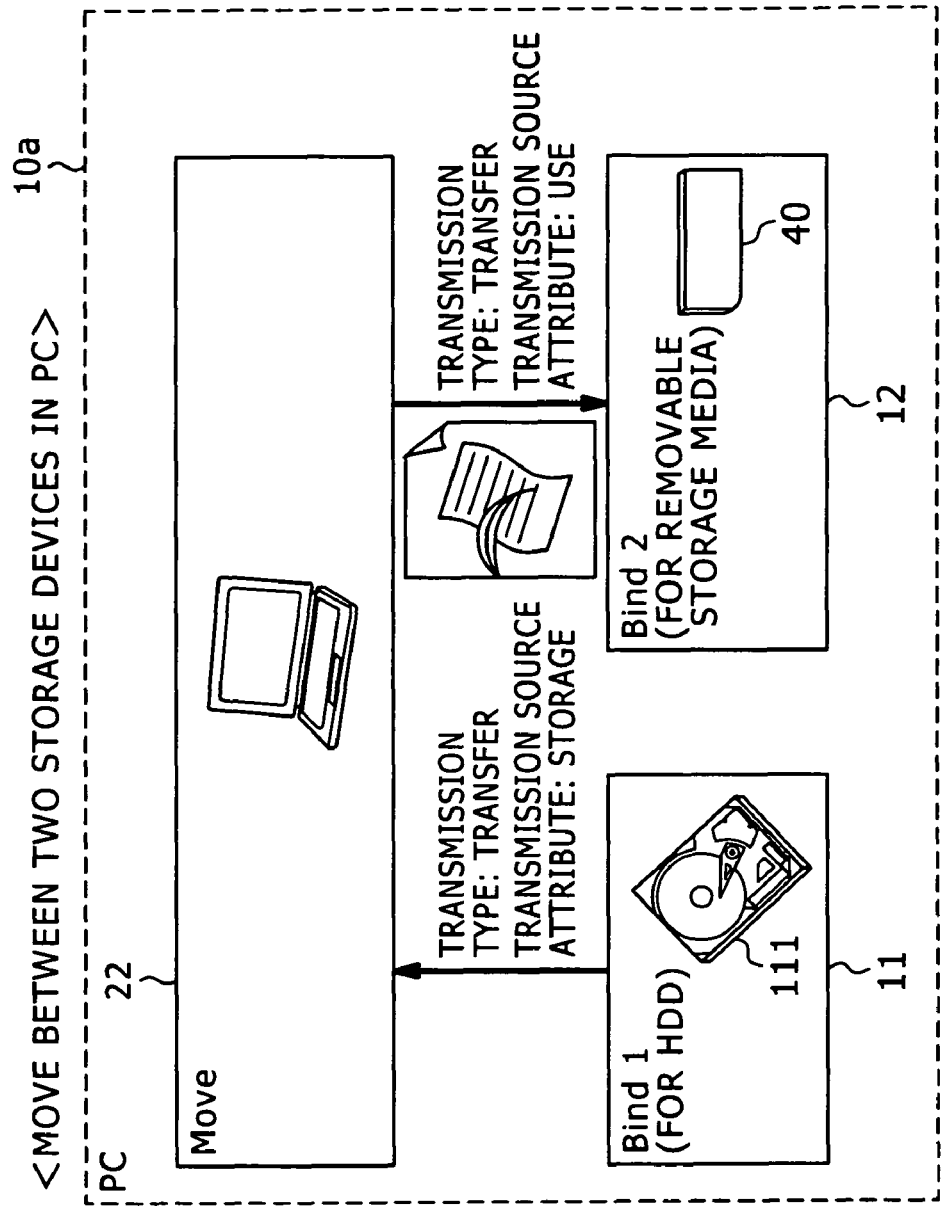
FIG. 26 is a schematic diagram illustrating a license move method for moving licenses between two storage devices in the personal computer according to the embodiment of the invention.

First, the license move method according to the present embodiment will be outlined with reference to FIG. 26. FIG. 26 outlines the license move method in which a license is moved between the two storage devices in the PC 10a according to the present embodiment.

As shown in FIG. 26, the PC 10a includes the move component 22, the storage component 11 (the first storage component) for the HDD 111 that is one example of the first storage device, the source of move, and the storage component 12 (the second storage component) for the removable storage medium 40 that is one example of the second storage device, the destination of move.

The PC 10a thus configured is capable of transferring transfer messages for transmitting the master copy of license between the storage components 11 and 12 and the move component 22, thereby moving a license and a content key thereof from the HDD 111, the source of move, to the removable storage medium 40, the destination of move.

To be more specific, the storage component 11 for HDD transmits (namely, transfers) the master copies of the license and the content key thereof to the move component 22. That is, the storage component 11 reads the license and the content key thereof from the HDD 111. Next, the storage component 11 creates a first transfer message (transmission type "transfer", transmission source component attribute "storage") including the license and the content key thereof and transmits the created message to the move component 22. At this moment, the storage component 11 deletes the license and the content key thereof from the HDD 111.

The move component 22 checks the first transfer message received from the storage component 11 and evaluates the license included in this message to determine whether the license and the content key are movable. If the license and the content key are found movable, then the move component 22 updates the move status of the license by counting the move count as required and transfers the license and so on to the storage component 12 for the removable storage medium 40. To be more specific, the move component 22 creates a second transfer message (transmission type "transfer", transmission source component attribute "use") including the license and the content key received from the storage component 11 and transmits the created second transfer message to the storage component 12.

The storage component 12 checks the second transfer message received from the move component 22 and evaluates the license included in this message to determine whether the license and the content key may be stored in the removable storage medium 40. If the license and the content key are found storable, then the storage component 12 writes the license and the content key to the removable storage medium 40 for storage.

Thus, transferring transfer messages between the two storage components, the storage component 11 and the storage component 12, and the move component 22 allows the move of the license and so on between two storage devices, the storage devices 111 and the storage device 40. It should be noted that the above-mentioned first transfer message is equivalent to the first message and the above-mentioned second transfer message is equivalent to the second message.

Figure 27:
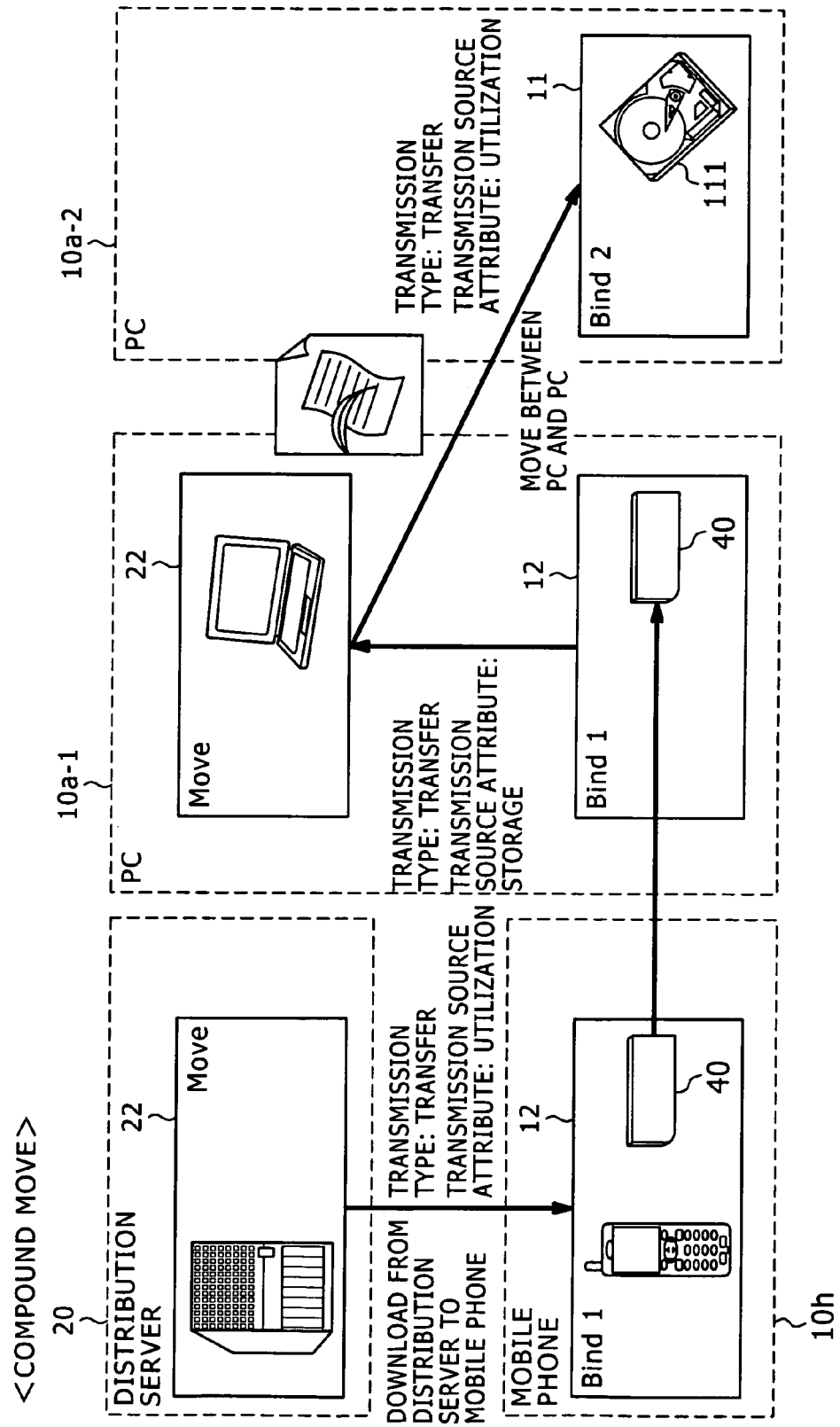
FIG. 27 is a schematic diagram illustrating an outline of a license move method for moving licenses between a plurality of devices according to the embodiment of the invention.

In addition, use of the above-mentioned license move method allows the move of licenses and content keys thereof between various types of devices in a complex manner as shown in FIG. 27. FIG. 27 outlines the license move method for moving licenses and so on between a plurality of devices according to the present embodiment.

As shown in FIG. 27, the move component 22 of the distribution server 20 transmits a transfer message (transmission type "transfer", transmission source component attribute "use") including a license and so on read from a storage device (not shown) of the distribution server 20 to the storage component 12 of the mobile phone 10h that is one of the user devices 10. Next, the storage component 12 of the mobile phone 10h checks the received transfer message and writes the license and so on included in this transfer message to the removable storage medium 40 for storage. Thus, the license and so on stored in the distribution server 20 may be downloaded to the mobile phone 10h.

Further, the above-mentioned removable storage medium 40 is unloaded from the mobile phone 10h and loaded on a first PC 10a-1. The first PC 10a-1 is able to move the license and so on stored in the removable storage medium 40 to the HDD 111 of a second PC 10a-2 via the PC 10a-1 and the network 30.

To be more specific, the storage component 12 creates a transfer message (transmission type "transfer", transmission source component attribute "storage") including the license and so on read from the removable storage medium 40 and transmits the created transfer message to the move component 22 of the first PC 10a-1. Further, the move component 22 of the first PC 10a-1 checks the received transfer message and evaluates the move condition of the license extracted from this transfer message. If the move condition is found satisfied, then the move component 22 creates a transfer message (transmission type "transfer", transmission source component attribute "use") including the license and so on extracted from the transfer message and transmits the created transfer message to the storage component 11 of the second PC 10a-2 via the network 30. In response, the storage component 11 of the second PC 10a-2 checks the received transfer message and writes the license and so on included in the checked transfer message to the HDD 111 for storage.

Thus, arranging the move component 22 and the storage components 11 and 12 on various devices and transferring transfer messages between these components as described above allow the move of licenses and content keys thereof within a scope of the license move conditions.

Figure 28:
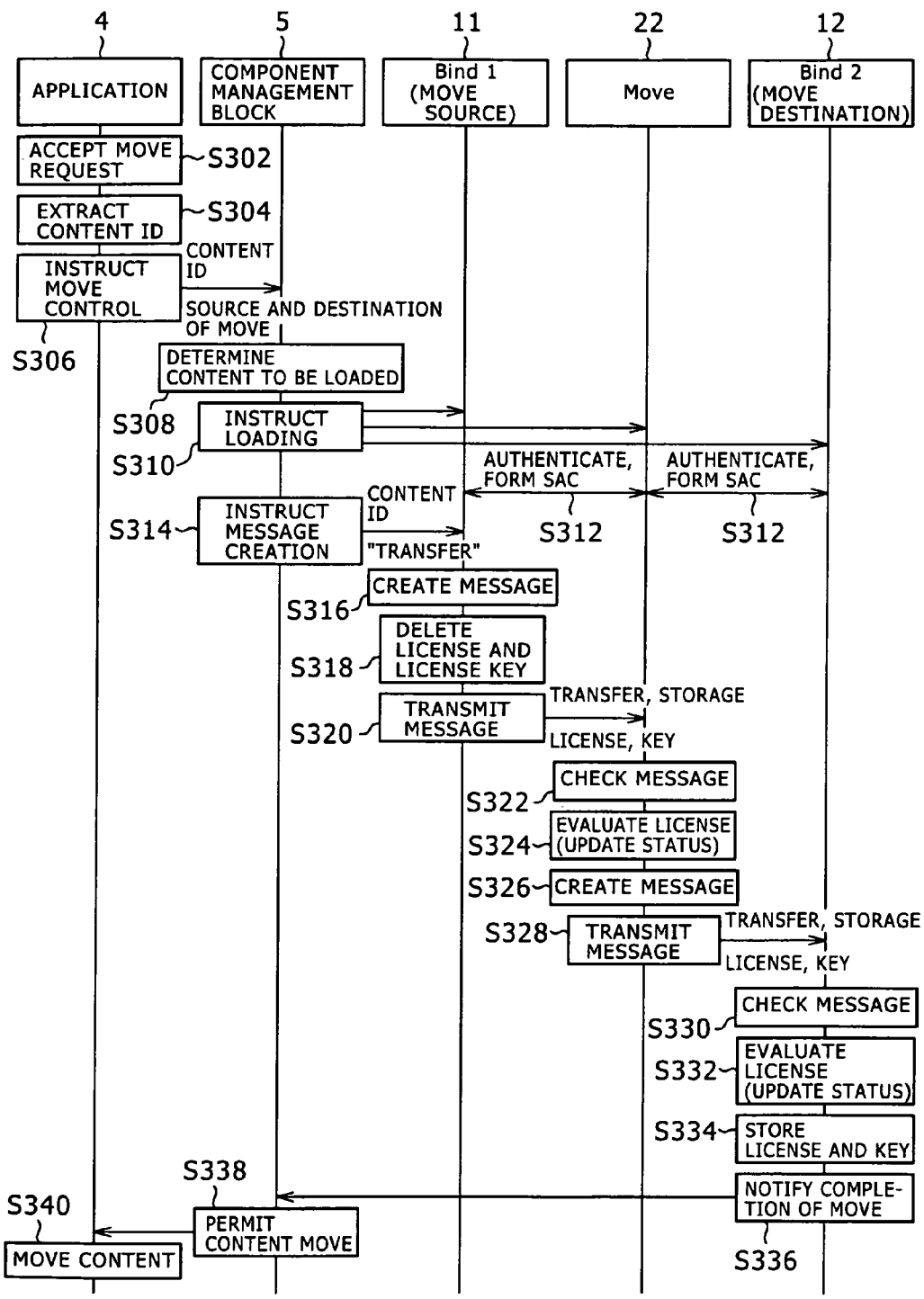
FIG. 28 is a timing chart indicative of a processing flow of a license move method according to the above-mentioned embodiment of the invention.

The following describes in detail a processing flow of the above-mentioned license move method according to the present embodiment with reference to FIG. 28. FIG. 28 is a timing chart indicative of a processing flow of the license move method according to the present embodiment.

As shown in FIG. 28, the application 4 receives a request for moving a user-specified piece of content from the user (step S302). Next, the application 4 extracts the content ID from a content file of the content requested for move (step S304). Further, the application 4 transmits move control command information to the component management block 5 to instruct the component management block 5 to execute the move control of the content requested for move, namely the move control of the license and the content key thereof corresponding to that content (step S306). This move control command information includes the above-mentioned content ID, use information indicative the use of content is "move", and information for specifying a storage device from which the license and the content key are moved (a first storage device) and a storage device to which the content and the license are moved (a second storage device), for example.

Next, on the basis of the above-mentioned move control command information received from the application 4 for example, the component management block 5 determines a license processing component subject to load (or start up) (step S308). For example, the component management block 5 determines, as components subject to load, the move component 22, the storage component 11 corresponding to the move source storage component specified by the above-mentioned move control command information (hereafter referred to as a move source storage component 11), and the storage component 12 corresponding to the storage device of the move destination specified by that information (hereafter referred to as a move destination storage component 12). It should be noted that, in this processing of determining components subject to load, the component management block 5 may search for a storage component holding the license and content key thereof corresponding to the content requested for move in the same manner as steps S108 through S114 shown in FIG. 23 for example, thereby determining the obtained storage component as the component subject to load.

Further, the component management block 5 gives a load command to the storage components 11 and 12 and the move component 22 determined as the storage components subject to load, thereby starting up these components (step S310). Consequently, the move source storage component 11 and the move component 22 and the move component 22 and the move destination storage component 12 cross authenticate each other, thereby forming a secure communication route, SAC for example, between these components (step S312).

In addition, the component management block 5 gives a command to the move source storage component 11 to create a transfer message (step S314). To be more specific, this message creation command is affected by transmitting the content ID and transmission type specification information received from the application 4 to the move source storage component 11. In the present processing flow, license move processing is executed, so that the above-mentioned transmission type specification information is indicative of transmission type "transfer". This message creation command allows the component management block 5 to instruct the move source storage component 11 to transmit the master copy of the license corresponding to the above-mentioned content ID to the move component 22.

Next, in response to the above-mentioned message creation command, the move source storage component 11 creates a transfer message (a first message) for transferring the license and the content key thereof corresponding to the above-mentioned content ID (step S316). To be more specific, the move source storage component 11 reads the license and the content key thereof corresponding to the above-mentioned content ID from the move source storage device (the HDD 111 for example) of its own. Next, the move source storage component 11 links the license and the content key thus read, transmission type ID "0x01" indicative of "transfer" that is the transmission type specified by the component management block 5, and component attribute ID "0x01" indicative of "storage" that is the attribute of the move source storage component 11 itself, thereby creating the transfer message.

Further, the move source storage component 11 invalidates (or deletes) the above-mentioned license and content key thereof stored in the move source storage device (the HDD 111 for example) (step S318). Thus, invalidating the license and so on stored in the move source storage device before transmitting the transfer message in next step S320 may prevent an unauthorized user for example from interfering the license invalidation processing by illegal measures after the transmission of the transfer message, as a result of which the license and so on exist on both the move source and the move destination.

Then, the move source storage component 11 transmits the transfer message created in step S316 to the move component 22 (step S320). In response, the move component 22 receives this transfer message from the move source storage component 11. Thus, in the transfer message transmission processing (S320), the move source storage component 11 is equivalent to the above-mentioned transmission source component 31 and the move component 22 is equivalent to the above-mentioned transmission destination component 32.

Next, the move component 22 checks the transfer message received from the move source storage component 11 for validity (step S322). This transfer message verification processing checks if transmission type ID extracted from the above-mentioned transfer message is "0x01" indicative of transmission type "transfer" and component attribute ID extracted from the above-mentioned transfer message is "0x01" indicative of component attribute "storage". This verification is executed in substantially the same procedure as the message verification processing described with reference to FIG. 20, so that detail description thereof will be omitted. If the above-mentioned transfer message is found valid as a result of the above-mentioned verification processing, then the move component 22 permits the processing of the license extracted from the transfer message, upon which the procedure goes to step S324. On the other hand, if the transfer message is found invalid, then the move component 22 prohibits the processing of this license, upon which the move processing ends.

Further, the move component 22 evaluates the license extracted from the above-mentioned transfer message to determine whether the license and the content key thereof are movable (step S324). In this license evaluation processing, the move component 22 evaluates the move condition written to the move condition description section 522 of that license to determine whether the move condition is satisfied. In this determination, the move condition such as move count limit or move time limit is checked and, as required, the move status written to the move condition description section 522 is referenced.

If the move condition is found dissatisfied as a result of the above-mentioned evaluation, then the move component 22 prohibits the move of the license and content key thereof extracted from the above-mentioned transfer message and notifies the application 4 thereof (not shown).

On the other hand, if the move condition is found satisfied, then the move component 22 permits the move of the license and content key thereof extracted from the above-mentioned transfer message and, as required, updates the move status of that license. To be more specific, in the control of move count for example, the move component 22 rewrites the move status so as to increment the number of times move has been made by one every time the move is permitted.

Next, the move component 22 creates a transfer message (a second message) for transferring the license and content key thereof permitted for move (step S326). To be more specific, if the license (move) status permitted for move has been updated, the move component 22 links the license permitted for move (if the move status has been update, the updated license), the content key permitted for move, transmission type ID "0x01" indicative of transmission type "transfer", and component attribute ID "0x02" indicative of "use" that is the attribute of the move component 22 itself, thereby creating the transfer message.

In addition, the move component 22 transmits the transfer message thus created to the move destination storage component 12 (step S328). In response, the move destination storage component 12 receives the above-mentioned transfer message from the move component 22. Thus, in the transfer message transmission processing (S328), the move component 22 is equivalent to the transmission source component 31 and the move destination storage component 12 is equivalent to the transmission destination component 32.

Then, the storage component 12 checks the transfer message received from the move component 22 for validity (step S330). This transfer message verification processing checks if transmission type ID extracted from the above-mentioned transfer message is "0x01" indicative of transmission type "transfer" and component attribute ID is "0x02" indicative of component attribute "use". This verification processing is executed in substantially the same procedure as the message verification described above with reference to FIG. 20, so that detail description thereof will be omitted. If the above-mentioned transfer message is found valid as a result of the above-mentioned verification, then the move destination storage component 12 permits the processing of the license extracted from the above-mentioned transfer message, upon which the procedure goes to step S334. On the other hand, if the above-mentioned transfer message is found invalid, then the move destination storage component 12 prohibits the processing of the license, upon which the move processing ends.

Next, the move destination storage component 12 evaluates the license extracted from the above-mentioned transfer message to determine whether the license and the content key thereof may be stored in the second storage device (step S332). In this license evaluation processing, the move destination storage component 12 evaluates the storage condition written to the storage condition description section 511 of that license as described above to see if the storage condition is satisfied or not. In this storage condition evaluation processing, the storage condition such as storage count limit or storage time limit for example and, as required, the storage status written to the storage condition description section 511 is referenced.

If the storage condition is found dissatisfied as a result of this evaluation, then the move destination storage component 12 prohibits the storage of the license extracted from the above-mentioned transfer message, thereby executing a pause sequence.

On the other hand, if the storage condition is found satisfied, then the move destination storage component 12 permits the storage of the license and content key thereof extracted from the above-mentioned transfer message and, as required, updates the storage status of that license. To be more specific, in the storage count control, the move destination storage component 12 rewrites the storage status so as to increment the number of times storage has been made by one every time the above-mentioned storage permission is made.

Then, the move destination storage component 12 writes the license and content key thereof permitted for storage to the second storage device (the removable storage medium 40 for example) corresponding to the storage component 12 (step S334).

Thus, the license and the content key thereof corresponding to the content requested for move are moved from the first storage device to the second storage device. When the move of the license and so on has been completed, the move destination storage component 12 transmits a move completion notification to the component management block 5 (step S336) for example and, in response, the component management block 5 transmits a content move permission to the application 4 (step S338), for example.

Consequently, in response to the content move permission received from the component management block 5, the application 4 moves the content requested for move from the first application device to the second application device (step S340). To be more specific, the application 4 reads the content from the first storage device, writes this content to the second storage device, and deletes this content from the first storage device, for example.

Thus, the flow of processing by the license move method according to the present embodiment has been described. According to the license move method described above, a message including a content and a content ID may be transferred between the move source and move destination storage components 11 and 12 and the move component 22 to preferably control the move and the license and content concerned. At this moment, the message receiving component checks each message for validity every time it is received, thereby preventing the illegal transmission of licenses and so on.

In addition, the content and license formats, the transmission protocol of that license, and the basic functions of each component are standardized, so that licenses may be transferred in a portable manner between the user devices 10 having copyright management blocks 3 of different installations, thereby preferably controlling the move of licenses and content. Especially, the present embodiment is advantageous that licenses and content may be preferably moved between physically remotely interconnected user devices 10 via the network 30 without dependent on the installations of the copyright management blocks 3 of these user devices 10. Therefore, the novel configuration enhances the portability of content between user devices 10, which in turn enhances the user convenience.

<11. License Copy Method>

The following describes a method of copying or duplicating licenses. This license copy method is used to control the duplication of content between a plurality of storage devices, to be more specific, two storage components, the component 1 and the copy component 23, are used to copy a license stored in a copy source first storage device to a copy destination second storage device.

Figure 29:
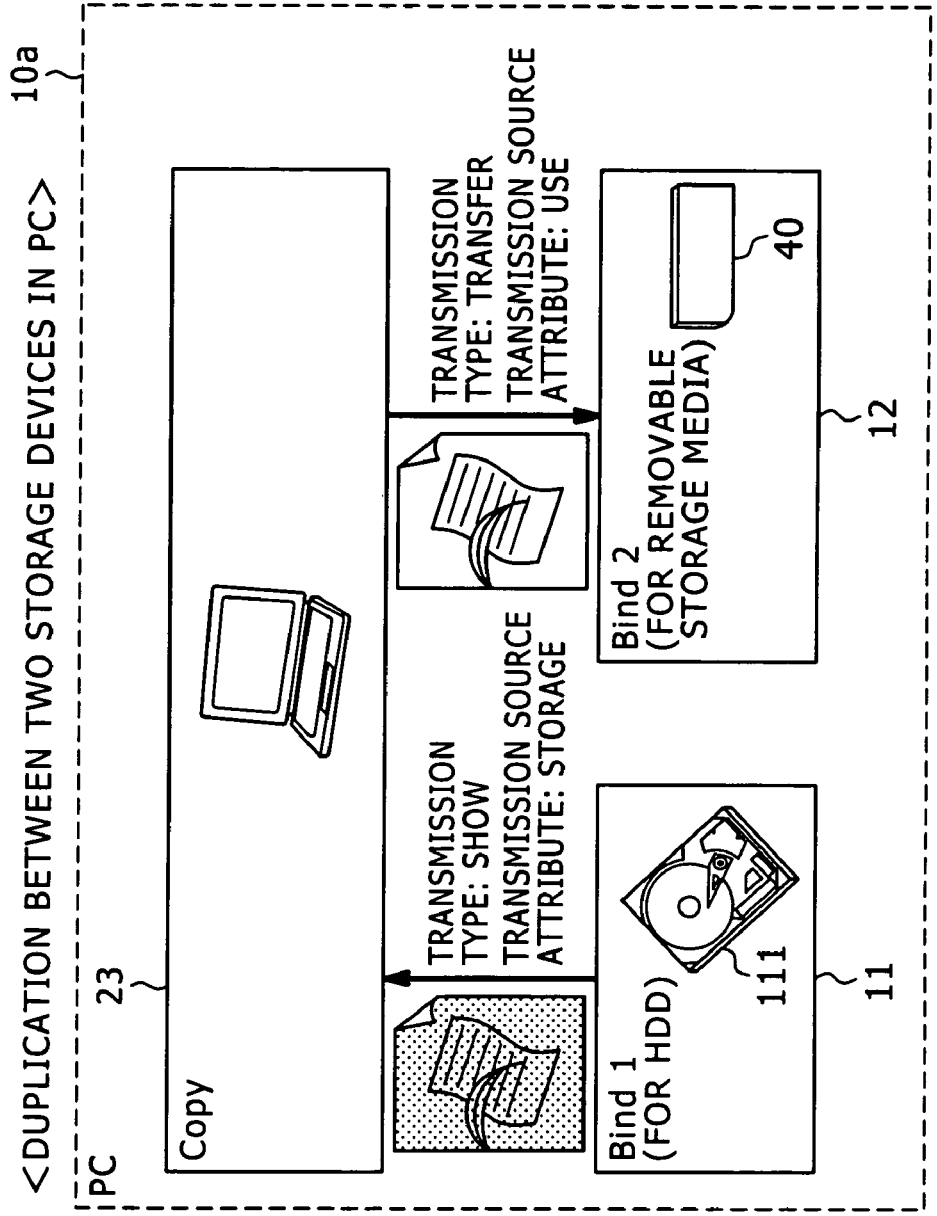
FIG. 29 is a schematic diagram illustrating a license copy method for copying licenses between two storage devices in the personal computer according to the embodiment of the invention.

First, an outline of the license copy method according to the present embodiment will be described with reference to FIG. 29. FIG. 29 outlines the license copy method for copying a license between two storage devices of the PC 10*a* according to the present embodiment.

As shown in FIG. 29, the PC 10*a* includes the copy component 23, the storage component 11 (a first storage component) for the HDD 111, one example of a first storage device providing the copy source, and the storage component 12 (a second storage component) for the removable storage medium 40, one example of a second storage device providing the copy destination.

The PC 10*a* thus configured transmits and receives transfer messages for transmitting a show message for transmitting a copy of each license and a transfer message for transmitting the master copy of each license between the storage components 11 and 12 and the copy component 23, thereby copying a license and a content key thereof from the copy source HDD 111 to the copy destination removable storage medium 40.

To be more specific, the storage component 11 for HDD transmits (namely, shows) the copies of a license and a content key thereof to the copy component 23. Namely, the storage component 11 reads a license and a content key thereof from the HDD 111. Next, the storage component 11 creates a show message (transmission type "show", transmission source component attribute "storage") including these license and content key and transmits the created show message to the copy component 23. At this moment, the storage component 11 does not delete the license and the content key stored in the HDD 111.

The copy component 23 checks the show message received from the storage component 11 and then evaluates the license included in this show message, thereby determining whether these license and copy content may be copied. If these license and content key are found copyable, the copy component 23 updates the copy status of the license by counting copy count as required and transfers the license and so on to the storage component 12 for the removable storage medium 40. To be more specific, the copy component 23 creates a transfer message (transmission type "transfer", transmission source component attribute "use") including the license and content key received from the above-mentioned storage component 11 and transmits the created transfer message to the storage component 12.

The storage component 12 checks the transfer message received from the copy component 23 and then evaluates the license included in the checked transfer message to determine whether these license and content key may be stored in the removable storage medium 40. If these license and content key are found storable, the storage component 12 writes these license and content key to the removable storage medium 40 for storage.

Thus, transferring a show message and a transfer message between two storage components, the storage component 11 and the storage component 12 and the copy component 23, allows the copying of a license and so on between two storage devices, the HDD 111 and the removable storage medium 40. It should be noted that the above-mentioned show message is equivalent to the first message and the above-mentioned transfer message is equivalent to the second message.

As with the move processing described above with reference to FIG. 27, arranging the copy component 23 and the storage components 11 and 12 on various devices in a distributed manner and transferring a show message and a transfer message between these components allow the copying of these license and content key within a scope in which the license copy condition is satisfied.

Figure 30:
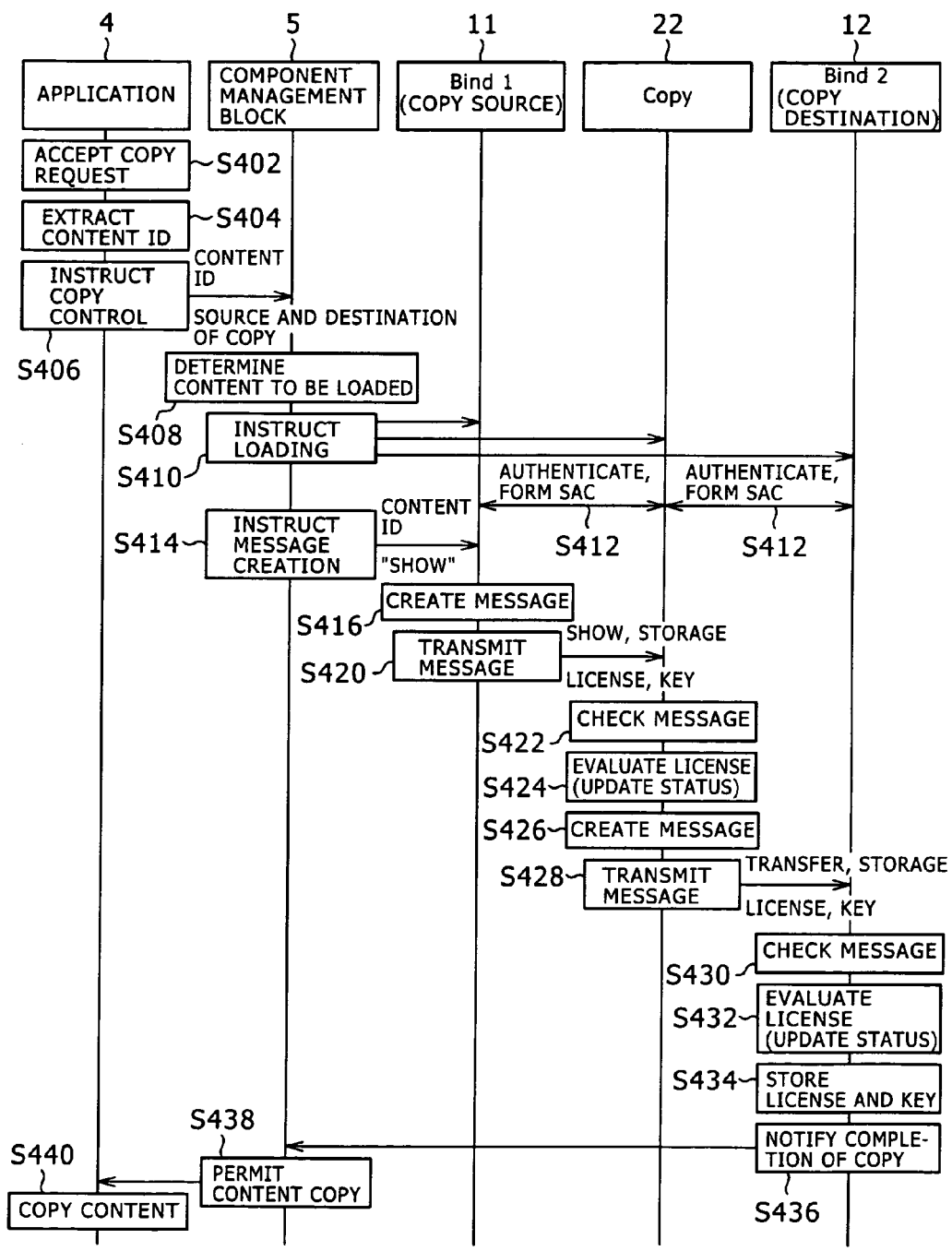
FIG. 30 is a timing chart indicative of a processing flow of a license copy method according to the embodiment of the invention.

The following describes a processing flow of the license copy method according to the present embodiment with reference to FIG. 30. FIG. 30 is a timing chart indicative of the processing flow of the license copy method according to the present embodiment.

As shown in FIG. 30, the application 4 receives a request for copying the user-specified content from the user (step S402). Next, the application 4 extracts the content ID from a content file of the content requested for copying (step S404). Further, the application 4 transmits copy control command information to the component management block 5 to instruct the component management block 5 to execute copy control on the content requested for copying, namely, on the license and the content key thereof corresponding to that content (step S406). This copy control command information includes the above-mentioned content ID, use information indicative that content use is "copy", and information for specifying the copy source storage device (the first storage device) and the copy destination storage device (the second storage device) between which the content and so on are copied, for example.

Next, on the basis of the copy control command information received from the application 4 for example, the component management block 5 determines a license processing component subject to load (or start up) (step S408). For example, the component management block 5 determines, as the component subject to load, the copy component 23, the storage component 11 corresponding to the copy source storage device specified by the above-mentioned copy control command information (hereafter referred to as a copy source storage component 11), and the storage component 12 corresponding to the specified copy destination storage device (hereafter referred to as a copy destination storage component 12). It should be noted that, in this processing of determining components subject to load, the component management block 5 may search for storage components the license and content key thereof corresponding to the content requested for copying on the basis of the content ID as with above-mentioned steps S108 through S114 shown in FIG. 23 for example, thereby determining the storage components subject to load.

Further, the component management block 5 gives a load command to the storage components 11 and 12 and the copy component 23 determined above as the storage components subject to load, thereby starting up these storage components (step S410). Consequently, the copy source storage component 11 and the copy component 23 and the copy component 23 and the copy destination storage component 12 cross authenticate each other, thereby forming a secure communication route, SAC for example, between these components (step S412).

In addition, the component management block 5 instructs the copy source storage component 11 to create a show message (step S414). To be more specific, this message creation command is affected by transmitting the content ID received from the application 4 and transmission type specification information to the copy source storage component 11. In the present processing flow, license copy processing is executed, so that the above-mentioned transmission type specification information is indicative of transmission type "show". This message creation command allows the component management block 5 to instruct the copy source storage component 11 to transmit a copy of the license corresponding to the content ID to the copy component 23.

Next, in response to the above-mentioned message creation command, the copy source storage component 11 creates a show message (or a first message) for transferring the license and content key thereof corresponding to the above-mentioned content ID (step S416). To be more specific, the copy source storage component 11 reads the license and content key thereof corresponding to the above-mentioned content ID from the storage device (the HDD 111 for example) corresponding to itself. Further, the copy source storage component 11 links these license and content key thus read, transmission type ID "0x02" indicative of "show" that is the transmission type specified by the component management block 5, and component attribute ID "0x01" indicative of "storage" that is the attribute of the copy source storage component 11 itself, thereby creating a show message.

It should be noted that, unlike the above-mentioned license move processing, the license copy method does not invalidate (or delete) the above-mentioned license and content key thereof stored in the copy source storage device (the HDD 111 for example).

Then, the copy source storage component 11 transmits the show message created in step S416 to the copy component 23 (step S420). In response, the copy component 23 receives this show message from the copy source storage component 11. Thus, in the show message transmission processing (S420), the copy source storage component 11 is equivalent to the transmission source component 31 and the copy component 23 is equivalent to the transmission destination component 32.

Next, the copy component 23 checks the show message received from the copy source storage component 11 for validity (step S422). This show message verification processing checks if the transmission type ID extracted from the above-mentioned show message is "0x02" indicative of transmission type "show" and the component attribute ID extracted from the above-mentioned show message is "0x01" indicative of component attribute "storage". This verification processing is executed in substantially the same procedure as the message verification processing described with reference to FIG. 20, so that detail description thereof will be omitted. If the above-mentioned show message is found valid as a result of the message verification processing, then the copy component 23 permits the processing of the license extracted from the above-mentioned show message, upon which the procedure goes to step S424. On the other hand, if the above-mentioned show message is found invalid, the copy component 23 prohibits the processing of that license, upon which the copy processing ends.

Further, the copy component 23 evaluates the license extracted from the show message to determine whether these license and content key may be copied (step S424). This license evaluation processing evaluates the copy condition written to the copy condition description section 523 of that license to determine whether the copy condition is satisfied. In this copy condition evaluation, the copy condition such as copy count limit or copy time limit for example is evaluated and, as required, the copy status written to the copy condition description section 523 is referenced.

If the copy condition is found dissatisfied as a result of the evaluation, then the copy component 23 prohibits the copying of these license and content key extracted from the above-mentioned show message and notifies the application 4 thereof (not shown).

On the other hand, if the copy condition is found satisfied, then the copy component 23 permits the copying of these license and content key extracted from the above-mentioned show message and, as required, updates the copy status of that license. To be more specific, in copy count control for example, the copy component 23 rewrites the copy status so as to increment the number of times copy has been made by one every time copying is permitted.

Next, the copy component 23 creates a transfer message (or a second message) for transferring these license and content key permitted for copy (step S426). To be more specific, the copy component 23 links the license permitted for copy (if the copy status has been updated, the updated license), the content key permitted for copy, transmission type ID "0x01" indicative of transmission type "transfer", and component attribute ID "0x02" indicative of "use" that is the attribute of the copy component 23 itself, thereby creating a transfer message.

Further, the copy component 23 transmits the created transfer message to the copy destination storage component 12 (step S428). In response, the copy destination storage component 12 receives the transfer message from the copy component 23. Thus, in the transfer message transmission processing (S428), the copy component 23 is equivalent to the above-mentioned transmission source component 31 and the copy destination storage component 12 is equivalent to the above-mentioned transmission destination component 32.

Then, the copy destination storage component 12 checks the transfer message received from the copy component 23 for validity (step S430). This transfer message verification processing checks if the transmission type ID extracted from the above-mentioned transfer message is "0x01" indicative of transmission type "transfer" and the component attribute ID extracted from the above-mentioned transfer message is "0x02" indicative of component attribute "use". This verification processing is executed in substantially the same procedure as the message verification described above with reference to FIG. 20, so that detail description thereof will be omitted. If the above-mentioned transfer message is found valid as a result of the above-mentioned verification processing, then the copy destination storage component 12 permits the processing of the license extracted from the above-mentioned transfer message, upon which the procedure goes to step S434. On the other hand, if the above-mentioned transfer message is found invalid, then the copy destination storage component 12 prohibits the processing of that license, upon which the copy processing ends.

Next, the copy destination storage component 12 evaluates the license extracted from the above-mentioned transfer message to determine whether these license and content key may be stored in the second storage device (step S432). This license evaluation processing evaluates the storage condition written to the storage condition description section 511 of that license, thereby determining whether the storage condition is satisfied or not, as described before. In this storage condition evaluation processing, the storage condition such as storage count limit or storage time limit for example is evaluated and, as required, the storage status written to the storage condition description section 511 is referenced.

If the storage condition is found dissatisfied as a result of this evaluation, then the copy destination storage component 12 prohibits the storage of the license extracted from the above-mentioned transfer message, thereby executing a pause sequence.

On the other hand, if the storage condition is found satisfied, the copy destination storage component 12 permits the storage of these license and content key extracted from the above-mentioned transfer message and, as required updates the storage status of that license. To be more specific, in storage count control for example, the storage destination storage component 12 rewrites the storage status so as to increment the number of times storage has been made by one every time storage is permitted.

Then, the copy destination storage component 12 writes the above-mentioned license and content key permitted for storage to the second storage device (the removable storage medium 40 for example) corresponding to the storage component 12 itself (step S434).

Thus, these license and content key requested for copying are copied from the first storage device to the second storage device. When the copying of the license and so on has been completed, the storage destination storage component 12 notifies the component management block 5 thereof (step S436). In response, the component management block 5 gives a content copy permission to the application 4 (step S438).

Consequently, in response to the notification of the permission of content copying received from the component management block 5, the application 4 copies the above-mentioned content requested for copying from the first storage device to the second storage device (step S440). To be more specific, the application 4 reads that content from the first storage device and writes that content to the second storage device without deleting that content from the first storage device, for example.

Thus, the processing flow of the license copy method according to the present embodiment has been described. According to this license copy method, a message including a license and a content ID may be transferred between the copy source storage component 11 and the copy destination storage component 12 and the copy component 23, thereby preferably controlling the copying of the license and the corresponding content. At this moment, the message receiving component checks the received message for validity every time it is received, thereby preventing the illegal transmission of licenses and so on.

In addition, the content and license formats, the transmission protocol of that license, and the basic functions of each component are standardized, so that licenses may be transferred in a portable manner between the user devices 10 having copyright management blocks 3 of different installations, thereby preferably controlling the copying of licenses and content. Especially, the present embodiment is advantageous that licenses and content may be preferably copied between physically remotely interconnected user devices 10 via the network 30 without dependent on the installations of the copyright management blocks 3 of these user devices 10. Therefore, the novel configuration enhances the portability of content between user devices 10, which in turn enhances the user convenience.

<12. License Rent Method>

The following describes a license rent method according to the present embodiment. In this license rent method, for the purpose of controlling the renting of content between a plurality of storage devices, two components, the storage component 1 and the rent component 24, are used to update a rent source license stored in a first storage device that is the rent source, a license for rent is created on the basis of this updated rent source license, and the created license for rent is rented to a second storage device that is the rent destination. This rent processing is equivalent to the check-out processing of SDMI.

Figure 31:
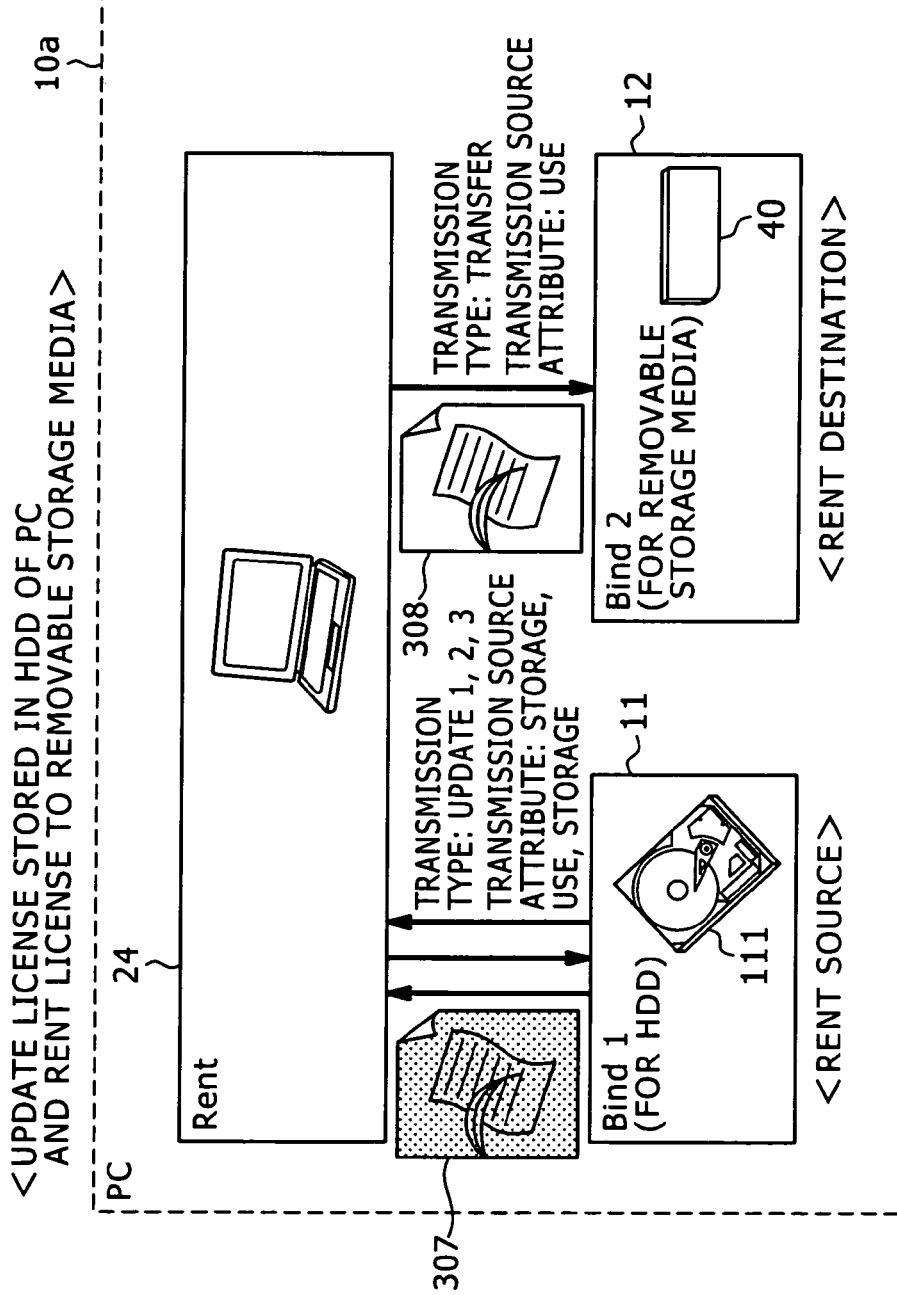
FIG. 31 is a schematic diagram illustrating an outline of a license rent-out method for renting out licenses between two storage means in the personal computer according to the above-mentioned embodiment of the invention.

First, the license rent method according to the present embodiment will be outlined with reference to FIG. 31. FIG. 31 shows an outline of the license rent method for renting licenses between two storage devices in the PC 10a according to the present embodiment.

As shown FIG. 31, the PC 10a has the rent component 24, the storage component 11 (or a first storage component) for the HDD 111, one example of the first storage device providing the rent source, and the storage component 12 (or a second storage component) for the removable storage medium 40, one example of the second storage device providing the rent destination.

The PC 10a thus configured is capable of transmitting and receiving updated messages between the rent source storage component 11 and the rent component 24 to update a rent source license 307 stored in the HDD 111 that is the rent source, thereby creating a license for rent 308. Also, the PC 10a is capable of renting the above-mentioned license for rent 308 to the removable storage medium 40 by transmitting a transfer message from the rent component 24 to the rent destination storage component 12.

To be more specific, the rent source storage component 11 reads the rent source license 307 and the content key thereof from the HDD 111 to create an update request message (transmission type "update 1", transmission source component attribute "storage") and transmits the created update request message to the rent component 24. It should be noted that the rent source license 307 is a license written with a rent condition, a reproduction condition, and storage condition as a use condition (refer to FIG. 11).

Next, the rent component 24 checks the update request message received from the rent source storage component 11 and then evaluates the rent source license 307 included in this message, thereby determining whether the rent source license 307 and the content key thereof are rentable. If these license and content data are found rentable, the rent component 24 updates the rent status of the rent source license 307 to create an update transfer message (transmission type "update 2", transmission source component attribute "use") including the updated rent source license and the content key thereof, thereby transmitting the created update transfer message to the rent source storage component 11.

Further, the rent source storage component 11 checks the update transfer message received from the rent component 24 and then writes the updated rent source license 307 included in the update transfer message over the rent source license 307 stored in the HDD 111. Then, the rent source storage component 11 creates an update completion message (transmission type "update 3", transmission source component attribute "storage") including the updated rent source license 307 and the content key thereof and transmits the created message to the rent component 24.

Next, the rent component 24 checks the update completion message received from the storage component 11 and creates the license for rent 308 on the basis of the rent source license 307. This license for rent 308 is a license written with the rent condition, reproduction condition, and storage condition extracted from the rent source license 307 and a newly created return condition (refer to FIG. 12). Then, the rent component 24 creates a transfer message (transmission type "transfer", transmission source component attribute "use") including the created license for rent 308 and the content key thereof and transmits the created message to the rent destination storage component 12.

Next, the rent destination storage component 12 checks the transfer message received from the rent component 24 and evaluates the license for rent 308 included in this message, thereby determining whether the license for rent 308 and the content key thereof may be stored in the removable storage medium 40. If these license 308 and content key are found storable, then the rent destination storage component 12 writes these license for rent 308 and content key thereof to the removable storage medium 40.

Thus, transferring an update message and a transfer message between the rent source storage component 11 and the rent destination storage component 12 and the rent component 24 allows the renting of the license for rent 308 and the content key thereof from the HDD 111 that is a storage device of the rent source to the removable storage medium 40 that is a storage device of the rent destination. It should be noted that the above-mentioned update request message is equivalent to the first message, the above-mentioned transfer message is equivalent to the second message, and the above-mentioned update transfer message is equivalent to the third message.

Also, the rent component 24 writes the same rent ID to both the updated rent source license 307 and the license for rent 308 in advance, thereby relating the rent source license 307 with the license for rent 308. This allows the preferable execution of license return processing to be described later.

As with the move processing described with reference to FIG. 27, arranging the rent component 24 and the rent source and rent destination storage components 11 and 12 on various devices in a distributed manner and transferring an update message and a transfer message between these components allow the renting of these license for rent and content key within a scope in which the license rent condition is satisfied.

Figure 32A:
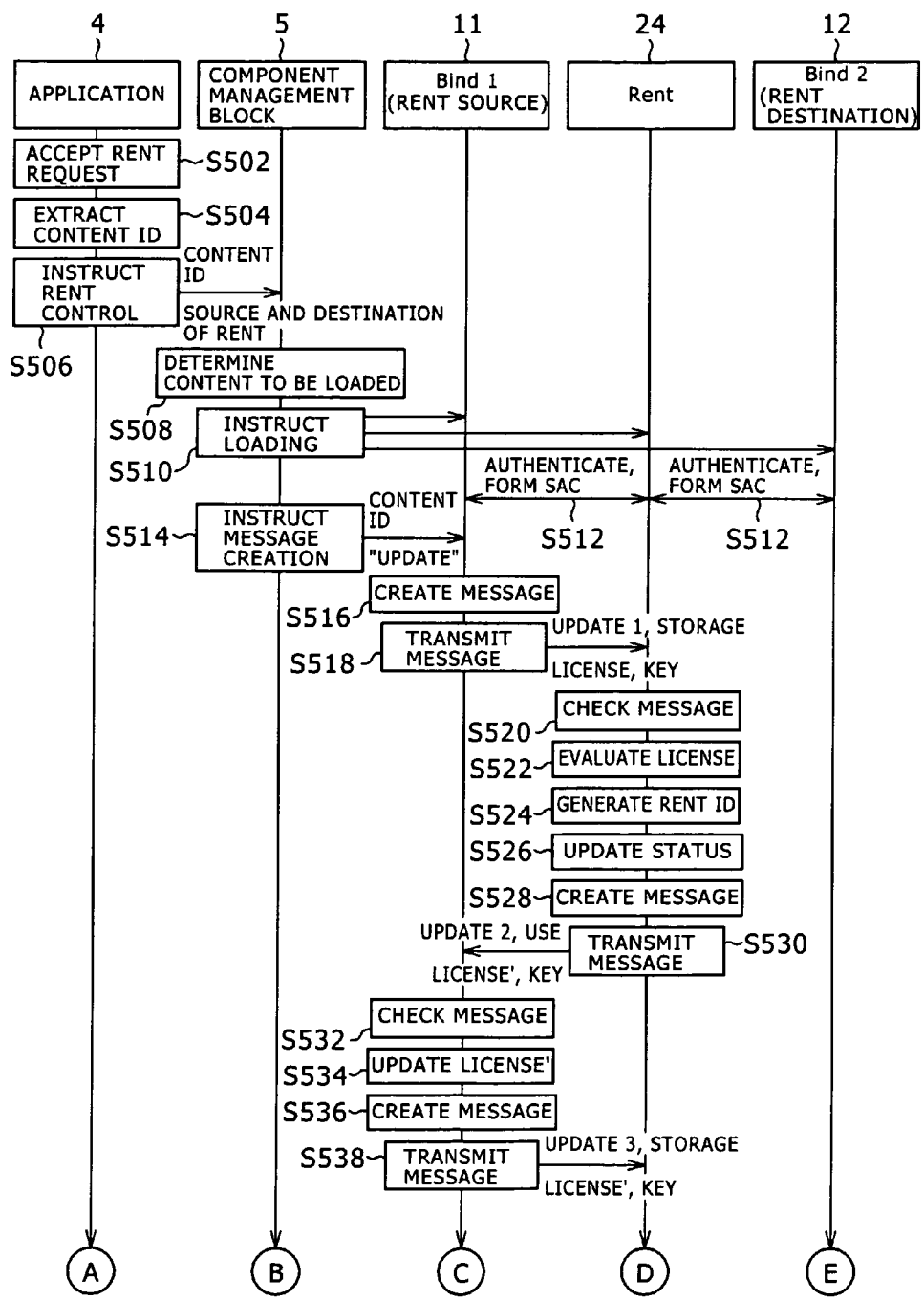
FIG. 32A is a timing chart indicative of a processing flow of the license rent-out method according to the embodiment of the invention.
Figure 32B:
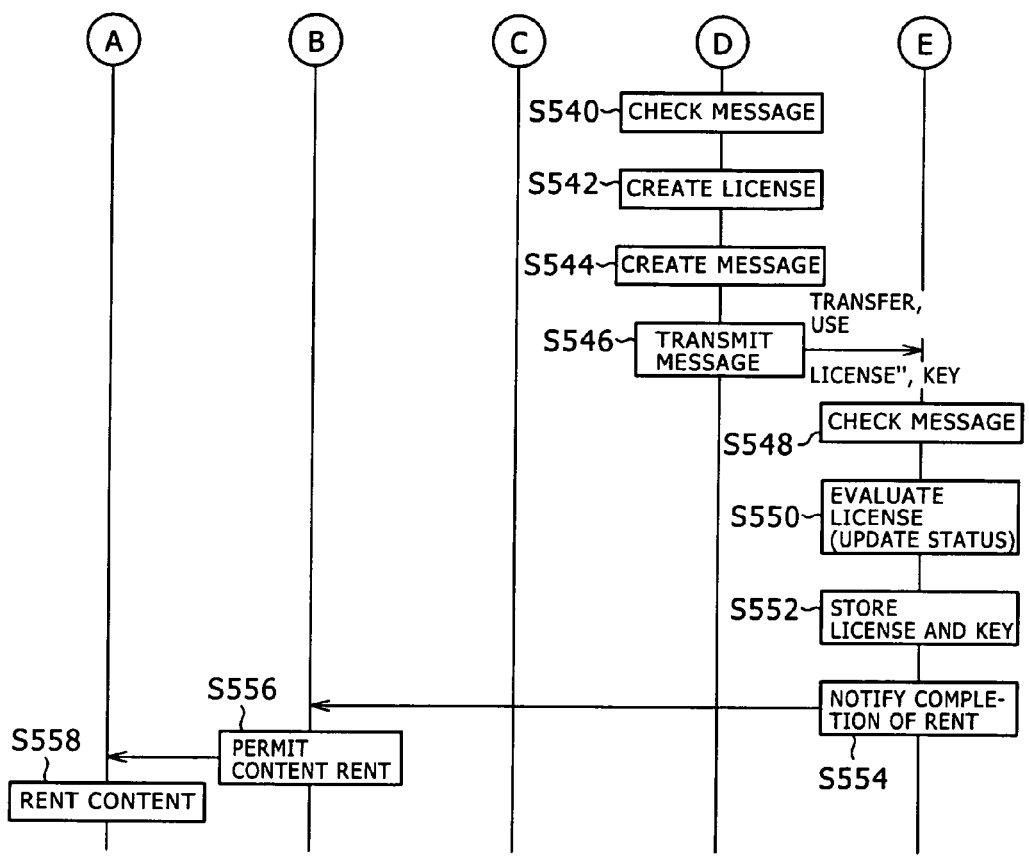
FIG. 32B is a timing chart continued from the timing chart shown in FIG. 32A.

The following describes a processing flow of the license rent method according to the present embodiment with reference to FIGS. 32A and 32B. FIGS. 32A and 32B are timing charts indicative of a processing flow of the license rent method according to the present embodiment.

As shown in FIGS. 32A and 32B, the application 4 receives a request for renting user-specified content from the user (step S502). Next, the application 4 extracts content ID from a content file of the content requested for rent (step S504). Then, the application 4 transmits rent control command information to the component management block 5 to instruct the component management block 5 to control the renting of the content requested for rent, namely the renting of the license corresponding to that content and the content key thereof (step S506). This rent control command information includes the above-mentioned content ID, use information indicative that content use is "rent", and information for specifying a content and license rent source storage device (or the first storage device) and rent destination storage device (or the second storage device), for example.

Next, the component management block 5 determines a license processing component subject to load (or start up) on the basis of the above-mentioned rent control command information received from the application 4, for example (step S508). For example, the component management block 5 determines, as the components subject to load, the rent component 24, the storage component 11 corresponding to the rent source storage device specified by the above-mentioned rent control command information (hereafter referred to as a rent-source storage component 11), and the storage component 12 corresponding to the rent destination storage device specified by that information (hereafter referred to as a rent destination storage component 12). It should be noted that, in this processing of determining components subject to load, the component management block 5 may also search, by the content ID, for the storage components storing the license and content key thereof corresponding to the content requested for rent in the substantially the same procedure as steps S108 through S114 shown in FIG. 23 for example, thereby determining the components subject to load.

Further, the component management block 5 gives a load command to the storage components 11 and 12 and rent component 24 determined as the components subject to load, thereby starting up these components (step S510). Consequently, the rent source storage component 11 and the rent component 24 and the rent component 24 and the rent destination storage component 12 cross authenticate each other, thereby forming a secure communication route, SAC for example, between these components (step S512).

In addition, the component management block 5 instructs the rent source storage component 11 to create an update request message (step S514). To be more specific, this message creation command is affected by transmitting the content ID received from the application 4 and transmission type specification information to the rent source storage component 11. In the present processing flow, license rent processing involving the updating of the rent source license is executed, so that the above-mentioned transmission type specification information is indicative of transmission type "update 1". This message creation command allows the component management block 5 to instruct the rent source storage component 11 to transmit a copy of the rent source license corresponding to the above-mentioned content ID to the rent component 24.

Next, in response to the above-mentioned message creation command, the rent source storage component 11 creates an update request message (or a first message) for transferring the rent source license and content key thereof corresponding to the above-mentioned content ID (step S516). To be more specific, the rent source storage component 11 reads the rent source license and content key thereof corresponding to the above-mentioned content ID from the storage device (the HDD 111 for example) corresponding to itself. Further, the rent source storage component 11 links these rent source license and content key thus read, transmission type ID "0x03" indicative of "update 1" that is the transmission type specified by the component management block 5, and component attribute ID "0x01" indicative of "storage" that is the attribute of the rent source storage component 11 itself, thereby creating an update request message.

Then, the rent source storage component 11 transmits the update request message created in step S516 to the rent component 24 (step S518). In response, the rent component 24 receives this update request message from the rent source storage component 11. Thus, in the update request message transmission processing (S518), the rent source storage component 11 is equivalent to the transmission source component 31 and the rent component 24 is equivalent to the transmission destination component 32.

Next, the rent component 24 checks the update request message received from the rent source storage component 11 for validity (step S520). This update request message verification processing checks if the transmission type ID extracted from the above-mentioned update request message is "0x03" indicative of transmission type "update 1" and the component attribute ID extracted from the above-mentioned update request message is "0x01" indicative of component attribute "storage". This verification processing is executed in substantially the same procedure as the message verification processing described with reference to FIG. 20, so that detail description thereof will be omitted. If the above-mentioned update request message is found valid as a result of the message verification processing, then the rent component 24 permits the processing of the rent source license extracted from the above-mentioned update request message, upon which the procedure goes to step S522. On the other hand, if the above-mentioned update request message is found invalid, the rent component 24 prohibits the processing of that license, upon which the rent processing ends.

Next, the rent component 24 evaluates the rent source license extracted from the above-mentioned update request message to determine whether these rent source license and content key may be rented (step S522). This rent source license evaluation processing evaluates the rent condition written to the rent condition description section 524 of that rent source license, thereby determining whether the rent condition is satisfied or not. In this rent condition evaluation processing, the rent condition such as rent count limit or rent time limit for example is evaluated and, as required, the rent status written to the rent condition description section 524 is referenced.

If the rent condition is found dissatisfied as a result of the evaluation, then the rent component 24 prohibits the renting of these rent source license and content key extracted from the above-mentioned update request message and notifies the application 4 thereof (not shown). On the other hand, if the rent condition is found satisfied, then the rent component t 24 permits the renting of these rent source license and content key extracted from the above-mentioned update request message, upon which the procedure goes to step S524.

Next, in response to the permission of the renting of the above-mentioned rent source license, the rent component 24 newly generates a rent source ID (step S524). This rent source ID is a unique identifier that is generated on a rent processing basis.

In addition, in response to the permission of the renting of the above-mentioned rent source license, the rent component 24 updates the rent status of the rent source license (step S526). To be more specific, the rent component 24 additionally writes the rent ID created above to the rent status in the rent condition description section 524 of that rent source license. Also, in executing rent count control for example, the rent component 24 rewrites the above-mentioned rent status so as to increment the number of times rent has been made by one every time rent is permitted.

Next, in order to responds to the above-mentioned update request message, the rent component 24 creates an update transmission message (or a third message) for transmitting the rent source license with the rent condition updated (hereafter referred to as an updated rent source license) and the content key thereof (step S528). To be more specific, the rent component 24 links the above-mentioned updated rent source license, the content key extracted from the above-mentioned update request message, transmission type ID "0x04" indicative of transmission type "update 2" denoting the transfer of the updated license, and component attribute ID "0x02" indicative of "use" that is the attribute of the rent component 24 itself, thereby creating an update transfer message.

Further, the rent component 24 transmits the update transfer message thus created to the rent source storage component 11 (step S530). In response, the rent source storage component 11 receives this update transfer message from the rent component 24. Thus, in the update transfer message transmission processing (S530), the rent component 24 is equivalent to the above-mentioned transmission source component 31 and the rent source storage component 11 is equivalent to the above-mentioned transmission destination component 32.

Then, the rent source storage component 11 checks the update transfer message received from the rent component 24 for validity (step S532). This update transfer message verification processing checks if the transmission type ID extracted from the above-mentioned update transfer message is "0x04" indicative of transmission type "update 2" and the component attribute ID extracted from the above-mentioned update transfer message is "0x02" indicative of component attribute "use". This verification processing is executed in substantially the same procedure as the message verification described above with reference to FIG. 20, so that detail description thereof will be omitted. If the above-mentioned update transfer message is found valid as a result of the above-mentioned verification processing, then the rent source storage component 11 permits the storage of the license extracted from the above-mentioned update transfer message, upon which the procedure goes to step S534. On the other hand, if the above-mentioned update transfer message is found invalid, then the rent source storage component 11 prohibits the processing of that license, upon which the rent processing ends.

Next, the rent source storage component 11 updates the rent source license stored in the rent source storage device (step S534). To be more specific, the rent source storage component 11 writes the updated rent source license extracted from the above-mentioned update transfer message over the rent source license (the unupdated rent source license received in the above-mentioned update request message) stored in the rent source storage device (the HDD 111 for example).

Further, in order to make a response to the above-mentioned update transfer message, the rent source storage component 11 creates an update completion message for the notification of the completion of the updating of the rent source license (step S536). To be more specific, the rent source storage component 11 reads the updated rent source license and the content key thereof from the rent source storage device. Next, the rent source storage component 11 links the updated rent source license and its content key, transmission type ID "0x05" indicative of "update 3" that is a transmission type denoting the rent source license update completion notification, and component attribute ID "0x01" indicative of "storage" that is the attribute of the rent source storage component 11 itself, thereby creating an update completion message.

Next, the rent source storage component 11 transmits the update completion message thus created to the rent component 24 (step S538). In response, the rent component 24 receives the update completion message from the rent source storage component 11. Thus, in the update completion message transmission processing (S538), the rent source storage component 11 is equivalent to the above-mentioned transmission source component 31 and the rent component 24 is equivalent to the above-mentioned transmission destination component 32.

Then, the rent component 24 checks the update completion message received from the rent source storage component 11 for validity (step S540). This update completion message verification checks if the transmission type ID extracted from the above-mentioned update completion message is "0x05" indicative of transmission type "update 3" and component attribute ID extracted from the above-mentioned update completion message is "0x01" indicative of component attribute "storage". This verification processing is executed in substantially the same procedure as the message verification processing described above with reference to FIG. 20, so that the detail description thereof will be omitted. If the above-mentioned update completion message is found invalid as a result of this message verification, then, because the execution of the updating of the rent source license cannot be confirmed, the rent component 24 prohibited the renting of the content requested for rent, upon which the rent processing ends.

On the other hand, if the above-mentioned update completion message is found valid, the rent component 24 creates a license for rent on the basis of the updated rent source license (step S544).

To be more specific, the rent component 24 extracts the license information description section 501 in which the content ID is written, the reproduction condition description section 521, and the storage condition description section 511 from the updated rent source license to create the base for a license for rent. At this moment, if the extraction of the reproduction condition description section 521 or the storage condition description section 511 fails, then the rent processing ends. Next, the rent component 24 newly creates the rent condition description section 524 written with the return condition of the license for rent and additionally writes this rent condition description section 524 to the above-mentioned base of the license for rent, thereby providing a license for rent. Further, the rent component 24 adds the rent ID created in step S524 to the return status of the rent condition description section 524, upon which the creation of a license for rent is completed.

Next, the rent component 24 creates a transfer message (a second message) for transferring the above-mentioned license for rent and the content key thereof (step S546). To be more specific, the rent component 24 links the above-mentioned created license for rent, the content key extracted from the above-mentioned update completion message, transmission type ID "0x01" indicative of transmission type "transfer"

and component attribute ID "0x02" indicative of "use" that is the attribute of the rent component 24 itself, thereby creating a transfer message.

Further, the rent component 24 transmits the created transfer message to the rent destination storage component 12 (step S546). In response, the rent destination storage component 12 receives the transfer message from the rent component 24. Thus, in the transfer message transmission processing (S546), the rent component 24 is equivalent to the above-mentioned transmission source component 31 and the rent destination storage component 12 is equivalent to the above-mentioned transmission destination component 32.

Then, the rent destination storage component 12 checks the transfer message received from the rent component 24 for validity (step S548). This transfer message verification processing checks if the transmission type ID extracted from the above-mentioned transfer message is "0x01" indicative of transmission type "transfer" and the component attribute ID extracted from the above-mentioned transfer message is "0x02" indicative of component attribute "use". This verification processing is executed in substantially the same procedure as the message verification described above with reference to FIG. 20, so that detail description thereof will be omitted. If the above-mentioned transfer message is found valid as a result of the above-mentioned verification processing, then the rent destination storage component 12 permits the processing of the license for rent extracted from the above-mentioned transfer message, upon which the procedure goes to step S534. On the other hand, if the above-mentioned transfer message is found invalid, then the rent destination storage component 12 prohibits the processing of that license, upon which the rent processing ends.

Next, the rent destination storage component 12 evaluates the license for rent extracted from the above-mentioned transfer message to determine whether this license for rent and content key may be stored in the second storage device (step S550). In this license-for-rent evaluation processing, the rent destination storage component 12 evaluates the storage condition written to the storage condition description section 511 of that license for rent, thereby determining whether the storage condition is satisfied or not, as described before. In this storage condition evaluation processing, the storage condition such as storage count limit or storage time limit for example is evaluated and, as required, the storage status written to the storage condition description section 511 is referenced.

If the storage condition is found dissatisfied as a result of this evaluation, then the rent destination storage component 12 prohibit the storage of the license for rent extracted from the above-mentioned transfer message, thereby executing a pause sequence.

On the other hand, if the storage condition is found satisfied, the rent destination storage component 12 permits the storage of these license for rent and content key extracted from the above-mentioned transfer message and, as required, updates the storage status of that license for rent. To be more specific, in storage count control for example, the storage destination storage component 12 rewrites the storage status so as to increment the number of times storage has been made by one every time storage is permitted.

Then, the storage destination storage component 12 writes the above-mentioned license for rent and content key permitted for storage to the above-mentioned rent destination storage device (step S552).

Thus, these license and content key requested for renting are rented from the rent source storage device (or the first storage device) to the rent destination storage device (or the second storage device). When the renting of the license and so on has been completed, the storage destination rent component 12 notifies the component management block 5 thereof (step S554) for example. In response, the component management block 5 gives a content rent permission to the application 4 (step S556).

Consequently, in response to the notification of the permission of content renting received from the component management block 5, the application 4 rents the above-mentioned content requested for renting from the rent source storage device to the rent destination storage device (step S558). To be more specific, the application 4 reads that content from the rent source storage device and writes that content to the rent destination storage device.

Thus, the processing flow of the license rent method according to the present embodiment has been described. According to this license rent method, a message including a license and a content ID may be transferred between the rent source storage component 11 and the rent destination storage component 12 and the rent component 24, thereby preferably controlling the renting of the license and the corresponding content. At this moment, the message receiving component checks the received message for validity every time it is received, thereby preventing the illegal transmission of licenses and so on.

In addition, the content and license formats, the transmission protocol of that license, and the basic functions of each component are standardized, so that licenses may be transferred in a portable manner between the user devices 10 having copyright management blocks 3 of different installations, thereby preferably controlling the renting of licenses and content. Especially, the present embodiment is advantageous that licenses and content may be preferably rented between physically remotely interconnected user devices 10 via the network 30 without dependent on the installations of the copyright management blocks 3 of these user devices 10. Therefore, the novel configuration enhances the portability of content between user devices 10, which in turn enhances the user convenience.

<13. License Return Method>

The following describes a license return method according to the present embodiment. In this license return method, in order to control the return of content between a plurality of storage devices, two storage components 11 and 12 and the return component 25 are used to delete a license for rent stored in the second storage device that is the rent destination and update a license for rent stored in the first storage device that is the rent source, thereby returning the license for rent to the first storage device. This return processing is equivalent to the check-in processing of SDMI.

First, the outline of the license return method according to the present embodiment will be described with reference to FIG. 33. FIG. 33 shows an outline of the license return method of returning licenses for rent between the two storage devices arranged in the PC 10a according to the present embodiment.

As shown in FIG. 33, the PC 10a has the return component 25, the storage component 11 (or a first storage component) for the HDD 111, one example of the first storage device that is the rent source (or the return destination), and the storage component 12 (or a second storage component) for the removable storage medium 40, one example of the second storage device that is rent destination (or the return source).

The PC 10a thus configured transmits a transfer message from the rent destination storage component 12 to the return component 25 to delete the above-mentioned license for rent 308 from the removable storage medium 40 and transfers an update message between the rent source storage component 11 and the return component 25 to update the rent source license 307 stored in the rent source HDD 111, thereby returning the license for rent 308 to the HDD 111.

To be more specific, first, the rent destination storage component 12 reads the license for rent 308 subject to return and the content key thereof from the removable storage medium 40 to create a transfer message (transmission type "transfer", transmission source component attribute "storage") and transmits the created transfer message to the return component 25. At this moment, the storage component 12 deletes the license for rent 308 and the content key thereof from the removable storage medium 40.

On the other hand, the rent source storage component 11 reads the rent source license 307 and the content key thereof from the HDD 111 to create an update request message (transmission type "update 1", transmission source component attribute "storage") and transmits the created update request message to the return component 25. It should be noted that the rent source license 307 corresponds to the above-mentioned license for rent 308 subject to return and the same rent ID is allocated to both the rent source license 307 and the license for rent 308 to relate them each other.

Next, the return component 25 checks the transfer message received from the rent destination storage component 12 and the update request message received from the rent source storage component 11 to evaluate the license for rent 308 extracted from the transfer message, thereby determining whether the license for rent 308 and the content key thereof may be returned. If these license and content key are found returnable, then the return component 25 updates the rent status of the rent source license 307 extracted from the above-mentioned update request message to create an update transfer message (transmission type "update 2", transmission source component attribute "use") including the updated license and content key, thereby transmitting the created update transfer message to the rent source storage component 11.

Then, the rent source storage component 11 checks the update transfer message received from the return component 25 and then writes the updated rent source license 307 included in the update transfer message over the rent source license 307 stored in the HDD 111.

Thus, transferring an update message and a transfer message between the rent destination and rent source storage components 11 and 12 and the return component 25 allows the returning of the license for rent 308 and the content key thereof from the removable storage medium 40 that is the rent destination storage device to the HDD 111 that is the rent source storage device, thereby incrementing the rent count of the rent source license by one. It should be noted that the above-mentioned update request message is equivalent to the first message, the above-mentioned transfer message is equivalent to the second message, and the above-mentioned update transfer message is equivalent to the third message. Also, by matching the rent source license 307 against the license for rent 308 on the basis of the rent ID, the return component 25 is capable of returning licenses for rent to proper rent source storage devices.

Figure 34A:
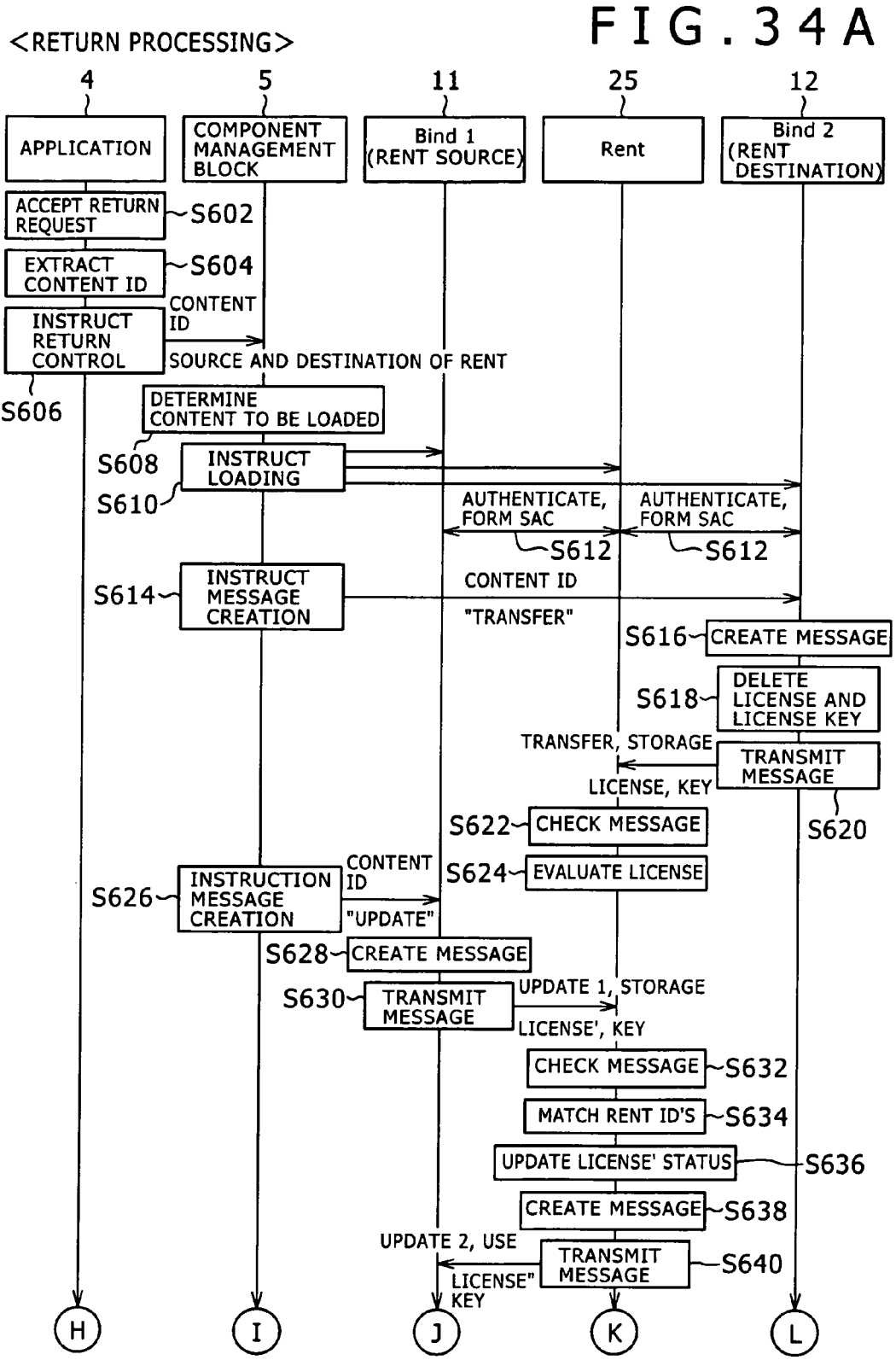
FIG. 34A is a timing chart indicative of a processing flow of the license return method according to the embodiment of the invention.
Figure 34B:
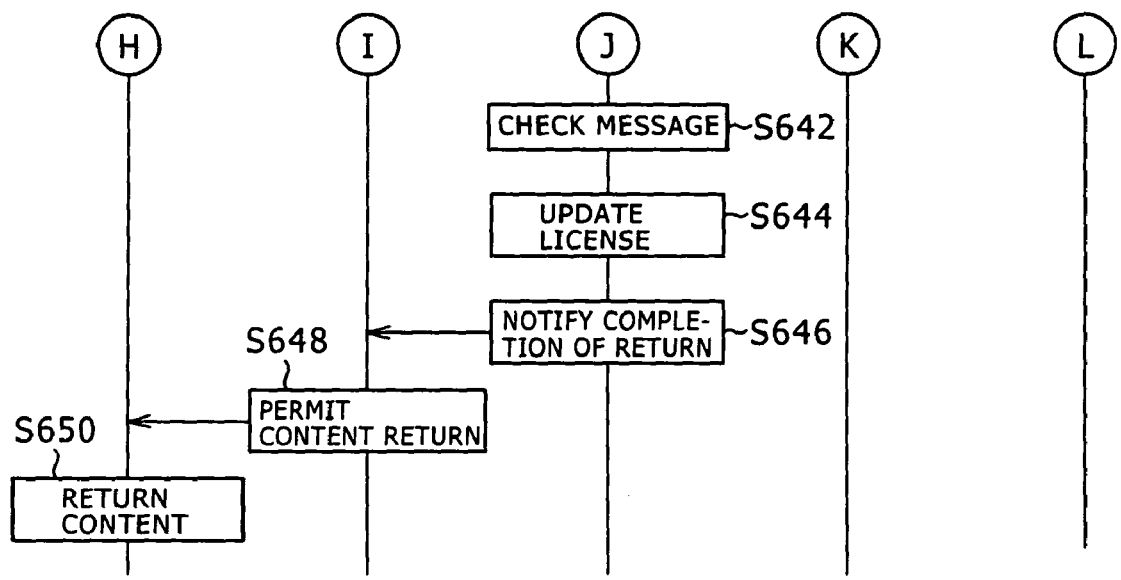
FIG. 34B is a timing chart continued from the timing chart shown in FIG. 34A.

The following describes a processing flow of the license return method according to the present embodiment with reference to FIGS. 34A and 34B. FIGS. 34A and 34B are timing charts indicative of the processing flow of this license return method.

As shown in FIGS. 34A and 34B, the application 4 receives a request for returning the user-specified content from the user (step S602). Next, the application 4 extracts the content ID from a content file of the content requested for return (step S604). Further, the application 4 transmits return control command information to the component management block 5 to control the return of the content requested for return, namely, the return of the license and content key thereof corresponding to that content (step S606). This return control command information includes the above-mentioned content ID, use information indicative that content use is "return", and information for specifying a content and license return source storage device (or the first storage device) and return destination storage device (or the second storage device), for example.

Next, the component management block 5 determines a license processing component subject to load (or start up) on the basis of the above-mentioned return control command information received from the application 4, for example (step S608). For example, the component management block 5 determines, as the components subject to load, the return component 25, the storage component 11 corresponding to the rent source storage device specified by the above-mentioned return control command information (hereafter referred to as a rent source storage component 11), and the storage component 12 corresponding to the rent destination storage device specified by that information (hereafter referred to as a rent destination storage component 12). It should be noted that, in this processing of determining components subject to load, the component management block 5 may also search, by the content ID, for the storage components storing the license and content key thereof corresponding to the content requested for return in the substantially the same procedure as steps S108 through S114 shown in FIG. 23 for example, thereby determining the components subject to load.

Further, the component management block 5 gives a load command to the storage components 11 and 12 and rent component 25 determined as the components subject to load, thereby starting up these components (step S610). Consequently, the rent source storage component 11 and the return component 25 and the return component 25 and the rent destination storage component 12 cross authenticate each other, thereby forming a secure communication route, SAC for example, between these components (step S612).

In addition, the component management block 5 transmits a first message creation command to the rent destination storage component 12 to create a transfer message (step S614). To be more specific, this first message creation command is affected by transmitting the content ID received from the application 4 and transmission type specification information to the rent destination storage component 12. In this step, the transfer for returning a license for rent is instructed, so that the above-mentioned transmission type specification information is indicative of transmission type "transfer". This first message creation command allows the component management block 5 to instruct the rent destination storage component 12 to transmit the master copy of the rent source license corresponding to the above-mentioned content ID to the rent component 25.

Next, in response to the above-mentioned message creation command, the rent destination storage component 12 creates a transfer message (or a second message) for transferring the rent source license and content key thereof corresponding to the above-mentioned content ID (step S616). To be more specific, the rent destination storage component 12 reads the license for rent and content key thereof corresponding to the above-mentioned content ID from the rent source storage device (the removable storage medium 40 for example) corresponding to itself. Further, the rent destination storage component 12 links these license for rent and content key thus read, transmission type ID "0x01" indicative of "transfer" that is the transmission type specified by the component management block 5, and component attribute ID "0x01" indicative of "storage" that is the attribute of the rent destination storage component 12 itself, thereby creating a transfer message.

Further, the rent destination storage component 12 invalidates (or deletes) the above-mentioned license for rent and content key thereof stored in the rent destination storage device (step S618). Thus, invalidating the license and so on stored in the rent destination storage device before transmitting the transfer message in next step S620 may prevent an unauthorized user for example from interfering the license invalidation processing by illegal measures after the transmission of the transfer message, as a result of which the license and so on exist in the rent destination storage device.

Then, the rent destination storage component 12 transmits the transfer message created in step S616 to the return component 25 (step S620). In response, the return component 25 receives this transfer message from the rent destination storage component 12. Thus, in the transfer message transmission processing (S620), the rent destination storage component 12 is equivalent to the above-mentioned transmission source component 31 and the return component 25 is equivalent to the above-mentioned transmission destination component 32.

Next, the return component 25 checks the transfer message received from the rent destination storage component 12 for validity (step S622). This transfer message verification processing checks if transmission type ID extracted from the above-mentioned transfer message is "0x01" indicative of transmission type "transfer" and component attribute ID extracted from the above-mentioned transfer message is "0x01" indicative of component attribute "storage". This verification is executed in substantially the same procedure as the message verification processing described with reference to FIG. 20, so that detail description thereof will be omitted. If the above-mentioned transfer message is found valid as a result of the above-mentioned verification processing, then the return component 25 permits the processing of the license for rent extracted from the transfer message, upon which the procedure goes to step S624. In this case, the return component 25 may notify the component management block 5 of the completion of the return of the license for rent, for example. On the other hand, if the transfer message is found invalid, then the return component 25 prohibits the processing of this license for rent, upon which the return processing ends.

Further, the return component 25 evaluates the license for rent extracted from the above-mentioned transfer message to determine whether the license for rent and the content key thereof are returnable (step S632). In this license evaluation processing, the return component 25 evaluates the return condition written to the return condition description section 525 of that license for return to determine whether the return condition is satisfied. In this determination, the return condition such as return time limit is checked and, as required, the return status written to the return condition description section 525 is referenced.

If the return condition is found dissatisfied as a result of the above-mentioned evaluation, then the return component 25 prohibits the return of the license for rent and content key thereof extracted from the above-mentioned transfer message, thereby executing a pause sequence. On the other hand, if the return condition is sound satisfied, the return component 25 permits the returning of the license for rent and the content key thereof extracted from the above-mentioned transfer message, upon which the procedure goes to step S626.

Next, the component management block 5 gives a second message creation command to the rent source storage component 11 to create an update request message (step S626). To be more specific, this second message creation command is affected by transmitting the content ID received from the application 4 and transmission type specification information to the rent source storage component 11. In this step, the transmission involving the update of a rent source license is instructed, so that the above-mentioned transmission type specification information is transmission type "update 1". This second message creation command allows the component management block 5 to instruct the rent source storage component 11 to transmit a copy of the rent source license corresponding to the above-mentioned content ID to the return component 25.

Further, in response to the second message creation command, the rent source storage component 11 creates an update request message (or a first message) for transmitting the rent source license and content key thereof corresponding to the above-mentioned content ID (step S628). To be more specific, the rent source storage component 11 reads the rent source license and content key thereof corresponding to the above-mentioned content ID from the rent source storage device corresponding to itself (the HDD 111 for example). In addition, the rent source storage component 11 links the rent source license and content key thus read, transmission type ID "0x03" indicative of transmission type "update 1" specified by the component management block 5, and component attribute ID "0x01" indicative of "storage" that is the attribute of the rent source storage component 11 itself, thereby creating an update request message.

Then, the rent source storage component 11 transmits the update request message created in step S628 to the return component 25 (step S630). In response, the return component 25 receives the above-mentioned update request message from the rent source storage component 11. Thus, in the transmission of the update request message (S630), the rent source storage component 11 is equivalent to the transmission source component 31 and the return component 25 is equivalent to the transmission destination component 32.

Next, the return component 25 checks the update request message received from the rent source storage component 11 for validity (step S632). This update request message verification checks if the transmission type ID extracted from the above-mentioned update request message is "0x03" indicative of transmission type "update 1" and the component attribute ID extracted from the above-mentioned update request message is "0x01" indicative of component attribute "storage". Because this verification is executed in substantially the same procedure as the message verification processing described with reference to FIG. 20, detail description of the verification processing will be omitted. If the above-mentioned update request message is found valid as a result of the above-mentioned message verification, then the return component 25 permits the processing of the rent source license extracted from the above-mentioned update request message, upon which the procedure goes to step S622. On the other hand, if the update request message is found invalid, the return component 25 prohibits the processing of this license, upon which the return processing ends.

It should be noted that, in the example of the processing flow shown in FIGS. 34A and 34B, steps S614 through S624 are executed before steps S626 through S632; it is also practicable to execute steps S614 through S624 after steps S626 through S632, for example.

Next, the return component 25 matches the rent ID written to the return condition description section 525 of the above-mentioned license for rent against the rent ID written to the rent condition description section 524 of the above-mentioned rent source license to see if there is a match between both the IDs (step S634). If a match is found, the return processing continues, the procedure going to step S636. On the other hand, if a mismatch is found, the return processing is paused. This rent ID matching processing allows the prevention of erroneous return processing from being executed if the license for rent does not correspond to the rent source license.

Further, in response to the above-mentioned rent source license return permission, the return component 25 updates the rent status of the rent out license (step S636). To be more specific, the return component 25 deletes the rent ID written to the rent status of the rent source license. If rent count control is executed, the return component 25 rewrites the rent status so as to decrement the number of times rent has been made by one (or increment the rentable count by one), which is written to the rent status of the rent source license.

Next, in order to respond to the above-mentioned update request message, the return component 25 creates an update transmission message (or a third message) for transmitting the rent license with the rent status updated in step S636 (hereafter referred to as an updated rent source license) and the content key thereof (step S638). To be more specific, links the above-mentioned updated rent source license, the content key extracted from the above-mentioned update request message, transmission type ID "0x04" indicative of transmission type "update 2" denoting the transfer of an updated license, and component attribute ID "0x02" indicative of "use" that is the attribute of the return component 25 itself, thereby creating an update transfer message.

Further, the return component 25 transmits the update transfer message thus created to the rent source storage component 11 (step S640). In response, the rent source storage component 11 receives the above-mentioned update transfer message from the return component 25. Thus, in the update transfer message transmission processing (S640), the return component 25 is equivalent to the transmission source component 31 and the rent source storage component 11 is equivalent to the transmission destination component 32.

Next, the rent source storage component 11 checks the update transfer message received from the return component 25 for validity (step S642). This update transfer message verification checks if the transmission type ID extracted from the above-mentioned update transfer message is "0x04" indicative of transmission type "update 2" and component attribute ID extracted from the above-mentioned update transfer message is "0x02" indicative of component attribute "use". This verification processing is executed in substantially the same procedure as the message verification processing described above with reference to FIG. 20, so that the detail description thereof will be omitted. If the above-mentioned update transfer message is found valid as a result of this message verification, then the rent source storage component 11 permits the storage of the updated rent source license extracted from the above-mentioned update transfer message and the procedure goes to step S644. On the other hand, if the update transfer message is found invalid, then the rent source storage component 11 prohibits the processing of the updated rent source license, upon which the return processing ends.

Next, the rent source storage component 11 updates the rent source license stored in the rent source storage device (step S644). To be more specific, the storage component 11 writes the updated rent source license extracted from the above-mentioned update transfer message over the rent source license (the unupdated rent source license received in the above-mentioned update request message) stored in the rent source storage device (the HDD 111 for example). It should be noted that, in the example of the return processing flow shown in FIG. 34, the rent source storage component 11 does not transmit an update completion message to the return component 25 in response to the update transfer message; but it is also practicable that the rent source storage component 11 returns an update completion message.

Thus, the license for rent requested for return and content key thereof are returned from the rent destination storage device (the second storage device) to the rent source storage device (the first storage device) When the return of the license and so on has been completed, the rent source storage component 11 transmits a return completion notification to the component management block 5 (step S646), for example. In response to this return completion notification, the component management block 5 notifies the application 4 of the return permission of content (step S648).

Consequently, in response to the notification of content return permission received from the component management block 5, the application 4 returns the above-mentioned content requested for return from the rent destination storage device to the rent source storage device (step S650). To be more specific, the application 4 deletes the above-mentioned content from the rent destination storage device.

Thus, the processing flow of the license return method according to the present embodiment has been described. According to this license return method, messages including a license and a content ID may be transferred between the rent source and rent destination storage components 11 and 12 and the return component 25 to preferably control the returning of these license and content. At this moment, the message receiving component checks each received message for validity every time it is received, thereby preventing the illegal transmission of licenses and so on.

In addition, the content and license formats, the transmission protocol of that license, and the basic functions of each component are standardized, so that licenses may be transferred in a portable manner between the user devices 10 having copyright management blocks 3 of different installations, thereby preferably controlling the renting of licenses and content. Especially, the present embodiment is advantageous that licenses and content may be preferably rented between physically remotely interconnected user devices 10 via the network 30 without dependent on the installations of the copyright management blocks 3 of these user devices 10. Therefore, the novel configuration enhances the portability of content between user devices 10, which in turn enhances the user convenience.

Thus, the copyright management system, components thereof, and operation methods thereof according to the present embodiment of the invention have been described in detail. According to this copyright management system, at least the storage component 1 and the at least the use component 2 among the license processing components proving the basic functions of the copyright management block may be combined to transfer licenses in between, thereby executing the restriction in use fro each use case. Also, each license is written with a use condition for each use case in a divided manner and the description of the use condition is standardized. This novel configuration allows the transfer of these licenses between a plurality of license processing components in a portable manner interconnected via the network 30. Consequently, the components for executing content use control may be arranged, in a distributed manner, on a plurality of user devices 10 interconnected via the network 30.

In the security of content keys, a content key security standard is described in each license in advance. Each content key is convertibly distributed within a scope of this standard, regardless of the type of installation of the copyright management block. This configuration allows the interconnection of a plurality of copyright management systems having different installations of the copyright management block 3 via the network 30, thereby transferring licenses and content between these copyright management systems in a portable manner to execute copyright management. Consequently, user convenience and the degree of freedom of content user may be enhanced, thereby promoting the popularization of the copyright management system according to the present embodiment.

While preferred embodiments of the present invention have been described using specific terms, such description is for illustrative purpose only, and it is to be understood that changes and variations may be made without departing from the spirit or scope of the following claims.

For example, in the above-mentioned embodiment, the transmission type attribute information, the transmission source component attribute information, and the license and content key thereof are transmitted at the same time in one message. It is also practicable that these pieces of information and the license and content key thereof may be transmitted at different times as far as there are related with each in some manner. Also, the content key may not always be transmitted along with its license.

The use component 2 is not restricted to the above-mentioned examples of the reproduction component. For example, the use component 2 may be a divide component for controlling the dividing of content, a combine component for controlling the combining of content, a convert component for controlling the converting of a license by use of a content key, or an export component for outputting a license in accordance with another copyright management scheme or another storage scheme.

The above-mentioned embodiment of the present invention is applicable to a copyright management system that controls content use on the basis of licenses and, more particularly, to a copyright management system that allows the portable transfer of content between a plurality of user devices having different installations of copyright management blocks.

While preferred embodiments of the present invention have been described using specific terms, such description is for illustrative purpose only, and it is to be understood that changes and variations may be made without departing from the spirit or scope of the following claims.

What is claimed is:

1. A license source apparatus for transferring a license separately from content and defining a content usage rule to a license destination apparatus, the license source apparatus and the license destination apparatus each being a unit of a license processing apparatus, the license source apparatus, comprising:
   creating means for creating a message, the message including
      the license,
      a manipulation type defining a type of processing of the license between the license source apparatus and the license destination apparatus, and
      an apparatus attribute defining an attribute of the license source apparatus to identify the license source apparatus; and
   transferring means for transferring the message from the license source apparatus to the license destination apparatus; and
   a processor configured to delete the license from the license source apparatus when the manipulation type is transfer for transferring the license and the message including the license is transferred from the license source apparatus to the license destination apparatus, and to update the license with an updated license received from the license destination apparatus when the manipulation type is update for updating the license and the message including the license is transferred from the license source apparatus to the license destination apparatus.

2. The license source apparatus according to claim 1, further comprising:
   retrieving means for retrieving the license targeted to be transferred to the license destination apparatus;
   deciding means for deciding the manipulation type of the license to be transferred to the license destination apparatus; and
   reading means for reading an apparatus attribute defined to the license source apparatus of its own.

3. The license source apparatus according to claim 1, wherein the manipulation type is show for transferring a copy of the license.

4. The license source apparatus according to claim 1, wherein the unit of license processing apparatus further includes:
   a storage apparatus storing the license in a storage location; and
   a utilization apparatus utilizing the license transferred from the storage apparatus.

5. The license source apparatus according to claim 4, wherein the storage apparatus retrieves the license from the storage location and transfers the license to the utilization apparatus.

6. The license source apparatus according to claim 5, wherein the utilization apparatus transfers the license transferred from the storage apparatus or an updated license to the storage apparatus or to another storage apparatus.

7. The license source apparatus according to claim 4, wherein the apparatus attribute indicates whether the license source apparatus is the storage apparatus or the utilization apparatus.

8. The license source apparatus according to claim 1, wherein the transferring means transfers, to the license destination apparatus, a content key to decrypt the content corresponding to the license, together with the license.

9. The license source apparatus according to claim 1, wherein the content usage rule is described in the license corresponding to the license processing apparatus which evaluates the content usage rule defined for the license source apparatus in the license to process the license, and the content usage rule allows reproduction of the content.

10. The license source apparatus according to claim 2, wherein,
    the license source apparatus is a storage apparatus storing the license in a storage location, and the retrieving means searches for the license to be transferred from the storage on the basis of content identification received from a component manager managing the license processing apparatus.

11. A computer readable storage medium encoded with computer program instructions which when executed by a computer cause the computer to implement a method of transferring a license separately from content from a license source apparatus defining a content usage rule to a license destination apparatus, the license source apparatus and the license destination apparatus each being a license processing apparatus, the method comprising:

creating a message, the message including the license, a manipulation type defining a type of processing of the license between the license source apparatus and the license destination apparatus, and an apparatus attribute defining an attribute of the license source apparatus for identification of the license source apparatus;

transferring the message from the license source apparatus to the license destination apparatus;

deleting the license from the license source apparatus when the manipulation type is transfer for transferring the license and the message including the license is transferred from the license source apparatus to the license destination apparatus; and updating the license with an updated license received from the license destination apparatus when the manipulation type is update for updating the license and the message including the license is transferred from the license source apparatus to the license destination apparatus.

12. A source computing device for transferring a license separately from content defining a content usage rule to a destination computing device, the source computing device comprising:

a processor configured to create a message, the message including
the license,
a manipulation type defined for how to process the license between the source computing device and the destination computing device, and
a module attribute defined for the source computing device to identify the source computing device; and a network interface configured to transfer the message to the destination computing device; and said processor configured to delete the license from the source computing device when the manipulation type is transfer for transferring the license and the message including the license is transferred from the source computing device to the destination computing device, and to update the license with an updated license received from the destination computing device when the manipulation type is update for updating the license and the message including the license is transferred from the source computing device to the destination computing device.

13. The source computing device according to claim 12, wherein the manipulation type is show for transferring a copy of the license.

* * * * *